United States Patent
Zhu et al.

(10) Patent No.: US 12,388,990 B2
(45) Date of Patent: Aug. 12, 2025

(54) SYSTEMS AND METHODS FOR APPLYING DEBLOCKING FILTERS TO RECONSTRUCTED VIDEO DATA

(71) Applicant: Sharp Kabushiki Kaisha, Sakai (JP)

(72) Inventors: Weijia Zhu, Vancouver, WA (US); Kiran Mukesh Misra, Vancouver, WA (US); Christopher Andrew Segall, Vancouver, WA (US); Philip Cowan, Vancouver, WA (US)

(73) Assignee: SHARP KABUSHIKI KAISHA, Sakai (JP)

( * ) Notice: Subject to any disclaimer, the term of this patent is extended or adjusted under 35 U.S.C. 154(b) by 67 days.

(21) Appl. No.: 18/218,298

(22) Filed: Jul. 5, 2023

(65) Prior Publication Data

US 2023/0344997 A1    Oct. 26, 2023

Related U.S. Application Data

(63) Continuation of application No. 17/469,997, filed on Sep. 9, 2021, now Pat. No. 11,750,805, which is a continuation of application No. 17/042,246, filed as application No. PCT/JP2019/012422 on Mar. 25, 2019, now Pat. No. 11,259,019.

(60) Provisional application No. 62/737,596, filed on Sep. 27, 2018, provisional application No. 62/735,090, filed on Sep. 22, 2018, provisional application No. 62/733,067, filed on Sep. 18, 2018, provisional application No. 62/732,556, filed on Sep. 17, 2018, provisional application No. 62/714,755, filed on Aug. 5, 2018, provisional application No. 62/711,420, filed on Jul. 27, 2018, provisional application No. 62/696,309, filed on Jul. 10, 2018, provisional (Continued)

(51) Int. Cl.
| | | |
|---|---|---|
| H04N 7/12 | (2006.01) | |
| H04N 19/117 | (2014.01) | |
| H04N 19/176 | (2014.01) | |
| H04N 19/82 | (2014.01) | |
| H04N 19/86 | (2014.01) | |
| H04N 19/124 | (2014.01) | |
| H04N 19/159 | (2014.01) | |
| H04N 19/18 | (2014.01) | |
| H04N 19/70 | (2014.01) | |

(52) U.S. Cl.
CPC ......... *H04N 19/117* (2014.11); *H04N 19/176* (2014.11); *H04N 19/82* (2014.11); *H04N 19/86* (2014.11); *H04N 19/124* (2014.11); *H04N 19/159* (2014.11); *H04N 19/18* (2014.11); *H04N 19/70* (2014.11)

(58) Field of Classification Search
CPC .................................................. H04N 19/117
See application file for complete search history.

(56) References Cited

PUBLICATIONS

Anderson et al., "CE2-2.1.1: Long deblocking filters and fixes", Joint Video Experts Team (JVET) of ITU-T SG WP 3 and ISO/IEC JTC 1/SC 29/WG 11, JVET-K0307-v1, Jul. 10-18, 2018, pp. 1-6.

(Continued)

*Primary Examiner* — Y Lee
(74) *Attorney, Agent, or Firm* — Keating & Bennett, LLP

(57) ABSTRACT

Systems and methods for applying deblocking filters to reconstructed video data are disclosed. Sample values in adjacent reconstructed video blocks are modified according to multiple passes of a deblocking filter. A filtering pass may correspond to processing or constructing of all or subset of samples to be deblocked. The number of processing or constructing for each sample in a given pass may correspond to the pass index or order.

1 Claim, 16 Drawing Sheets

Related U.S. Application Data application No. 62/679,716, filed on Jun. 1, 2018, provisional application No. 62/677,629, filed on May 29, 2018, provisional application No. 62/656,291, filed on Apr. 11, 2018, provisional application No. 62/655,029, filed on Apr. 9, 2018, provisional application No. 62/654,379, filed on Apr. 7, 2018.

(56) References Cited

PUBLICATIONS

Zhu et al., "Systems and Methods for Applying Deblocking Filters To Reconstructed Video Data", U.S. Appl. No. 17/469,997, filed Sep. 9, 2021.

FIG. 6

| | 0 | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|---|
| Q | 0 | 1 | 2 | 3 | 4 | 5 | 6 | 7 | 8 | 9 | 10 | 11 | 12 | 13 | 14 | 15 | 16 | 17 | 18 |
| b' | 0 | 0 | 0 | 0 | 0 | 0 | 0 | 0 | 0 | 0 | 0 | 0 | 0 | 0 | 0 | 0 | 6 | 7 | 8 |
| c' | 0 | 0 | 0 | 0 | 0 | 0 | 0 | 0 | 0 | 0 | 0 | 0 | 0 | 0 | 0 | 0 | 0 | 0 | 1 |
| Q | 19 | 20 | 21 | 22 | 23 | 24 | 25 | 26 | 27 | 28 | 29 | 30 | 31 | 32 | 33 | 34 | 35 | 36 | 37 |
| b' | 9 | 10 | 11 | 12 | 13 | 14 | 15 | 16 | 17 | 18 | 20 | 22 | 24 | 26 | 28 | 30 | 32 | 34 | 36 |
| c' | 1 | 1 | 1 | 1 | 1 | 1 | 1 | 1 | 2 | 2 | 2 | 2 | 3 | 3 | 3 | 3 | 4 | 4 | 4 |
| Q | 38 | 39 | 40 | 41 | 42 | 43 | 44 | 45 | 46 | 47 | 48 | 49 | 50 | 51 | 52 | 53 | | | |
| b' | 38 | 40 | 42 | 44 | 46 | 48 | 50 | 52 | 54 | 56 | 58 | 60 | 62 | 64 | - | - | | | |
| c' | 5 | 5 | 6 | 6 | 7 | 8 | 9 | 10 | 11 | 13 | 14 | 16 | 18 | 20 | 22 | 24 | | | |

| qPi | <30 | 30 | 31 | 32 | 33 | 34 | 35 | 36 | 37 | 38 | 39 | 40 | 41 | 42 | 43 | >43 |
|---|---|---|---|---|---|---|---|---|---|---|---|---|---|---|---|---|
| Qpc | =qPi | 29 | 30 | 31 | 32 | 33 | 33 | 34 | 34 | 35 | 35 | 36 | 36 | 37 | 37 | =qPi − 6 |

FIG. 13

SYSTEMS AND METHODS FOR APPLYING DEBLOCKING FILTERS TO RECONSTRUCTED VIDEO DATA

CROSS REFERENCE

This Nonprovisional application claims priority under 35 U.S.C. § 119 on provisional Application No. 62/651,058 on Mar. 30, 2018, No. 62/654,379 on Apr. 7, 2018, No. 62/655,029 on Apr. 9, 2018, No. 62/656,291 on Apr. 11, 2018, No. 62/677,629 on May 29, 2018, No. 62/679,716 on Jun. 1, 2018. No. 62/696,309 on Jul. 10, 2018, No. 62/711,420 on Jul. 27, 2018, No. 62/714,755 on Aug. 5, 2018, No. 62/732,556 on Sep. 17, 2018, No. 62/733,067 on Sep. 18, 2018. No. 62/735,090 on Sep. 22, 2018, No. 62/737,596 on Sep. 27, 2018, the entire contents of which are hereby incorporated by reference.

TECHNICAL FIELD

This disclosure relates to video coding and more particularly to techniques for performing deblocking of reconstructed video data.

BACKGROUND ART

Digital video capabilities can be incorporated into a wide range of devices, including digital televisions, laptop or desktop computers, tablet computers, digital recording devices, digital media players, video gaming devices, cellular telephones, including so-called smartphones, medical imaging devices, and the like. Digital video may be coded according to a video coding standard. Video coding standards may incorporate video compression techniques. Examples of video coding standards include ISO/IEC MPEG-4 Visual and ITU-T H.264 (also known as ISO/IEC MPEG-4 AVC) and High-Efficiency Video Coding (HEVC). HEVC is described in High Efficiency Video Coding (HEVC), Rec. ITU-T H.265, December 2016, which is incorporated by reference, and referred to herein as ITU-T H.265. Extensions and improvements for ITU-T H.265 are currently being considered for the development of next generation video coding standards. For example, the ITU-T Video Coding Experts Group (VCEG) and ISO/IEC (Moving Picture Experts Group (MPEG) (collectively referred to as the Joint Video Exploration Team (JVET)) are studying the potential need for standardization of future video coding technology with a compression capability that significantly exceeds that of the current IVC standard. The Joint Exploration Model 7 (JEM 7), Algorithm Description of Joint Exploration Test Model 7 (JEM 7), ISO/IEC JTC1/SC29/WG11 Document: JVET-G1001, July 2017, Torino, IT, which is incorporated by reference herein, describes the coding features that are under coordinated test model study by the JVET as potentially enhancing video coding technology beyond the capabilities of ITU-T H.265. It should be noted that the coding features of JEM 7 are implemented in JEM reference software. As used herein, the term JEM may collectively refer to algorithms included in JEM 7 and implementations of JEM reference software.

Video compression techniques reduce data requirements for storing and transmitting video data by exploiting the inherent redundancies in a video sequence. Video compression techniques may sub-divide a video sequence into successively smaller portions (i.e., groups of frames within a video sequence, a frame within a group of frames, slices within a frame, coding tree units (e.g., macroblocks) within a slice, coding blocks within a coding tree unit, etc.). Intra prediction coding techniques (e.g., intra-picture (spatial)) and inter prediction techniques (i.e., inter-picture (temporal)) may be used to generate difference values between a unit of video data to be coded and a reference unit of video data. The difference values may be referred to as residual data. Residual data may be coded as quantized transform coefficients. Syntax elements may relate residual data and a reference coding unit (e.g., intra-prediction mode indices, motion vectors, and block vectors). Residual data and syntax elements may be entropy coded. Entropy encoded residual data and syntax elements may be included in a compliant bitstream. Compliant bitstreams and associated metadata may be formatted according to data structures.

SUMMARY OF INVENTION

In one example, a method of filtering reconstructed video data comprises receiving an array of sample values including adjacent reconstructed video blocks for a component of video data, and modifying sample values in the adjacent reconstructed video blocks according to multiple passes of a deblocking filter.

BRIEF DESCRIPTION OF DRAWINGS

FIG. 6 is an example of a table that may be used to determine deblocking parameters in accordance with one or more techniques of this disclosure.

FIG. 13 is an example of a table that may be used to determine deblocking parameters in accordance with one or more techniques of this disclosure.

DESCRIPTION OF EMBODIMENTS

Figure 1:
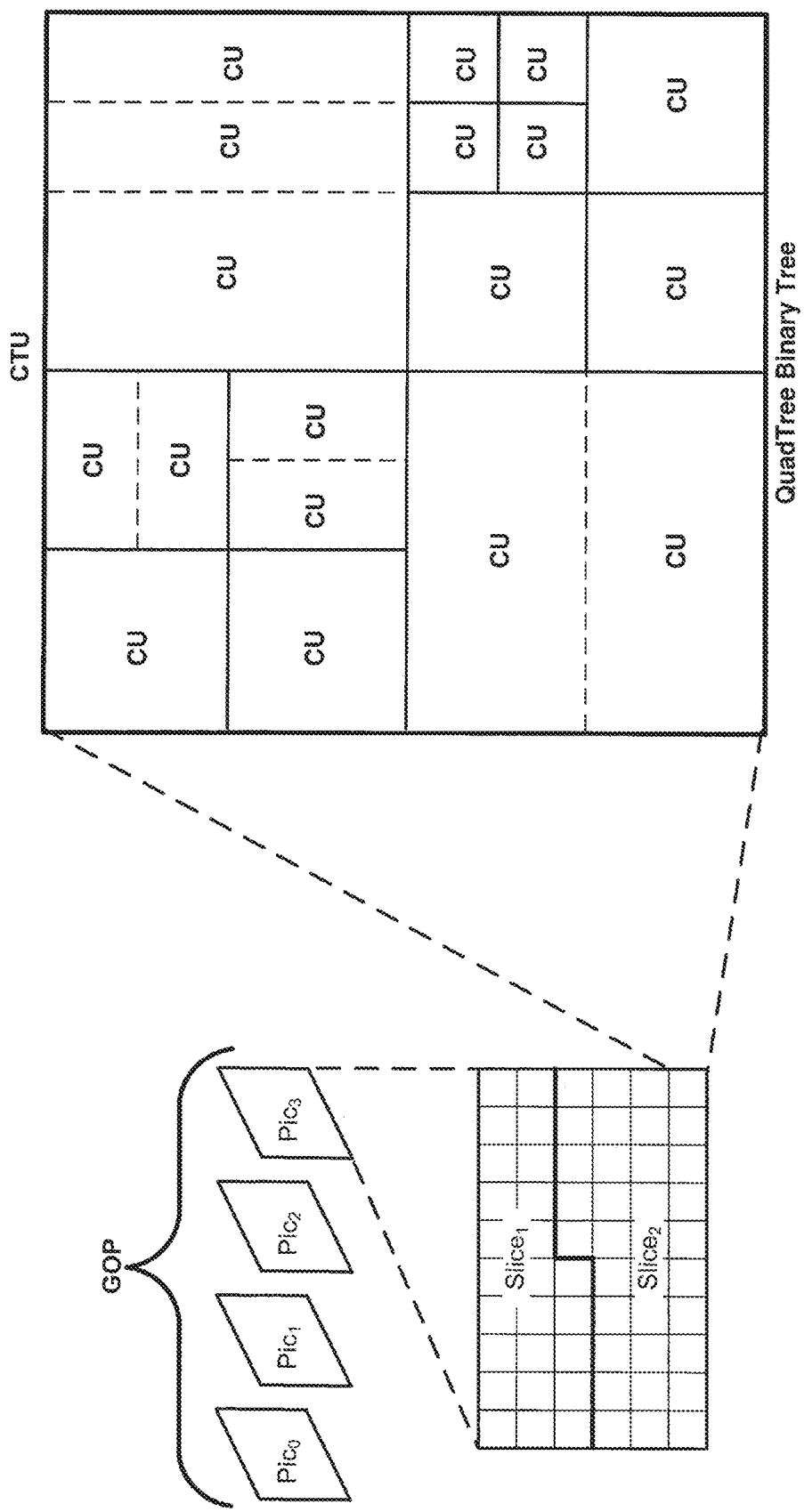
FIG. 1 is a conceptual diagram illustrating an example of a group of pictures coded according to a quad tree binary tree partitioning in accordance with one or more techniques of this disclosure.

In general, this disclosure describes various techniques for coding video data. In particular, this disclosure describes techniques for performing deblocking of reconstructed video data. It should be noted that although techniques of this disclosure are described with respect to ITU-T H.264. ITU-T H.265, and JEM, the techniques of this disclosure are generally applicable to video coding. For example, the coding techniques described herein may be incorporated into video coding systems, (including video coding systems based on future video coding standards) including block structures, intra prediction techniques, inter prediction techniques, transform techniques, filtering techniques, and/or entropy coding techniques other than those included in ITU-T H.265. Thus, reference to ITU-T H.264. ITU-T H.265 and JEM is for descriptive purposes and should not be construed to limit the scope of the techniques described herein. Further, it should be noted that incorporation by reference of documents herein should not be construed to limit or create ambiguity with respect to terms used herein. For example, in the case where an incorporated reference provides a different definition of a term than another incorporated reference and/or as the term is used herein, the term should be interpreted in a manner that broadly includes each respective definition and/or in a manner that includes each of the particular definitions in the alternative.

In one example, a device for video coding comprises one or more processors configured to receive an array of sample values including adjacent reconstructed video blocks for a component of video data, and modify sample values in the adjacent reconstructed video blocks according to multiple passes of a deblocking filter.

In one example, a non-transitory computer-readable storage medium comprises instructions stored thereon that, when executed, cause one or more processors of a device to receive an array of sample values including adjacent reconstructed video blocks for a component of video data, and modify sample values in the adjacent reconstructed video blocks according to multiple passes of a deblocking filter.

In one example, an apparatus comprises means for receiving an array of sample values including adjacent reconstructed video blocks for a component of video data, and means for modifying sample values in the adjacent reconstructed video blocks according to multiple passes of a deblocking filter.

The details of one or more examples are set forth in the accompanying drawings and the description below. Other features, objects, and advantages will be apparent from the description and drawings, and from the claims.

Video content typically includes video sequences comprised of a series of frames. A series of frames may also be referred to as a group of pictures (GOP). Each video frame or picture may include a plurality of slices or tiles, where a slice or tile includes a plurality of video blocks. As used herein, the term video block may generally refer to an area of a picture or may more specifically refer to the largest array of sample values that may be predictively coded, sub-divisions thereof, and/or corresponding structures. Further, the term current video block may refer to an area of a picture being encoded or decoded. A video block may be defined as an array of sample values that may be predictively coded. It should be noted that in some cases pixel values may be described as including sample values of respective components of video data, which may also be referred to as color components, (e.g., luma (Y) and chroma (Cb and Cr) components or red, green, and blue components). It should be noted that in some cases, the terms pixel values and sample values are used interchangeably. Video blocks may be ordered within a picture according to a scan pattern (e.g., a raster scan). A video encoder may perform predictive encoding on video blocks and sub-divisions thereof. Video blocks and sub-divisions thereof may be referred to as nodes.

ITU-T H.264 specifies a macroblock structure including 16×16 luma samples. That is, in ITU-T H.264, a picture is segmented into macroblocks. ITU-T H.265 specifies an analogous Coding Tree Unit (CTU) structure, which may also be referred to as a largest coding unit (LCU). In ITU-T H.265, pictures are segmented into CTUs. In ITU-T H.265, for a picture, a CTU size may be set as including 16×16, 32×32, or 64×64 luma samples. In ITU-T H.265, a CTU is composed of respective Coding Tree Blocks (CTB) for each component of video data (e.g., luma (Y) and chroma (Cb and Cr)). Further, in ITU-T H.265, a CTU may be partitioned according to a quadtree (QT) partitioning structure, which results in the CTBs of the CTU being partitioned into Coding Blocks (CB). That is, in ITU-T H.265, a CTU may be partitioned into quadtree leaf nodes. According to ITU-T H.265, one luma CB together with two corresponding chroma CBs and associated syntax elements are referred to as a coding unit (CU). In ITU-T H.265, a minimum allowed size of a CB may be signaled. In ITU-T H.265, the smallest minimum allowed size of a luma CB is 8×8 luma samples. In ITU-T H.265, the decision to code a picture area using intra prediction or inter prediction is made at the CU level.

In ITU-T H.265, a CU is associated with a prediction unit (PU) structure having its root at the CU. In ITU-T H.265, PU structures allow luma and chroma CBs to be split for purposes of generating corresponding reference samples. That is, in ITU-T H.265, luma and chroma CBs may be split into respect luma and chroma prediction blocks (PBs), where a PB includes a block of sample values for which the same prediction is applied. In ITU-T H.265, a CB may be partitioned into 1, 2, or 4 PBs. ITU-T H.265 supports PB sizes from 64×64 samples down to 4×4 samples. In ITU-T H.265, square PBs are supported for intra prediction, where a CB may form the PB or the CB may be split into four square PBs (i.e., intra prediction PB size types include M×M or M/2×M/2, where M is the height and width of the square CB). In ITU-T H.265, in addition to the square PBs, rectangular PBs are supported for inter prediction, where a CB may by halved vertically or horizontally to form PBs (i.e., inter prediction PB types include M×M, M/2×M/2. M/2×M, or M×M/2). Further, it should be noted that in ITU-T H.265, for inter prediction, four asymmetric PB partitions are supported, where the CB is partitioned into two PBs at one quarter of the height (at the top or the bottom) or width (at the left or the right) of the CB (i.e., asymmetric partitions include M/4×M left, M/4×M right, M×M/4 top, and M×M/4 bottom). Intra prediction data (e.g., intra prediction mode syntax elements) or inter prediction data (e.g., motion data syntax elements) corresponding to a PB is used to produce reference and/or predicted sample values for the PB.

JEM specifies a CTU having a maximum size of 256×256 luma samples. JEM specifies a quadtree plus binary tree (QTBT) block structure. In JEM, the QTBT structure enables quadtree leaf nodes to be further partitioned by a binary tree (BT) structure. That is, in JEM, the binary tree structure enables quadtree leaf nodes to be recursively divided vertically or horizontally. FIG. 1 illustrates an example of a CTU (e.g., a CTU having a size of 256×256 luma samples) being partitioned into quadtree leaf nodes and quadtree leaf nodes being further partitioned according to a binary tree. That is, in FIG. 1 dashed lines indicate additional binary tree partitions in a quadtree. Thus, the binary tree structure in JEM enables square and rectangular leaf nodes, where each leaf node includes a CB. As illustrated in FIG. 1, a picture included in a GOP may include slices, where each slice includes a sequence of CTUs and each CTU may be partitioned according to a QTBT structure. FIG. 1 illustrates an example of QTBT partitioning for one CTU included in a slice. Thus, the binary tree structure in JEM enables square and rectangular leaf nodes, where each leaf node includes a CB. In JEM, CBs are used for prediction without any further partitioning. That is, in JEM, a CB may be a block of sample values on which the same prediction is applied. Thus, a JEM QTBT leaf node may be analogous a PB in ITU-T H.265.

Figure 2:
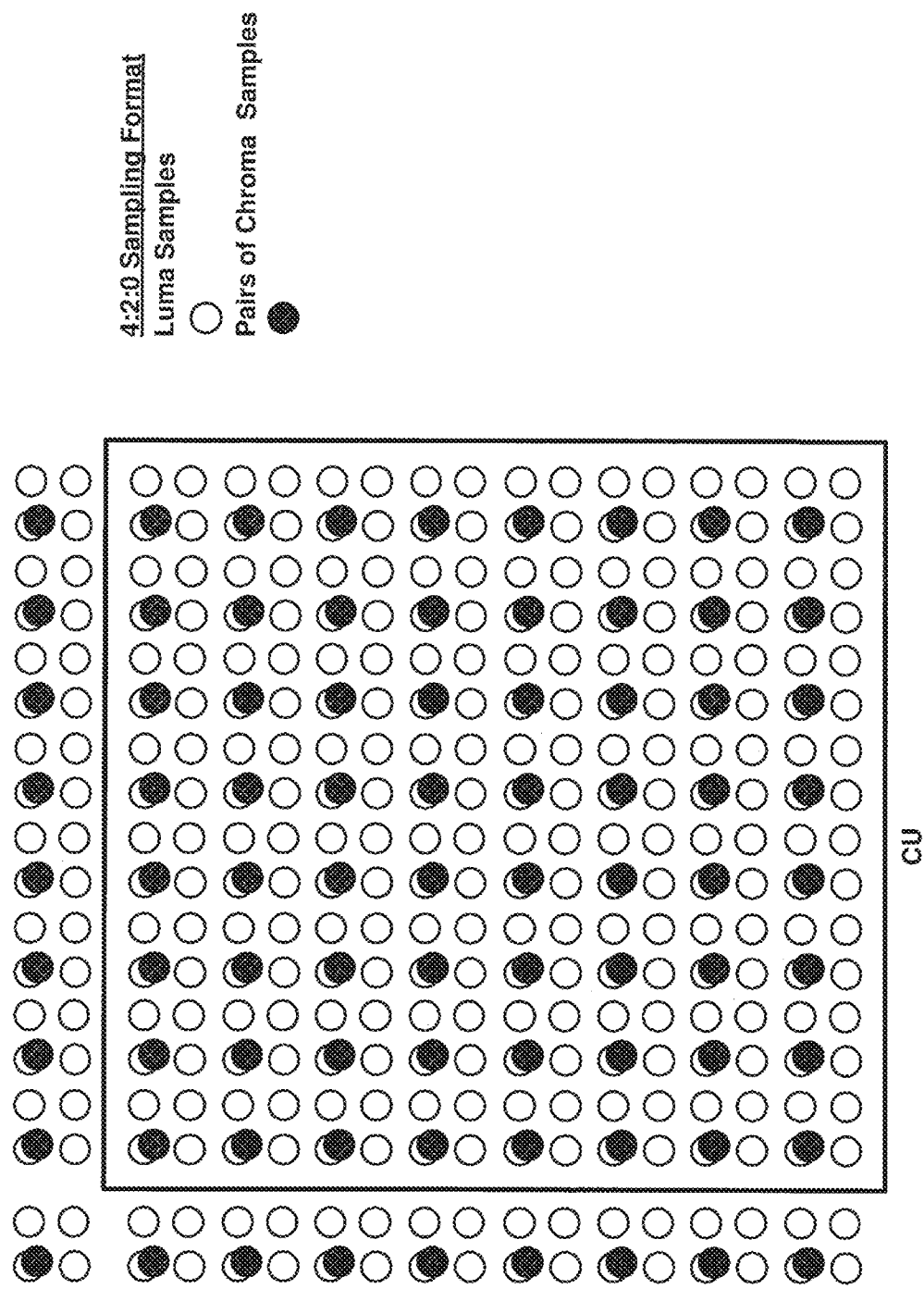
FIG. 2 is a conceptual diagram illustrating an example of a video component sampling format in accordance with one or more techniques of this disclosure.

A video sampling format, which may also be referred to as a chroma format, may define the number of chroma samples included in a CU with respect to the number of luma samples included in a CU. For example, for the 4:2:0 sampling format, the sampling rate for the luma component is twice that of the chroma components for both the horizontal and vertical directions. As a result, for a CU formatted according to the 4:2:0 format, the width and height of an array of samples for the luma component are twice that of each array of samples for the chroma components. FIG. 2 is a conceptual diagram illustrating an example of a coding unit formatted according to a 4:2:0 sample format. FIG. 2 illustrates the relative position of chroma samples with respect to luma samples within a CU. As described above, a CU is typically defined according to the number of horizontal and vertical luma samples. Thus, as illustrated in FIG. 2, a 16×16 CU formatted according to the 4:2:0 sample format includes 16×16 samples of luma components and 8×8 samples for each chroma component. Further, in the example illustrated in FIG. 2, the relative position of chroma samples with respect to luma samples for video blocks neighboring the 16×16 CU are illustrated. For a CU formatted according to the 4:2:2 format, the width of an array of samples for the luma component is twice that of the width of an array of samples for each chroma component, but the height of the array of samples for the luma component is equal to the height of an array of samples for each chroma component. Further, for a CU formatted according to the 4:4:4 format, an array of samples for the luma component has the same width and height as an array of samples for each chroma component.

As described above, intra prediction data or inter prediction data is used to produce reference sample values for a block of sample values. The difference between sample values included in a current PB, or another type of picture area structure, and associated reference samples (e.g., those generated using a prediction) may be referred to as residual data. Residual data may include respective arrays of difference values corresponding to each component of video data.

Figure 3:
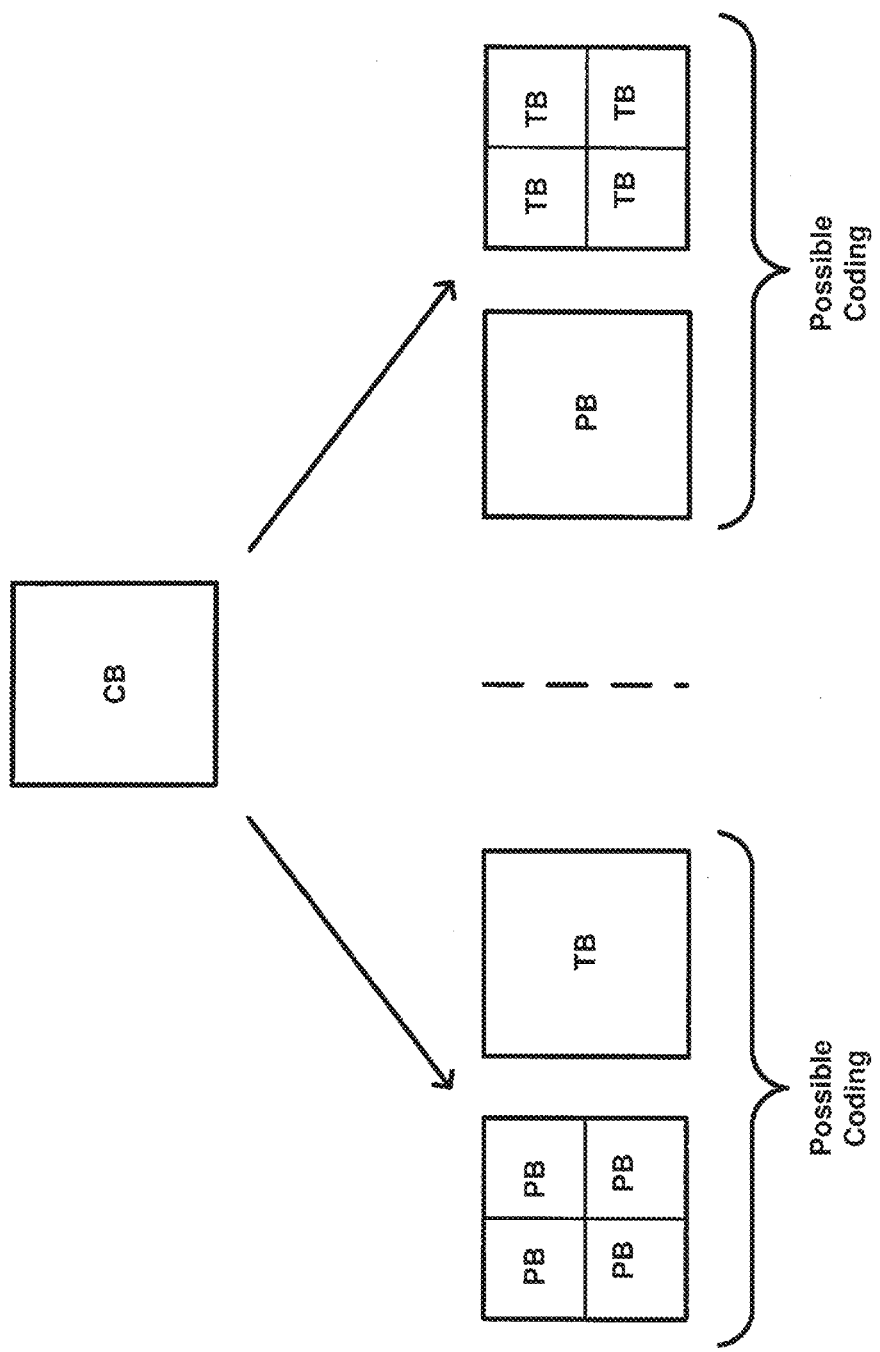
FIG. 3 is a conceptual diagram illustrating possible coding structures for a block of video data in accordance with one or more techniques of this disclosure.

Residual data may be in the pixel domain. A transform, such as, a discrete cosine transform (DCT), a discrete sine transform (DST), an integer transform, a wavelet transform, or a conceptually similar transform, may be applied to an array of difference values to generate transform coefficients. It should be noted that in ITU-T H.265, a CU is associated with a transform unit (TU) structure having its root at the CU level. That is, in ITU-T H.265, an array of difference values may be sub-divided for purposes of generating transform coefficients (e.g., four 8×8 transforms may be applied to a 16×16 array of residual values). For each component of video data, such sub-divisions of difference values may be referred to as Transform Blocks (TBs). It should be noted that in ITU-T H.265, TBs are not necessarily aligned with PBs. FIG. 3 illustrates examples of alternative PB and TB combinations that may be used for coding a particular CB. Further, it should be noted that in ITU-T H.265. TBs may have the following sizes 4×4, 8×8, 16×16, and 32×32. In JEM, residual values corresponding to a CB are used to generate transform coefficients without further partitioning. That is, in JEM a QTBT leaf node may be analogous to both a PB and a TB in ITU-T H.265. It should be noted that in JEM, a core transform and a subsequent secondary transforms may be applied (in the video encoder) to generate transform coefficients. For a video decoder, the order of transforms is reversed. Further, in JEM, whether a secondary transform is applied to generate transform coefficients may be dependent on a prediction mode.

Transform coefficients may be quantized according to a quantization process. Quantization approximates transform coefficients by amplitudes restricted to a set of specified values. Quantization may be used in order to vary the amount of data required to represent a group of transform coefficients. Quantization may be generally described as being realized through division of transform coefficients by a scaling factor and any associated rounding functions (e.g., rounding to the nearest integer). Thus, inverse quantization (or "dequantization") may include multiplication of coefficient level values by the scaling factor. It should be noted that as used herein the term quantization process in some instances may generally refer to division by a scaling factor to generate level values or multiplication by a scaling factor to recover transform coefficients in some instances. That is, a quantization process may refer to quantization in some cases and inverse quantization in some cases. A current block of video data is reconstructed by performing inverse quantization on level values, performing an inverse transform, and adding a set of prediction values to the resulting residual. The sample values of the reconstructed block may differ from the sample values of the current video block that were input into an encoding process. In this manner, coding may be said to be lossy. However, it should be noted that the difference in sample values may be considered acceptable to a viewer of the reconstructed video.

Figure 4A:
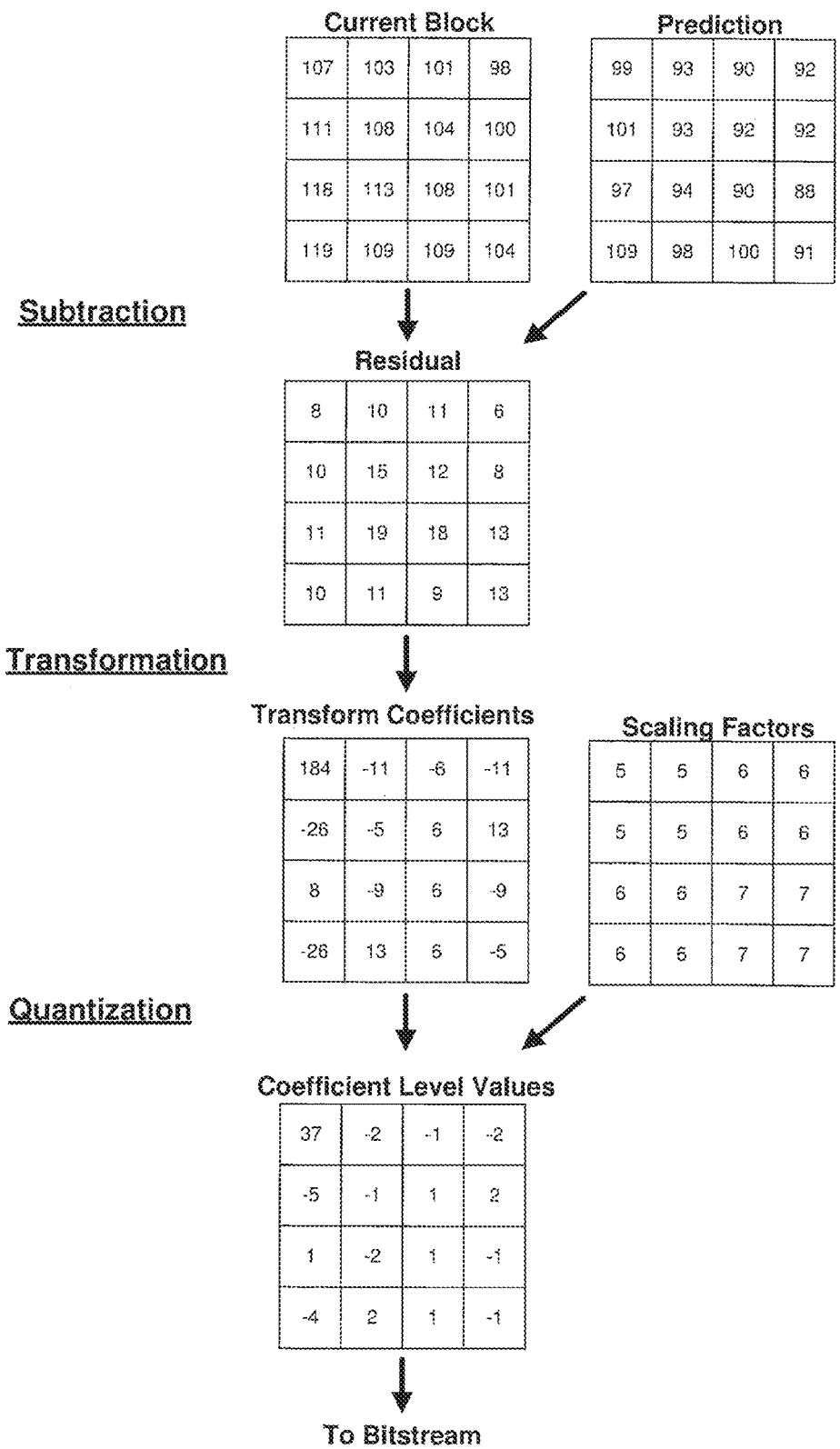
FIG. 4A is a conceptual diagrams illustrating examples of coding a block of video data in accordance with one or more techniques of this disclosure.
Figure 4B:
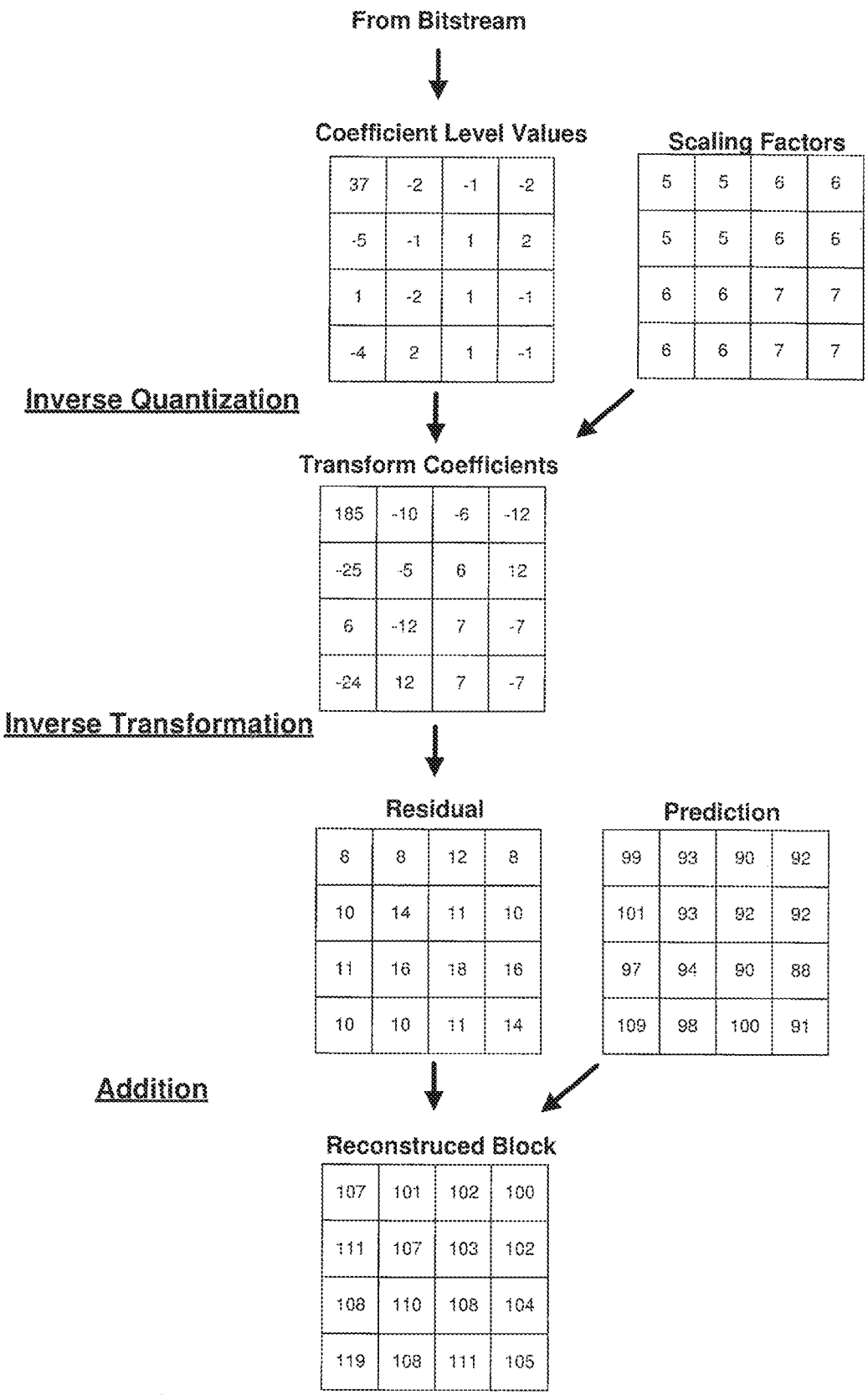
FIG. 4B is a conceptual diagrams illustrating examples of coding a block of video data in accordance with one or more techniques of this disclosure.

Quantized transform coefficients (which may be referred to as level values) may be entropy coded according to an entropy encoding technique (e.g., content adaptive variable length coding (CAVLC), context adaptive binary arithmetic coding (CABAC), probability interval partitioning entropy coding (PIPE), etc.). Further, syntax elements, such as, a syntax element indicating a prediction mode, may also be entropy coded. Entropy encoded quantized transform coefficients and corresponding entropy encoded syntax elements may form a compliant bitstream that can be used to reproduce video data. A binarization process may be performed on syntax elements as part of an entropy coding process. Binarization refers to the process of converting a syntax value into a series of one or more bits. These bits may be referred to as "bins." FIGS. 4A-4B are conceptual diagrams illustrating examples of coding a block of video data. As illustrated in FIG. 4A, a current block of video data (e.g., a CB corresponding to a video component) is encoded by generating a residual by subtracting a set of prediction values from the current block of video data, performing a transformation on the residual, and quantizing the transform coefficients to generate level values. As illustrated in FIG. 4B, the current block of video data is decoded by performing inverse quantization on level values, performing an inverse transform, and adding a set of prediction values to the resulting residual. It should be noted that in the examples in FIGS. 4A-4B, the sample values of the reconstructed block differs from the sample values of the current video block that is encoded. In this manner, coding may said to be lossy. However, the difference in sample values may be considered acceptable or imperceptible to a viewer of the reconstructed video.

As illustrated in FIG. 4A, quantized transform coefficients are coded into a bitstream. Quantized transform coefficients and syntax elements (e.g., syntax elements indicating a coding structure for a video block) may be entropy coded according to an entropy coding technique. Examples of entropy coding techniques include content adaptive variable length coding (CAVLC), context adaptive binary arithmetic coding (CABAC), probability interval partitioning entropy coding (PIPE), and the like. Entropy encoded quantized transform coefficients and corresponding entropy encoded syntax elements may form a compliant bitstream that can be used to reproduce video data at a video decoder. An entropy coding process may include performing a binarization on syntax elements. Binarization refers to the process of converting a value of a syntax value into a series of one or more bits. These bits may be referred to as "bins." Binarization is a lossless process and may include one or a combination of the following coding techniques: fixed length coding, unary coding, truncated unary coding, truncated Rice coding, Golomb coding, k-th order exponential Golomb coding, and Golomb-Rice coding. For example, binarization may include representing the integer value of 5 for a syntax element as 00000101 using an 8-bit fixed length binarization technique or representing the integer value of 5 as 11110 using a unary coding binarization technique. As used herein each of the terms fixed length coding, unary coding, truncated unary coding, truncated Rice coding, Golomb coding, k-th order exponential Golomb coding, and Golomb-Rice coding may refer to general implementations of these techniques and/or more specific implementations of these coding techniques. For example, a Golomb-Rice coding implementation may be specifically defined according to a video coding standard, for example. ITU-T H.265. An entropy coding process further includes coding bin values using lossless data compression algorithms. In the example of a CABAC, for a particular bin, a context model may be selected from a set of available context models associated with the bin. In some examples, a context model may be selected based on a previous bin and/or values of previous syntax elements. A context model may identify the probability of a bin having a particular value. For instance, a context model may indicate a 0.7 probability of coding a 0-valued bin and a 0.3 probability of coding a 1-valued bin. It should be noted that in some cases the probability of coding a 0-valued bin and probability of coding a 1-valued bin may not sum to 1. After selecting an available context model, a CABAC entropy encoder may arithmetically code a bin based on the identified context model. The context model may be updated based on the value of a coded bin. The context model may be updated based on an associated variable stored with the context, e.g., adaptation window size, number of bins coded using the context. It should be noted, that according to ITU-T H.265, a CABAC entropy encoder may be implemented, such that some syntax elements may be entropy encoded using arithmetic encoding without the usage of an explicitly assigned context model, such coding may be referred to as bypass coding.

As described above, intra prediction data or inter prediction data may associate an area of a picture (e.g., a PB or a CB) with corresponding reference samples. For intra prediction coding, an intra prediction mode may specify the location of reference samples within a picture. In ITU-T H.265, defined possible intra prediction modes include a planar (i.e., surface fitting) prediction mode (predMode: 0), a DC (i.e., flat overall averaging) prediction mode (predMode: 1), and 33 angular prediction modes (predMode: 2-34). In JEM, defined possible intra-prediction modes include a planar prediction mode (predMode: 0), a DC prediction mode (predMode: 1), and 65 angular prediction modes (predMode: 2-66). It should be noted that planar and DC prediction modes may be referred to as non-directional prediction modes and that angular prediction modes may be referred to as directional prediction modes. It should be noted that the techniques described herein may be generally applicable regardless of the number of defined possible prediction modes.

For inter prediction coding, a motion vector (MV) identifies reference samples in a picture other than the picture of a video block to be coded and thereby exploits temporal redundancy in video. For example, a current video block may be predicted from reference block(s) located in previously coded frame(s) and a motion vector may be used to indicate the location of the reference block. A motion vector and associated data may describe, for example, a horizontal component of the motion vector, a vertical component of the motion vector, a resolution for the motion vector (e.g., one-quarter pixel precision, one-half pixel precision, one-pixel precision, two-pixel precision, four-pixel precision), a prediction direction and/or a reference picture index value. Further, a coding standard, such as, for example ITU-T H.265, may support motion vector prediction. Motion vector prediction enables a motion vector to be specified using motion vectors of neighboring blocks. Examples of motion vector prediction include advanced motion vector prediction (AMVP), temporal motion vector prediction (TMVP), so-called "merge" mode, and "skip" and "direct" motion inference. Further, JEM supports advanced temporal motion vector prediction (ATMVP), Spatial-temporal motion vector prediction (STMVP). Pattern matched motion vector derivation (PMMVD) mode, which is a special merge mode based on Frame-Rate Up Conversion (FRUC) techniques, and affine transform motion compensation prediction techniques.

As described above, quantization may be realized through division of transform coefficients by a scaling factor and further may be used in order to vary the amount of data required to represent a group of transform coefficients. That is, increasing the scaling factor (or degree of quantization) reduces the amount of data required to represent a group coefficients. In ITU-T H.265, the degree of quantization may be determined by a quantization parameter, QP. In ITU-T H.265, for a bit-depth of 8-bits, the QP can take 52 values from 0 to 51 and a change of 1 for QP generally corresponds to a change in the value of the quantization scaling factor by approximately 12%. It should be noted that more generally, in ITU-T H.265, the valid range of QP values for a source bitdepth is: −6*(bitdepth-8) to +51 (inclusive). Thus, for example, in the case where the bit-depth is 10-bits, QP can take 64 values from −12 to 51, which may be mapped to values 0 to 63 during dequantization. In ITU-T H.265, a quantization parameter may be updated for each CU and a respective quantization parameter may be derived for each of luma and chroma components. It should be noted that as the degree of quantization increases (e.g., transform coefficients are divided by a larger scaling factor value), the amount of distortion may be increased (e.g., reconstructed video data may appear more "blocky" to a user).

In some cases, blocking artifacts may cause coding block boundaries of reconstructed video data to be visually perceptible to a user. In order to reduce blocking artifacts, reconstructed sample values may be modified to minimize artifacts introduced by the video coding process. Such modifications may generally be referred to as filtering. It should be noted that filtering may occur as part of an in-loop filtering process or a post-loop filtering process. For an in-loop filtering process, the resulting sample values of a filtering process may be used for predictive video blocks (e.g., stored to a reference frame buffer for subsequent encoding at a video encoder and subsequent decoding at a video decoder). For a post-loop filtering process the resulting sample values of a filtering process are merely output as part of the decoding process (e.g., not used for subsequent coding). For example, for an in-loop filtering process, the sample values resulting from filtering a reconstructed block would be used for subsequent decoding (e.g., stored to a reference buffer) and would be output (e.g., to a display). For a post-loop filtering process, the reconstructed block without modification would be used for subsequent decoding and the sample values resulting from filtering the reconstructed block would be output.

With respect to the equations used herein, the following arithmetic operators may be used:
+ Addition
− Subtraction
Multiplication, including matrix multiplication
/ Integer division with truncation of the result toward zero. For example, 7/4 and −7/−4 are truncated to 1 and −7/4 and 7/−4 am truncated to −1.

$$\sum_{i=x}^{y} f(i)$$

The summation of f(i) with i taking all integer values from x up to and including y.

Further, the following mathematical functions may be used:

$$Clip3(x, y, z) = \begin{cases} x & ; z < x \\ y & ; z > y \\ z & ; \text{otherwise} \end{cases}$$

Clip1c(x)=Clip3(0,(1<<BitDepth$_c$)−1, x), where is BitDepth$_c$ bitdepth of chroma channel
abs(x) is the absolute value of x $$Max(x, y) = \begin{cases} x & ; x >= y \\ y & ; x < y \end{cases}$$

Further, the following definitions of logical operators may be applied:
x && y Boolean logical "and" of x and y
x||y Boolean logical "or" of x and y
!Boolean logical "not"
x?y:z If x is TRUE or not equal to 0, evaluates to the value of y; otherwise, evaluates to the value of z.

Further, the following relational operators may be applied:
> Greater than
>= Greater than or equal to
< Less than
<= Less than or equal to
== Equal to
!= Not equal to Further, the following bit-wise operators may be applied:
x>>y Arithmetic right shift of a two's complement integer representation of x by y binary digits. This function is defined only for non-negative integer values of y. Bits shifted into the most significant bits (MSBs) as a result of the right shift have a value equal to the MSB of x prior to the shift operation.
x<<y Arithmetic left shift of a two's complement integer representation of x by y binary digits. This function is defined only for non-negative integer values of y. Bits shifted into the least significant bits (LSBs) as a result of the left shift have a value equal to 0.

Deblocking (or de-blocking), deblock filtering, performing deblocking, or applying a deblocking filter refers to the process of smoothing video block boundaries with neighboring reconstructed video blocks (i.e., making boundaries less perceptible to a viewer). Smoothing the boundaries of neighboring reconstructed video blocks may include modifying sample values included in rows or columns adjacent to a boundary. ITU-T H.265 provides where a deblocking filter is applied to reconstructed sample values as part of an in-loop filtering process. ITU-T H.265 includes two types deblocking filters that may be used for modifying luma samples: a Strong Filter which modifies sample values in the three adjacent rows or columns to a boundary and a Weak Filter which modifies sample values in the immediately adjacent row or column to a boundary and conditionally modifies sample values in the second row or column from the boundary. Further. ITU-T H.265 includes one type of filter that may be used for modifying chroma samples, i.e., a Normal Filter.

Figures 5A, 5B:
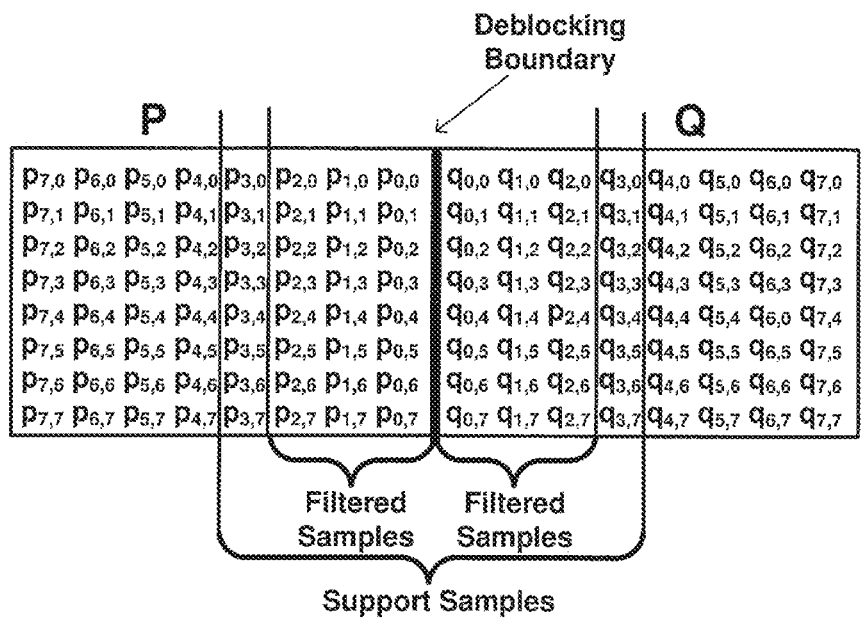
FIG. 5A is a conceptual diagrams illustrating blocks of video data including a deblocking boundary in accordance with one or more techniques of this disclosure.
FIG. 5B is a conceptual diagrams illustrating blocks of video data including a deblocking boundary in accordance with one or more techniques of this disclosure.

FIGS. 5A-5B illustrate sample values included in video blocks P and Q having a boundary. As used herein, video blocks P and Q are used to refer to adjacent video blocks having a block boundary at which deblocking may be applied. The manner in which sample values are modified may be based on defined filters, where pi and qi represent respective sample values in a column for a vertical boundary and sample values in a row for a horizontal boundary and pi' and qi' represent modified sample values. Defined filters may define samples that are to be modified (or filtered) and samples that are used to determine how samples are to be modified. For example, as illustrated in FIG. 5A, in one example, samples values in each of the first three columns adjacent to the deblocking boundary may be modified (illustrated as filtered samples) based on sample values includes in the each of the first four columns adjacent to the deblocking boundary (illustrated as support samples).

As described above, ITU-T H.265 includes two types of filters that may be used for modifying luma samples: a Strong Filter and a Weak Filter. Simplified definitions of the Strong Filter and Weak Filter equations for modifying luma sample values are provided below. The definitions are simplified in that they do not include clipping operations provided in ITU-T H.265 (i.e., in ITU-T H.265, filtered values are clipped based on a value tC, described below), however, reference is made to Section 8.7.2.5.7 of ITU-T H.265, which provides the complete definitions.

Strong Filter $$p_0'=(p_2+2*p_1+2*p_0+2*q_0+q_1+4)/8$$

$$p_1'=(p_2+p_1+p_0+q_0+2)/4$$

$$p_2'=(2'*p_3+3*p_2+p_1+p_0+q_0+4)/8$$

$$q_0'=(p_1+2*p_0+2*q_0+2*q_1+q_2+4)/8$$

$$q_1'=(p_0+q_0+q_1+q_2+2)/4$$

$$q_2'=(p_0+q_0+q_1+3*q_2+2*q_3+4)/8$$

Weak Filter $$\Delta=(9*(q_0-p_0)-3*(q_1-p_1)+8)/16$$

$$p_0'=p_0+\Delta$$

$$q_0'=q_0-\Delta$$

Where $p_1$ and $q_1$ are conditionally modified, as described below, as follows $$\Delta p=(p_2+p_0+1)/2-p_1+\Delta)/2$$

$$\Delta q=((q_2+p_0+1)/2-q_1\cdot\Delta)/2$$

$$p_1'=p_1+\Delta p$$

$$q_1'=q_1+\Delta q$$

Further, ITU-T H.265 includes one type of filter that may be used for modifying chroma samples: Normal Filter. Simplified definitions for the Normal Filter equations for modifying chroma sample values are provided below.

Normal Filter $$\Delta=((q_0-p_0)*4+p_1-q_1+4)/8$$

$$p_0'=p_0+\Delta$$

$$q_0'=q_0-\Delta$$

Deblocking may be performed based on a deblocking granularity. ITU-T H.265 provides an 8×8 deblocking granularity. That is, in ITU-T H.265 for an area of a picture, each edge lying on the 8×8 grid is evaluated to determine if a boundary exists. Further, in ITU-T H.265, a boundary strength (Bs) is determined for each boundary. In ITU-T H.265, Bs is determined as one of 0, 1, or 2 as follows:

P and Q are two adjacent coding blocks then the filter strength Bs is specified as:
  If one of the blocks (P or Q) has an intra prediction mode, then Bs=2;
    Else if P and Q belong to different TBs and P or Q has at least one non-zero
    transform coefficient, then Bs=1;
      Else if the reference pictures of P and Q are not equal, then Bs=1;
      Else if the difference between x or y motion vector component of P and Q is equal or greater than one integer sample, then Bs=1;
    Else, Bs=0.

In ITU-T H.265, based on the QP used for coding the CBs including video blocks P and Q (which may be referred to as $QP_P$ and $QP_Q$), variables $t_C'$ and $\beta'$ are determined. FIG. 6 provides a table for determining $t_C'$ and $\beta'$. In ITU-T H.265, the index Q is determined as follows:

For Luma:
For $\beta'$:

$$Q=\text{Clip3}(0,51,qP_L+(\text{slice\_beta\_offset\_div } 2<<1))$$

For $t_C'$ $$Q=\text{Clip3}(0,53,qP_L+2*(bS-1)+(\text{slice\_tc\_offset\_div } 2<<1)),$$

where, $$qP_L=(QP_Q+QP_P+1)/2;$$

slice_bela_offset_div 2 is an offset value that applies to the slice of video data that includes sample $q_{0,0}$; and
slice_tc_offset_div 2 is an offset value that applies to the slice of video data that includes sample $q_{0,0}$.

ITU-T H.265, variables $\beta$ and $t_C$ are derived as follows:

$$\beta=\beta'*((\text{BitDepth}_Y-8))$$

$$t_C=t_C'*(1<<(\text{BitDepth}_Y-8))$$

where, $\text{BitDepth}_Y$ specifies the bit depth of luma samples.

ITU-T H.265, defines a variable d, where d is determined based on luma sample values as follows:

$$dp0=\text{abs}(p_{2,0}-2*p_{1,0}+p_{0,0})$$

$$dp3=\text{abs}(p_{2,3}-2*p_{1,3}-p_{0,3})$$

$$dq0=\text{abs}(q_{2,0}-2*q_{1,0}+q_{0,0})$$

$$dq3=\text{abs}(q_{2,3}-2*q_{1,3}+q_{0,3})$$

$$dpq0=dp0+dq0$$

$$dpq3=dp3+dq3$$

$$dp=dp0+dp3$$

$$dq=dq0+dq3$$

$$d=dpq0+dpq3$$

Further, in ITU-T H.265 a variable dpq is set to a value based on the values of d and $\beta$. Finally, in ITU-T H.265, each of Bs, tC, $\beta$, and d are used to determine which filter type to apply (e.g., Strong Filter or Weak Filter). Further, in ITU-T H.265, for the chroma component, the Normal Filter is applied only when Bs equals 2. That is, in ITU-T H.265, deblocking only occurs for the chroma component if one the blocks P or Q is generated using an intra prediction mode.

It should be noted, that it may be useful to generally describe a deblocking filter according to a set of filter parameters. For example, for a set of sample values {a . . . b} included in a row or column, a corresponding deblocked sample value, y[n] may be specified based on the following equation:

$$y[n] = \sum_{m=a}^{b} coeff[m]x[n + m].$$

Where,
A filter length is determined as abs(a−b+1);
coeff[m] provides a filter tap value (also referred to as a filter coefficient). For example, for (a . . . b)=(0 . . . 4), a set of tap values may be {1, 2, 3, 2, 1};

x[n+m] provides input sample values corresponding to support samples, it should be noted that the support size may be greater than or equal to the filter length.

Further, in ITU-T H.265, the deblocking filter may be applied differently to CTU boundaries that coincide with slice and tile boundaries compared with CTU boundaries that do not coincide with slice and tile boundaries. Specifically, ITU-T H.265 specifies a flag, slice_loop_filter_across_slices_enabled_flag, present in a slice segment header that enables/disables the deblocking filter across CTU boundaries that coincide with top and left slice boundaries. ITU-T H.265 provides the following definition for slice_loop_filter_across_slices_enabled_flag:

slice_loop_filter_across_slices_enabled_flag equal to 1 specifies that in-loop filtering operations may be performed across the left and upper boundaries of the current slice. slice_loop_filter_across_slices_enabled_flag equal to 0 specifies that in-loop operations are not performed across left and upper boundaries of the current slice. The in-loop filtering operations include the deblocking filter and sample adaptive offset filter. When slice_loop_filter_across_slices_enabled_flag is not present, it is inferred to be equal to pps_loop_filter_across_slices_enabled_flag.

Where pps_loop_filter_across_slices_enabled_flag is present in a picture parameter set (PPS) and ITU-T H.265 provides the following definition for pps_loop_filter_across_slices_enabled_flag:

pps_loop_filter_across_slices_enabled_flag equal to 1 specifies that in-loop filtering operations may be performed across left and upper boundaries of slices referring to the PPS, pps_loop_filter_across_slices_enabled_flag_equal to 0 specifies that in-loop filtering operations are not performed across left and upper boundaries of slices referring to the PPS. The in-loop filtering operations include the deblocking filter and sample adaptive offset filter operations.

NOTE—Loop filtering across slice boundaries can be enabled while loop filtering across tile boundaries is disabled and vice versa.

Similarly, a flag, loop_filter_across_tiles_enabled_flag, present in a PPS enables/disables the deblocking filter across CTU boundaries that coincide with tile boundaries. ITU-T H.265 provides the following definition for loop_filter_across_tiles_enabled_flag:

loop_filter_across_tiles_enabled_flag equal to 1 specifies that in-loop filtering operations may be performed across tile boundaries in pictures referring to the PPS. loop_filter_across_tiles_enabled_flag equal to 0 specifies that in-loop filtering operations are not performed across tile boundaries in pictures referring to the PPS. The in-loop filtering operations include the deblocking filter and sample adaptive offset filter operations. When not present, the value of loop_filter_across_tiles_enabled_flag is inferred to be equal to 1.

As described above, for deblocking, the index Q is determined based on slice_beta_offset_div 2 and slice_tc_offset_div 2. In ITU-T H.265, the values of slice_beta_offset_div 2 and slice_tc_offset_div 2 may be included in a slice segment header and have the following definitions:

slice_beta_offset_div 2 and slice_tc_offset_div 2 specify the deblocking parameter offsets for β and $t_C$ (divided by 2) for the current slice. The values of slice_beta_offset_div 2 and slice_tc_offset_div 2 shall both be in the range of −6 to 6, inclusive. When not present, the values of slice_beta_offset_div 2 and slice_tc_offset_div 2 are inferred to be equal topps_beta_offset_div 2 and pps_tc_offset_div 2, respectively.

Where pps_beta_offset_div 2 and pps_tc_offset_div 2 are present in a PPS and ITU-T H.265 provides the following definition for pps_beta_offset_div 2 and pps_tc_offset_div 2:

pps_beta_offset_div 2 and pps_tc_offset_div 2 specify the default deblocking parameter offsets for β and $t_C$ (divided by 2) that are applied for slices referring to the PPS, unless the default deblocking parameter offsets are overridden by the deblocking parameter offsets present in the slice headers of the slices referring to the PPS. The values of pps_beta_offset_div 2 and pps_tc_offset_div 2 shall both be in the range of −6 to 6, inclusive. When not present, the value of pps_beta_offset_div 2 and pps_tc_offset_div 2 are inferred to be equal to 0.

As described above, ITU-T H.265 provides an 8×8 deblocking granularity. In JEM, deblocking is performed according to a grid specified by a variable minCUWidth for a horizontal boundary or a variable minCUHeight for a vertical boundary, where the default values of minCUWidth and minCUHeight are 4. A value of d is also determined in JEM where the calculation of d is same with that in ITU-T H.265. Based on the value of d above, a determination is made whether to perform deblocking on the boundary. That is, if d<β, a deblocking filter is used for the current boundary other. no deblocking is performed on the boundary. Further, in JEM a determination to use a strong or a weak filter is identical that in ITU-T H.265. Finally, in the JEM reference software, the luma filter coefficients for the strong deblocking filters is identical with the coefficients used in ITU-T H.265. Deblocking as performed in ITU-T H.265 and JEM may be less than ideal. In particular deblocking as perform in ITU-T H.265 and JEM fail to consider various coding parameters and properties of reconstructed video data when performing deblocking.

Figure 7:
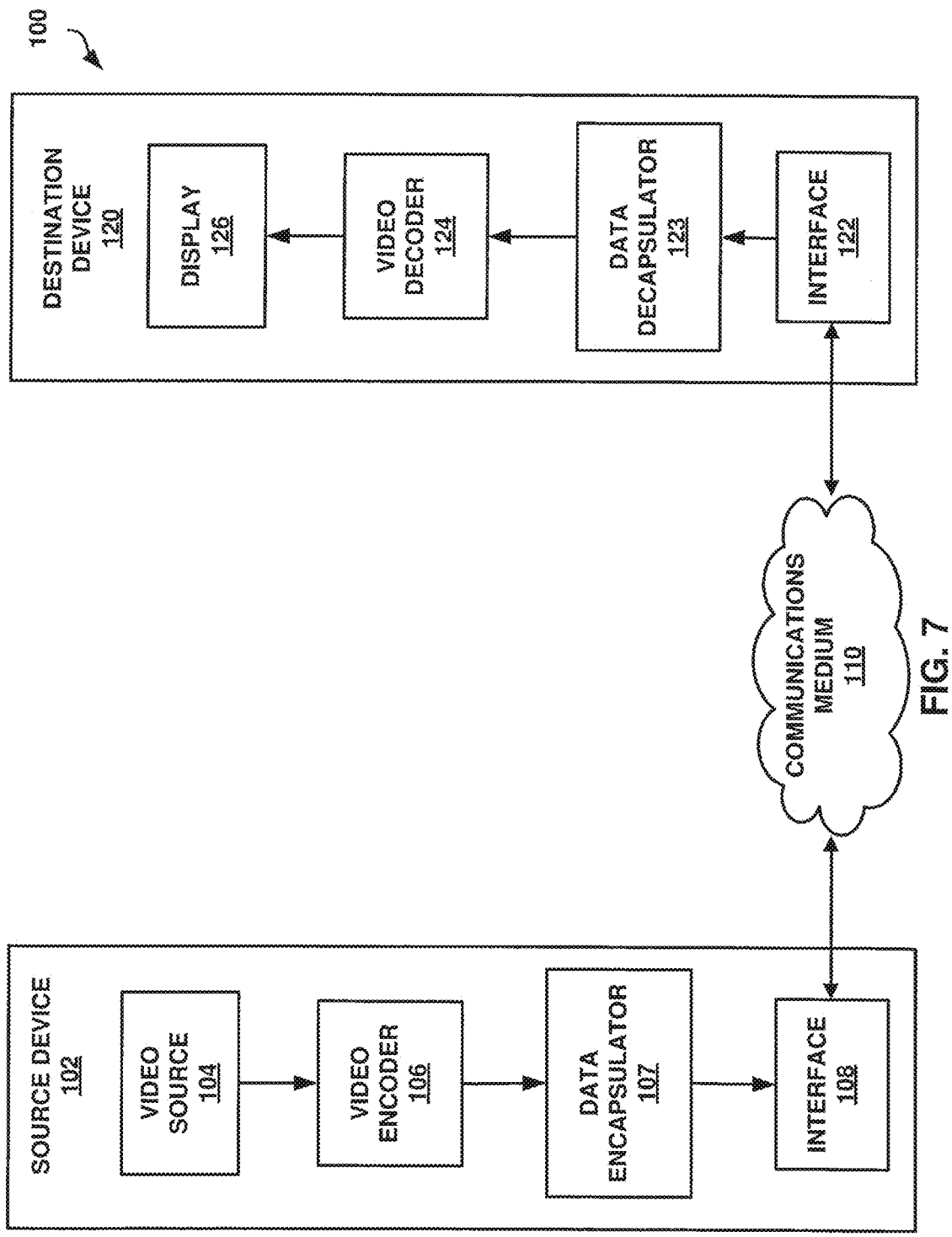
FIG. 7 is a block diagram illustrating an example of a system that may be configured to encode and decode video data according to one or more techniques of this disclosure.

FIG. 7 is a block diagram illustrating an example of a system that may be configured to code (i.e., encode and/or decode) video data according to one or more techniques of this disclosure. System 100 represents an example of a system that may encapsulate video data according to one or more techniques of this disclosure. As illustrated in FIG. 7, system 100 includes source device 102, communications medium 110, and destination device 120. In the example illustrated in FIG. 7, source device 102 may include any device configured to encode video data and transmit encoded video data to communications medium 110. Destination device 120 may include any device configured to receive encoded video data via communications medium 110 and to decode encoded video data. Source device 102 and/or destination device 120 may include computing devices equipped for wired and/or wireless communications and may include, for example, set top boxes, digital video recorders, televisions, desktop, laptop or tablet computers, gaming consoles, medical imagining devices, and mobile devices, including, for example, smartphones, cellular telephones, personal gaming devices.

Communications medium 110 may include any combination of wireless and wired communication media, and/or storage devices. Communications medium 110 may include coaxial cables, fiber optic cables, twisted pair cables, wireless transmitters and receivers, routers, switches, repeaters, base stations, or any other equipment that may be useful to facilitate communications between various devices and sites. Communications medium 110 may include one or more networks. For example, communications medium 110 may include a network configured to enable access to the World Wide Web, for example, the Internet. A network may operate according to a combination of one or more telecommunication protocols. Telecommunications protocols may include proprietary aspects and/or may include standardized telecommunication protocols. Examples of standardized telecommunications protocols include Digital Video Broadcasting (DVB) standards, Advanced Television Systems Committee (ATSC) standards, Integrated Services Digital Broadcasting (ISDB) standards, Data Over Cable Service Interface Specification (DOCSIS) standards, Global System Mobile Communications (GSM) standards, code division multiple access (CDMA) standards, 3rd Generation Partnership Project (3GPP) standards, European Telecommunications Standards Institute (ETSI) standards. Internet Protocol (IP) standards. Wireless Application Protocol (WAP) standards, and Institute of Electrical and Electronics Engineers (IEEE) standards.

Storage devices may include any type of device or storage medium capable of storing data. A storage medium may include a tangible or non-transitory computer-readable media. A computer readable medium may include optical discs, flash memory, magnetic memory, or any other suitable digital storage media. In some examples, a memory device or portions thereof may be described as non-volatile memory and in other examples portions of memory devices may be described as volatile memory. Examples of volatile memories may include random access memories (RAM), dynamic random access memories (DRAM), and static random access memories (SRAM). Examples of non-volatile memories may include magnetic hard discs, optical discs, floppy discs, flash memories, or forms of electrically programmable memories (EPROM) or electrically erasable and programmable (EEPROM) memories. Storage device(s) may include memory cards (e.g., a Secure Digital (SD) memory card), internal/external hard disk drives, and/or internal/external solid state drives. Data may be stored on a storage device according to a defined file format.

Referring again to FIG. 7, source device 102 includes video source 104, video encoder 106, data encapsulator 107, and interface 108. Video source 104 may include any device configured to capture and/or store video data. For example, video source 104 may include a video camera and a storage device operably coupled thereto. Video encoder 106 may include any device configured to receive video data and generate a compliant bitstream representing the video data. A compliant bitstream may refer to a bitstream that a video decoder can receive and reproduce video data therefrom. Aspects of a compliant bitstream may be defined according to a video coding standard. When generating a compliant bitstream video encoder 106 may compress video data. Compression may be lossy (discernible or indiscernible to a viewer) or lossless.

Figure 8:
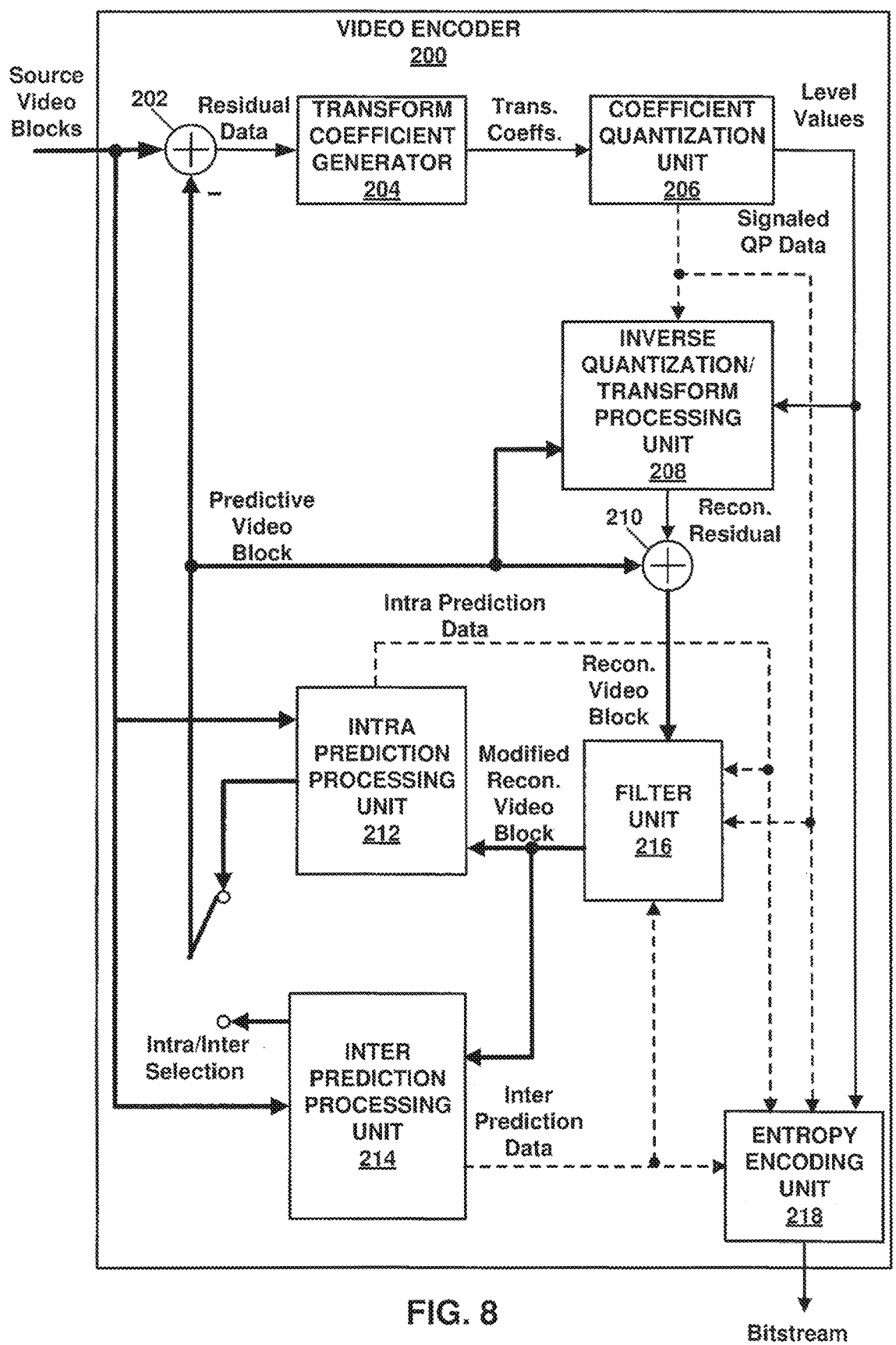
FIG. 8 is a block diagram illustrating an example of a video encoder that may be configured to encode video data according to one or more techniques of this disclosure.

FIG. 8 is a block diagram illustrating an example of video encoder 200 that may implement the techniques for encoding video data described herein. It should be noted that although example video encoder 200 is illustrated as having distinct functional blocks, such an illustration is for descriptive purposes and does not limit video encoder 200 and/or sub-components thereof to a particular hardware or software architecture. Functions of video encoder 200 may be realized using any combination of hardware, firmware, and/or software implementations. In one example, video encoder 200 may be configured to encode video data according to the techniques described herein. Video encoder 200 may perform intra prediction coding and inter prediction coding of picture areas, and, as such, may be referred to as a hybrid video encoder. In the example illustrated in FIG. 8, video encoder 200 receives source video blocks. In some examples, source video blocks may include areas of picture that has been divided according to a coding structure. For example, source video data may include macroblocks, CTUs, CBs, sub-divisions thereof, and/or another equivalent coding unit. In some examples, video encoder may be configured to perform additional sub-divisions of source video blocks. It should be noted that the techniques described herein are generally applicable to video coding, regardless of how source video data is partitioned prior to and/or during encoding. In the example illustrated in FIG. 9, video encoder 200 includes summer 202, transform coefficient generator 204, coefficient quantization unit 206, inverse quantization/transform processing unit 208, summer 210, intra prediction processing unit 212, inter prediction processing unit 214, filter unit 216, and entropy encoding unit 218. As illustrated in FIG. 8, video encoder 200 receives source video blocks and outputs a bitstream.

In the example illustrated in FIG. 8, video encoder 200 may generate residual data by subtracting a predictive video block from a source video block. Summer 202 represents a component configured to perform this subtraction operation. In one example, the subtraction of video blocks occurs in the pixel domain. Transform coefficient generator 204 applies a transform, such as a discrete cosine transform (DCT), a discrete sine transform (DST), or a conceptually similar transform, to the residual block or subdivisions thereof (e.g., four 8×8 transforms may be applied to a 16×16 array of residual values) to produce a set of residual transform coefficients. Transform coefficient generator 204 may be configured to perform any and all combinations of the transforms included in the family of discrete trigonometric transforms. Transform coefficient generator 204 may output transform coefficients to coefficient quantization unit 206.

Coefficient quantization unit 206 may be configured to perform quantization of the transform coefficients. As described above, the degree of quantization may be modified by adjusting a quantization scaling factor which may be determined by quantization parameters. Coefficient quantization unit 206 may be further configured to determine quantization values and output QP data that may be used by a video decoder to reconstruct a quantization parameter to perform inverse quantization during video decoding. For example, signaled QP data may include QP delta values. In ITU-T H.265, the degree of quantization applied to a set of transform coefficients may depend on slice level parameters, parameters inherited from a previous coding unit, and/or optionally signaled CU level delta values.

As illustrated in FIG. 8, quantized transform coefficients are output to inverse quantization/transform processing unit 208. Inverse quantization/transform processing unit 208 may be configured to apply an inverse quantization and/or an inverse transformation to generate reconstructed residual data. As illustrated in FIG. 8, at summer 210, reconstructed residual data may be added to a predictive video block. In this manner, an encoded video block may be reconstructed and the resulting reconstructed video block may be used to evaluate the encoding quality for a given quality for a given prediction, transformation type, and/or level of quantization. Video encoder 200 may be configured to perform multiple coding passes (e.g., perform encoding while varying one or more coding parameters). The rate-distortion of a bitstream or other system parameters may be optimized based on evaluation of reconstructed video blocks. Further, reconstructed video blocks may be stored and used as reference for predicting subsequent blocks.

As described above, a video block may be coded using an intra prediction. Intra prediction processing unit 212 may be configured to select an intra prediction mode for a video block to be coded. Intra prediction processing unit 212 may be configured to evaluate a frame and/or an area thereof and determine an intra prediction mode to use to encode a current block. As illustrated in FIG. 8, intra prediction processing unit 212 outputs intra prediction data (e.g., syntax elements) to filter unit 216 and entropy encoding unit 218.

Inter prediction processing unit 214 may be configured to perform inter prediction coding for a current video block. Inter prediction processing unit 214 may be configured to receive source video blocks and calculate a motion vector for PUs, or the like, of a video block. A motion vector may indicate the displacement of a PU, or the like, of a video block within a current video frame relative to a predictive block within a reference frame. Inter prediction coding may use one or more reference pictures. Further, motion prediction may be uni-predictive (use one motion vector) or bipredictive (use two motion vectors). Inter prediction processing unit 214 may be configured to select a predictive block by calculating a pixel difference determined by, for example, sum of absolute difference (SAD), sum of square difference (SSD), or other difference metrics. A motion vector and associated data may describe, for example, a horizontal component of the motion vector, a vertical component of the motion vector, a resolution for the motion vector (e.g., one-quarter pixel precision), a prediction direction and/or a reference picture index value. Further, a coding standard, such as, for example ITU-T H.265, may support motion vector prediction. Motion vector prediction enables a motion vector to be specified using motion vectors of neighboring blocks. Examples of motion vector prediction include advanced motion vector prediction (AMVP), temporal motion vector prediction (TMVP), so-called "merge" mode, and "skip" and "direct" motion inference. Inter prediction processing unit 214 may be configured to perform motion vector prediction according to one or more of the techniques described above. Inter prediction processing unit 214 may be configured to generate a predictive block using the motion prediction data. For example, inter prediction processing unit 214 may locate a predictive video block within a frame buffer (not shown in FIG. 8). It should be noted that inter prediction processing unit 214 may further be configured to apply one or more interpolation filters to a reconstructed residual block to calculate sub-integer pixel values for use in motion estimation. Inter prediction processing unit 214 may output motion prediction data for a calculated motion vector to filter unit 216 and entropy encoding unit 218.

As described above, deblocking refers to the process of smoothing the boundaries of reconstructed video blocks. As illustrated in FIG. 8, filter unit 216 receives reconstructed video blocks and coding parameters (e.g., intra prediction data, inter prediction data, and QP data) and outputs modified reconstructed video data. Filter unit 216 may be configured to perform deblocking and/or Sample Adaptive Offset (SAO) filtering. SAO filtering is a non-linear amplitude mapping that may be used to improve reconstruction by adding an offset to reconstructed video data. It should be noted that as illustrated in FIG. 8, intra prediction processing unit 212 and inter prediction processing unit 214 may receive modified reconstructed video block via filter unit 216. That is, in some cases, deblocking may occur in-loop, i.e., predictive video blocks stored in a reference buffer may be filtered. In some cases, deblocking may occur post-loop, i.e., after video data has been reconstructed and prior to being output to a display, for example. The techniques described herein may be applicable in-loop deblocking, post-loop deblocking, and/or combinations thereof.

As described above, deblocking as performed in ITU-T H.265 and JEM may be less than ideal. In one example, according to the techniques herein, filter unit 216 may be configured to select different filtering lines (in some cases, the number of samples deblocked on each side of boundary may be different) based on one or more of: block size on each side of boundary (one or both), boundary strength, prediction mode used by blocks on each side of boundary, prediction mode (e.g. intra, inter, skip) of sample being deblocked (e.g., use weaker filter for boundary close to reference samples), QP value of sample being deblocked, block size corresponding to the sample being deblocked, block size corresponding to the samples being used for deblocking, motion vectors for blocks on each side of boundary being deblocked, motion vectors for sample being deblocked, and/or motion vectors for sample being used for deblocking.

Samples on each side of a block boundary (perpendicular to the boundary edge) may be represented as:

$$\ldots p_8\, p_7\, p_6\, p_5\, p_4\, p_3\, p_2\, p_1\, p_0 | q_0\, q_1\, q_2\, q_3\, q_4\, q_5\, q_6\, q_7\, q_8 \ldots$$

Where,

| represents the block boundary edge.

The samples $p_x$, where x is a positive integer starting at 0, represents the P-side of the boundary. The samples $q_y$, where y is a positive integer starting at 0, represents the Q-side of the boundary.

In an example, P-side represents samples outside the current CU, Q-side represents samples inside the current CU.

In an example, P-side represents samples inside the current CU, Q-side represents samples outside the current CU.

In an example, P-side represents samples outside the current block, Q-side represents samples inside the current block.

In an example, P-side represents samples inside the current block, Q-side represents samples outside the current block.

Referring FIG. 5A, samples $p_{y,x}$ and $q_{y,x}$ correspond to line R[x] when deblocking vertical edge.

Referring FIG. 5B, samples $p_{y,x}$ and $q_{y,x}$ correspond to line R[y] when deblocking horizontal edge.

One example of a wider (i.e. larger number of samples deblocked), stronger filter for P-side of the boundary, referred to as WS00P P-side filter, is:

$$p_6'=(7*p_7+2*p_6+p_5+p_4+p_3+p_2+p_1+p_0 q_0+8)>>4$$

$$p_5'=(6*p_7+p_6+2*p_5+p_4+p_3+p_2+p_1+p_0+q_0+q_1+8)>>4$$

$$p_4'=(5*p_7+p_6+p_5+2*p_4+p_3+p_2+p_1+p_0+q_0+q_1+q_2+8)>>4$$

$$p_3'=(4*p_7+p_6+p_5+p_4+2*p_3+p_2+p_1+p_0+q_1+q_2+q_3+8)>>4$$

$$p_2'=(3*p_7+p_6+p_5+p_4+p_3+2*p_2+p_1+p_0+q_0+q_1+q_2+q_3+q_4+8)>>4$$

$$p_1'=(2*p_7+p_6+p_5+p_4+p_3+p_2+2*p_1+p_0+q_0+q_1+q_2+q_3+q_4+q_5+8)>>4$$

$$p_0'=(p_7+p_6+p_5+p_4+p_3+p_2+p_1+2*p_0+q_0+q_1+q_2+q_3+q_4+q_5+q_6+8)>>4$$

where, $p_x'$ represents the sample value after deblocking at position corresponding to p One example of a wider (i.e. larger number of samples deblocked), stronger filter for Q-side of the boundary, referred to as WS00Q Q-side filter, is:

$$q_6'=(7*q_7+2*q_6+q_5+q_4+q_3+q_2+q_1+q_0p_0+8)>>4$$

$$q_5'=(6*q_7+q_6+2*q_5+q_4+q_3+q_2+q_1+q_0+p_0+p_1+8)>>4$$

$$q_4'=(5*q_7+q_6+q_5+2*q_4+q_3+q_2+q_1+q_0+p_0+p_1+p_2+8)>>4$$

$$q_3'=(4*q_7+q_6+q_5+q_4+2*q_3+q_2+q_1+q_0+p_1+p_2+p_3+8)>>4$$

$$q_2'=(3*q_7+q_6+q_5+q_4+q_3+2*q_2+q_1+q_0+p_0+p_1+p_2+p_3+p_4+8)>>4$$

$$q_1'=(2*q_7+q_6+q_5+q_4+q_3+q_2+2*q_1+q_0+p_0+p_1+p_2+p_3+p_4+p_5+8)>>4$$

$$q_0'=(q_7+q_6+q_5+q_4+q_3+q_2+q_1+2*q_0+p_0+p_1+p_2+p_3+p_4+p_5+p_6+8)>>4$$

where, $q_x'$ represents the sample value after deblocking al position corresponding to q, One example of a narrow (i.e. smaller number of samples deblocked), strong filter for P-side of the boundary, referred to as HEVC_P P-side filter, is:

$$p_0'=(p_2+2*p_1+2*p_0+2*q_0+q_1+4)>>3$$

$$p_1'=(p_2+p_1+p_0+q_0+2)>>2$$

$$p_1'=(2*p_3+3*p_2+p_1+p_0+q_0+4)>>3$$

where, $p_x'$ represents the sample value after deblocking at position corresponding to $p_x$ One example of a narrow (i.e. smaller number of samples deblocked), strong filter for Q-side of the boundary, referred to as HEVC_Q Q-side filter, is:

$$q_0'=(p_1+2*p_0+2*q_0+2*q_1+q_2+4)>>3$$

$$q_1'=(p_0+q_0+q_1+q_2+2)>>2$$

$$q_2'=(p_0+q_0+q_1+3*q_2+2*q_3+4)>>3$$

where, $q_x'$ represents the sample value after deblocking at position corresponding to $q_x$ One example of a narrow (smaller number of samples deblocked), strong filter for P-side of the boundary, referred to as NS00P P-side filter, is:

$$p_0'=(p_2+2*p_1+2*p_0+2*q_0+q_1+4)>>3$$

$$p_1'=(p_2+p_1+p_0+q_0+4)>>3$$

$$p_2'=(p_4+2*p_3+3*p_2+p_1+p_0+4)>>3$$

where, $p_x'$ represents the sample value after deblocking at position corresponding to $p_x$ One example of a narrow (smaller number of samples deblocked), strong filter for Q-side of the boundary, referred to as NS00Q Q-side filter, is:

$$q_0'=(q_2+2*q_1+2*q_0+2*p_0+p_1+4)>>3$$

$$q_1'=(q_2+q_1+q_0+p_0+4)>>3$$

$$q_2'=(q_4+2*q_3+3*q_2+q_1+q_0+4)>>3$$

where, $q_x'$ represents the sample value after deblocking at position corresponding to $q_x$ One example of a narrow (smaller number of samples deblocked), strong filter for P-side of the boundary, referred to as NS00P P-side filter, is:

$$p_0'=(p_2+2*p_1+2*p_0+2*q_0+q_1+4)>>3$$

$$p_1'=(p_2+p_1+p_0+q_0+2)>>2$$

$$p_2'(p_4+2*p_3+3*p_2+p_1+p_0+4)>>3$$

One example of a narrow (smaller number of samples deblocked), strong filter for Q-side of the boundary, referred to as NS00Q Q-side filter, is:

$$q_0'=(q_2+2*q_1+2*q_0+2*p_0+p_1+4)>>3$$

$$q_1'=(q_2+q_1+q_0+p_0+2)>>2$$

$$q_2'=(q_4+2*q_1+3*q_2+q_1+q_0+4)>>3$$

One example of a narrow (smaller number of samples deblocked), strong filter for P-side of the boundary, referred to as NS00P P-side filter, is:

$$p_0'=(p_2+2*p_1+2*p_0+2*q_0+q_1+4)>>3$$

$$p_1'=(p_2+p_1+p_0+q_0+2)>>2$$

$$p_2'=(2*p_3+3*p_2+p_1+p_0+q_0+4)>>3$$

One example of a narrow (smaller number of samples deblocked), strong filter for Q-side of the boundary, referred to as NS00Q Q-side filter, is:

$$q_0'=(q_2+2*q_1+2*q_0+2*p_0+p_1+4)>>3$$

$$q_1'=(q_2*+q_1+q_0+p_0+2)>>2$$

$$q_2'=(2*q_3+3*q_2+q_1+q_0+p_0+4)>>3$$

One example of a narrow (smaller number of samples deblocked), weak filter for P-side of the boundary, referred to as NW00P P-side filter, is:

$$\Delta=\text{Clip3}(-t_C,t_C,((((q_0-p_0)<<2)+p_1-q_1+4)>>3))$$

$$p_0'=\text{Clip1}_C(p_0+\Delta)$$

where, $p_x'$ represents the sample value after deblocking at position corresponding to p One example of a narrow (smaller number of samples deblocked), weak filter for Q-side of the boundary, referred to as NW00Q Q-side filter, is:

$$\Delta==\text{Clip3}(-t_C,t_C,((((q_0-p_0)<<2)+p_1-q_1+4)>>3))$$

$$q_0'=\text{Clip1}_C(q_0-\Delta)$$

where, $q_x'$ represents the sample value after deblocking at position corresponding to q, One example of a filter for P-side of the boundary, referred to as FOP P-side filter, is:

$$p_0'=(136*p_8+120*q_8+128)>>8$$

$$p_1'=(151*p_7+105*q_9+128)>>8$$

$$p_2'=(166*p_6+90*q_{10}+128)>>8$$

$$p_3'=(181*p_5+75*q_{11}+128)>>8$$

$$p_4'=(196*p_4+60*q_{12}+128)>>8$$

$$p_5'=(211*p_3+45*q_{13}+128)>>8$$

$$p_6'=(226*p_2+30*q_{14}+128)>>8$$

$$p_7'=(241*p_1+15*q_{15}+128)>>8$$

One example of a filter for Q-side of the boundary, referred to as F0Q Q-side filter, is:

$q_0' = (120*p_9 + 136*q_7 + 128) >> 8$ $q_1' = (105*p_{10} + 151*q_6 + 128) >> 8$ $q_2' = (90*p_{11} + 166*q_5 + 128) >> 8$ $q_3' = (75*p_{12} + 181*q_4 + 128) >> 8$ $q_4' = (60*p_{13} + 196*q_3 + 128) >> 8$ $q_5' = (45*p_{14} + 211*q_2 + 128) >> 8$ $q_6' = (30*p_{15} + 226*q_1 + 128) >> 8$ $q_7' = (15*p_{16} + 241*q_0 + 128) >> 8$

One example of a filter for P-side of the boundary, referred to as F1P P-side filter, is:

$p_0' = (2*p_1 + 4*p_0 + q_0 + q_1 + 4) >> 3$ $p_1' = (2*p_2 + 4*p_1 + p_0 + q_0 + 4) >> 3$ $p_2' = (p_3 + p_2 + p_1 + p_0 + 2) >> 2$ $p_3' = (p_4 + p_3 + p_2 + p_1 + 2) >> 2$

One example of a filter for Q-side of the boundary, referred to as F1Q Q-side filter, is:

$q_0' = (2*q_1 + 4*q_0 + p_0 + p_1 + 4) >> 3$ $q_1' = (2*q_2 + 4*q_1 + q_0 + p_0 + 4) >> 3$ $q_2' = (q_3 + q_2 + q_1 + q_0 + 2) >> 2$ $q_3' = (q_4 + q_3 + q_2 + q_1 + 2) >> 2$

In one example, the distance of a sample being deblocked from the boundary may be inversely proportional to the distance between the support sample assigned the largest tap value and the sample being deblocked. Further, the distance of a second largest tap value from a sample being deblocked may be proportional to the distance of the sample from the boundary. Filters F2P and F2Q described below provide example implementations of such a filtering. One example of a filter for P-side of the boundary, referred to as F2P P-side filter, is:

$p_0' = (136*p_8 + 2*p_0 + 120*q_8 + 256) >> 9$ $p_1' = (151*p_7 + 4*p_1 + 105*q_9 + 256) >> 9$ $p_2' = (166*p_6 + 8*p_2 + 90*q_{10} + 256) >> 9$ $p_3' = (181*p_5 + 16*p_3 + 75*q_{11} + 256) >> 9$ $p_4' (196*p_4 + 32*p_4 + 60*q_{12} + 256) >> 9$ $p_5' = (211*p_3 + 64*p_5 + 45*q_{13} + 256) >> 9$ $p_6' = (226*p_2 + 128*p_6 + 30*q_{14} + 256) >> 9$ $p_7' = (241*p_1 + 256*p_7 + 15*q_{15} + 256) >> 9$

One example of a filter for Q-side of the boundary, referred to as F2Q Q-side filter, is:

$q_0' = (120*p_9 + 2*q_0 + 136*q_7 + 256) >> 9$ $q_1' = (105*p_{10} + 4*q_1 + 151*q_6 + 256) >> 9$ $q_2' = (90*p_{11} + 8*q_2 + 166*q_5 + 256) >> 9$ $q_3' = (75*p_{12} + 16*q_3 + 181*q_4 + 256) >> 9$ $q_4' = (60*p_{13} + 32*q_4 + 196*q_3 + 256) >> 9$ $q_5' = (45*p_{14} + 64*q_5 + 211*q_2 + 256) >> 9$ $q_6' = (30*p_{15} + 128*q_6 + 226*q_1 + 256) >> 9$ $q_7' = (15*p_{16} + 256*q_7 + 241*q_0 + 256) >> 9$

One example of a filter for P-side of the boundary, referred to as F4P P-side filter, is:

$p_6' = (7*p_7 + 2*p_6 + p_5 + p_4 + p_3 + p_2 + p_1 + p_0 + q_0 + 8) >> 4$ $p_5' = (6*p_7 + p_6 + 2*p_5 + p_4 + p_3 + p_2 + p_1 + p_0 + q_0 + q_1 + 8) >> 4$ $p_4' = (5*p_7 + p_6 + p_5 + 2*p_4 + p_3 + p_2 + p_1 + p_0 + q_0 + q_1 + q_2 + 8) >> 4$ $p_3' = (4*p_7 + p_6 + p_5 + p_4 + p_3 + 2*p_3 + p_2 + p_1 + p_0 + q_0 + q_1 + q_2 + q_3 + 8) >> 4$ $p_2' = (3*p_7 + p_6 + p_5 + p_4 + p_3 + 2*p_2 + p_1 + p_0 + q_0 + q_1 + q_2 + q_3 + q_4 + 8) >> 4$ $p_1' = (2*p_7 + p_6 + p_5 + p_4 + p_3 + p_2 + 2*p_1 + p_0 + q_0 + q_1 + q_2 + q_3 + q_4 + q_5 + 8) >> 4$ $p_0' = (p_7 + p_6 + p_5 + p_4 + p_3 + p_2 + p_1 + 2*p_0 + q_0 + q_1 + q_2 + q_3 + q_4 + q_5 + q_6 + 8) >> 4$

One example of a filter for Q-side of the boundary, referred to as F4Q Q-side filter, is:

$q_6' = (7*q_7 + 2*q_6 + q_5 + q_4 + q_3 + q_2 + q_1 + q_0 + p_0 + 8) >> 4$ $q_5' = (6*q_7 + q_6 + 2*q_5 + q_4 + q_3 + q_2 + q_1 + q_0 + p_0 + p_1 + 8) >> 4$ $q_4' = (5*q_7 + q_6 + q_5 + 2*q_4 + q_3 + q_2 + q_1 + q_0 + p_0 + p_1 + p_2 + 8) >> 4$ $q_3' = (4*q_7 + q_6 + q_5 + q_4 + q_3 + 2*q_3 + q_2 + q_1 + q_0 + p_0 + p_1 + 2 + p_3 + 8) >> 4$ $q_2' = (3*q_7 + q_6 + q_5 + q_4 + q_3 + 2*q_2 + q_1 + q_0 + p_0 + p_1 + p_2 + p_3 + p_4 + 8) >> 4$ $q_1' = (2*q_7 + q_6 + q_5 + q_4 + q_3 + q_2 + 2*q_1 + q_0 + p_0 + p_1 + p_2 + p_3 + p_4 + p_5 + 8) >> 4$ $q_0' = (q_7 + q_6 + q_5 + q_4 + q_3 + q_2 + q_1 + 2*q_0 + p_0 + p_1 + p_2 + p_3 + p_4 + p_5 + p_6 + 8) >> 4$

In one example, according to the techniques herein, gradient computation may be used in selection of filter parameters, number of samples to be deblocked on one (or both) side of block boundary. Gradient may be computed using samples in line R[x].

In an example multiple gradients may be computed using samples in line R[x] and used in selection of filter parameters, number of samples to be deblocked on one (or both) side of block boundary. In another example, multiple gradients may be computed using samples in line R[x] and operations such as averaging of gradients, maximum gradient, minimum gradient, may be used in selection of filter parameters, number of samples to be deblocked on one (or both) side of block boundary.

In one example, function invocation xCalDQp(R[x]) computes gradient, as follows:

$abs(p_2 - 2*p_1 + p_0)$

In one example, function invocation xCalDQq(R[x]) computes gradient, as follows:

$abs(q_2 - 2*q_1 + q_0)$

In one example, function invocation xCalDQpLargeBlock (R[x]) computes gradient, as follows:

$$\text{Max}(\text{Max}(\text{Max}(\text{Max}(\text{Max}(\text{abs}(p_2-2*p_1+p_0),$$

$$\text{abs}(p_3-2*p_2+p_1)),$$

$$\text{abs}(p_4-2*p_3+p_2)),$$

$$\text{abs}(p_5-2*p_4+p_3)),$$

$$\text{abs}(p_6-2*p_5+p_4)),$$

$$\text{abs}(p_7-2*p_6+p_5))$$

In one example, function invocation xCalDQqLargeBlock (R[x]) computes gradient, as follows:

$$\text{Max}(\text{Max}(\text{Max}(\text{Max}(\text{Max}(\text{abs}(q_2-2*q_1+q_0),$$

$$\text{abs}(q_3-2*q_2+q_1)),$$

$$\text{abs}(q_4-2*q_3+q_2)),$$

$$\text{abs}(q_5-2*q_4+q_3)),$$

$$\text{abs}(q_6-2*q_5+q_4)),$$

$$\text{abs}(q_7-2*q_5+q_5))$$

In one example, function invocation xCalDQpLargeBlock (R[x]) computes gradient, as follows:

$$(\text{abs}(p_2-2*p_1+p_0)+\text{abs}(p_3-2*p_2+p_1)+\text{abs}(p_5-2*p_4+p_3)+\text{abs}(p_7-2*p_6+p_5)+4)>>2$$

In one example, function invocation xCalDQqLargeBlock (R[x]) computes gradient, as follows:

$$(\text{abs}(q_2-2*q_1+q_0)+\text{abs}(q_3-2*q_2+q_1)+\text{abs}(q_5-2*q_4+q_3)+\text{abs}(q_7-2*q_6+q_5)+4)>>2$$

In one example, function invocation xCalDQpLargeBlock (R[x]) computes gradient, as follows:

$$(\text{abs}(p_2-2*p_1+p_0)+\text{abs}(p_3-2*p_2+p_1)+\text{abs}(p_5-2*p_4+p_3)+\text{abs}(p_7-2*p_6+p_5)+2)>>2$$

In one example, function invocation xCalDQqLargeBlock (R[x]) computes gradient, as follows:

$$(\text{abs}(q_2-2*q_1+q_0)+\text{abs}(q_3-2*q_2+q_1)+\text{abs}(q_5-2*q_4+q_3)+\text{abs}(q_7-2*q_6+q_5)+2)>>2$$

In one example, function invocation xCalDQpLargeBlock (R[x]) computes gradient, as follows:

$$(\text{abs}(p_2-2*p_1+p_0)+\text{abs}(p_3-2*p_2+p_1)+\text{abs}(p_4-2*p_3+p_2)+\text{abs}(p_5-2*p_4+p_3)+4)>>2$$

In one example, function invocation xCalDQqLargeBlock (R[x]) computes gradient, as follows:

$$(\text{abs}(q_2-2*q_1+q_0)+\text{abs}(q_3-2*q_2+q_1)+\text{abs}(q_4-2*q_3+q_2)+\text{abs}(q_6-2*q_4+q_3)+4)>>2$$

In one example, function invocation xCalDQpLargeBlock (R[x]) computes gradient, as follows:

$$(\text{abs}(p_2-2*p_1+p_0)+\text{abs}(p_3-2*p_2+p_1)+\text{abs}(p_4-2*p_3+p_2)+\text{abs}(p_5-2*p_4+p_3)+2)>>2$$

In one example, function invocation xCalDQqLargeBlock (R[x]) computes gradient, as follows:

$$(\text{abs}(q_2-2*q_1+q_0)+\text{abs}(q_3-2*q_2+q_1)+\text{abs}(q_4-2*q_3+q_2)+\text{abs}(q_5-2*q_4+q_3)+2)>>2$$

In one example, function invocation xCalDQpLargeBlock (R[x]) computes gradient, as follows:

$$(\text{abs}(p_2-2*p_1+p_0)+\text{abs}(p_5-2*p_4p)+1)>>1$$

In one example, function invocation xCalDQqLargeBlock (R[x]) computes gradient, as follows:

$$(\text{abs}(q_2-2*q_1+q_0)+\text{abs}(q_6-2*q_4+q_3)+1)>>1$$

In one example, a subset of second-order differences computed at $p_1, p_2, \ldots, p_6$ may be used to compute xCalDQpLargeBlock(R[x]) where second order difference at $p_n$ is $\text{abs}(p_{n-1}-2*p_0+p_{n+1})$. Similarly, a subset of second-order differences computed at $q_1, q_2, \ldots, q_6$ may be used to compute xCalDQqLargeBlock(R[x]) In one example, the rounding offset in the function invocation xCalDQpLargeBlock(R[x]) and xCalDQqLargeBlock(R[x]) can be dropped.

In one example, function invocation xUseStrongFilteringLargeBlock (R[x], d, bSidePieLargeBlk, bSideQisLargeBlk) computes a Boolean variable, as follows, where examples for determined bSidePisLargeBlk, bSideQisLargeBlk are provided below:
$((\text{abs}((\text{bSidePisLargeBlk}?p_7:p_4)-p_0)+\text{abs}((\text{bSideQisLargeBlk}? q_7:q_4)-q_0)<(\beta>>3))$ && $(d<(\beta>>2))$ && $(\text{abs}(q_0-p_0)<((t_C*5+1)>>1)))$? TRUE:FALSE, where $\beta$ and $t_C$ are thresholds.

In one example, function invocation xUseStrongFilteringLargeBlock (R[x], d, bSidePisLargeBlk, bSideQisLargeBlk) computes a Boolean variable, as follows:
$sp_3=\text{Abs}(p_3-p_0)$
if (bSidePisL.argeblk)
{
    $sp_3=\max(sp3, \max(\text{Abs}(p_7-p_3), \text{Abs}(p_7-p_0))$
}
$sq_3=\text{Abs}(q_0-q_3)$
if (bSideQisLargeblk)
{
    $sq_3=\max(sq_3, \max(\text{Abs}(q_7-q_3), \text{Abs}(q_7-q_0)))$
}
xUseStrongFilteringLargeBlock: $sp_3+sq_3<(\beta>>3)$ && $(d<(\beta>>2))$ && $(\text{abs}(q_0-p_0)<((t_C*5+1)>>1)))$? TRUE: FALSE.

In one example, function invocation xUseStrongFilteringLargeBlock (R[x], d, bSidePisLargeBlk, bSideQisLargeBlk) computes a Boolean variable, as follows:
$sp_3=\text{Abs}(p_3-p_0)$
if (bSidePisLargeblk)
{
    $sp_3=(sp_3+\text{Abs}(p_7-p_3)+1)>>1$
}
$sq_3=\text{Abs}(q_0-q_3)$
if (bSideQisLargeblk)
{
    $sq_3=(sq_3+\text{Abs}(q_7-q_3))+1)>>1$
}
xUseStrongFilteringLargeBlock: $sp_3+sq_3<(\beta>>3)$ && $(d<(\beta>>2))$ && $(\text{abs}(q_0-p_0)<((t_C*5+1)>>1)))$? TRUE: FALSE In one example, function invocation xUseStrongFilteringLargeBlock (R[x], d, bSidePisLargeBlk, bSideQisLargeBlk) computes a Boolean variable, as follows:
$sps_3=\text{Abs}(p_3-p_0)$
if (bSidePisLargeblk)
{
    $sp_3=(sp_3+\text{Abs}(p_7-p_0))+1)>>1$
}
$sq_3=\text{Abs}(q_0-q_3)$
if (bSideQisLargeblk)
{
    $sq_3=(sq_3+\text{Abs}(q_7-q_0))+1)>>1$
} xUseStrongFilteringLargeBlock: $sp_3+sq_3<(\beta>>3)$ && $(d<(\beta>>2))$ && $(abs(q_0-p_0)<((t_C*5+1)>>1)))$? TRUE:FALSE In one example, the rounding offset in the function invocation xUseStrongFilteringLargeBlock can be dropped.

In one example, the condition used in selecting number of samples to be deblocked on one (or both) side of a boundary corresponds to the dimension (of current and/or neighboring block), perpendicular to block boundary, exceeding a threshold. In some cases, when a subset of transform coefficients is set to zero for a block, based on block size, then the threshold used in the comparison may be based on the properties of the subset of zero coefficients. For example, when transform coefficients is set to zero for coefficients in column position greater than or equal to 32 and row position greater than or equal to 32 (with row, column indexing starting at 0), then the dimension perpendicular to block boundary is compared to threshold value of 32.

In an example a signal may be received in the bitstream indicating whether all transform coefficients are zero for a block of samples. Such a signal may be received for e.g. for each color component, for a group of color components, for some spatial partitioning of samples, for some spatio-temporal partitioning of samples. In HEVC, for each color component a coded block flag (CBF) was signaled (either explicitly or implicitly by use of an inference rule in case of absence of explicit signal)—cbf_luma, cbf_cb, cbf_cr; moreover a flag was also signaled (explicitly and implicitly) indicating if any of the color components in the transform tree contained non-zero transform coefficients and was referred to as residual quad tree root CBF–rqt_root_cbf.

In one example the number of samples to be deblocked on one (or both) side of a boundary may be based on the type of edge being deblocked (e.g. vertical block edge. horizontal block edge), channel type (e.g. luma, chroma), whether all transform coefficients are zero for block of samples on one (or both) side of a boundary, whether block of samples on one (or both) side of boundary make use of coding modes such as Local Illumination Compensation (LIC) which may be based on a linear model for illumination changes, whether block of samples on one (or both) side of boundary make use of cross component prediction (which may be based on linear model), whether block of samples on one (or both) side of boundary make use prediction that is determined for blocks smaller than the transform, whether block of samples on one (or both) side of boundary make use techniques wherein large block (e.g. CU) is partitioned into sub-blocks (e.g. sub-CUs) and motion information is derived for these sub-blocks.

In one example, according to the techniques herein, a larger number of samples is (e.g. 7) is deblocked on each side of the block boundary when dimension of the current block, perpendicular to the block boundary, is greater than or equal to a threshold (e.g. 32) and a smaller number of samples (e.g. 3) is deblocked on each side of the block boundary when dimension of the current block, perpendicular to the block boundary, is smaller than a threshold (e.g. 32). For example, if ((width of current block >=32 and edge type is vertical) or (height of current block >=32 and edge type is horizontal)) deblock larger number of samples on each side of the block boundary.

In one example, according to the techniques herein, a larger number of samples is (e.g. 7) is deblocked on the side of the block boundary where dimension of the block, perpendicular to the block boundary, is greater than or equal to a threshold (e.g. 32) and a smaller number of samples (e.g. 3) is deblocked on side of the block boundary where dimension of the block, perpendicular to the block boundary, is smaller than a threshold (e.g. 32). For example: if ((width of one block >=32 and edge type is vertical) or (height of one block >=32 and edge type is horizontal)) deblock larger number of samples for that block at the block boundary. Here if the left-side of a vertical boundary edge has a block size 4 (rows)×64 (columns) and the right-side has a block size 4 (rows)×16 (columns) then larger number of samples may be deblocked on left-side versus the right side.

In one example, according to the techniques herein, filter unit 216 may be configured to select filter parameters (including, e.g., a number of coefficients) used for deblocking based on one or more of: distance of sample being deblocked (in number of samples) from boundary, block size(s) on each side of boundary, boundary strength, prediction mode used by blocks on each side of boundary, prediction mode of sample being deblocked (e.g., use weaker filter for boundary close to reference samples). QP of sample being deblocked (e.g., use stronger filters for larger QP), block size corresponding to the sample being deblocked (e.g., use stronger filters for larger block size), block size corresponding to the samples being used for deblocking, motion vectors for blocks on each side of boundary being deblocked (e.g., if the MV difference is larger than a threshold then do not perform any deblocking since samples on different side of the boundary may belong to different objects), and/or motion vectors for sample being deblocked; motion vectors for sample being used for deblocking. It should be noted that, block size corresponding to a sample may include the block size of CU the sample belongs to, block size of TU the sample belongs, to or the block size of PU the sample belongs to.

In one example, according to the techniques herein, filter unit 216 may be configured to select filter parameters (including, e.g., a number of coefficients) used for deblocking based on the type of edge being deblocked (e.g. vertical block edge, horizontal block edge), channel type (e.g. luma, chroma), whether all transform coefficients are zero for block of samples on one (or both) side of a boundary, whether block of samples on one (or both) side of boundary make use of coding modes such as Local Illumination Compensation (LIC) which may be based on a linear model for illumination changes, whether block of samples on one (or both) side of boundary make use of cross component prediction (which may be based on linear model), whether block of samples on one (or both) side of boundary make use prediction that is determined for blocks smaller than the transform, whether block of samples on one (or both) side of boundary make use techniques wherein large block (e.g. CU) is partitioned into sub-blocks (e.g. sub-CUs) and motion information is derived for these sub-blocks.

In one example, according to the techniques herein, filter unit 216 may be configured to select filter parameters (including, e.g., a number of coefficients) used for deblocking based on the type of edge being deblocked (e.g. vertical block edge, horizontal block edge), channel type (e.g. luma, chroma), whether all transform coefficients are zero for block of samples on one (or both) side of a boundary, whether block of samples on one (or both) side of boundary make use of coding modes such as Local Illumination Compensation (LIC) which may be based on a linear model for illumination changes, whether block of samples on one (or both) side of boundary make use of cross component prediction (which may be based on linear model), whether block of samples on one (or both) side of boundary make use prediction that is determined for blocks smaller than the transform, whether block of samples on one (or both) side of boundary make use techniques wherein large block (e.g. CU) is partitioned into sub-blocks (e.g. sub-CUs) and motion information is derived for these sub-blocks.

In one example selecting filter parameters may include selecting wider stronger filtering.

In one example, according to the techniques herein, filter unit 216 may be configured to select a set of deblocking filter parameters (e.g. wider stronger filtering) for both sides when dimension of the current block, perpendicular to the block boundary, is greater than or equal to a threshold (e.g. 32). For example, if ((width of current block >=32 and edge type is vertical) or (height of current block >=32 and edge type is horizontal)) then wider stronger filtering is selected for each side of the block boundary.

In one example, according to the techniques herein, filter unit 216 may be configured to select filter parameters for each side of block boundary independently based on dimension of the block, perpendicular to the block boundary, for the corresponding side. For example, when dimension of the block perpendicular to the block boundary on one side is greater than or equal to a threshold (e.g. 32) then a set of deblocking filter parameters (e.g. wider stronger filtering) may be selected for that side. For example: if ((width of one block >=32 and edge type is vertical) or (height of one block >=32 and edge type is horizontal)) wider stronger filtering is selected for the side of the block boundary corresponding to the block.

In one example, according to the techniques herein, sub-CU boundary may be deblocked based on whether all transform coefficients are zero for blocks (e.g. CU) on one (or both) side of a boundary. For example, deblock sub-CU boundary when all the transform coefficients for the CU is zero.

In one example, according to the techniques herein, sub-block boundary may be deblocked based on whether all transform coefficients arc zero for a block on one (or both) side of a boundary. For example, deblock sub-block boundary when all the transform coefficients for the block is zero.

In one example, according to the techniques herein, sub-CU boundary may be deblocked based on whether all transform coefficients are zero for blocks (e.g. CU) on one (or both) side of a boundary and quantization step size is large (e.g. QP greater than or equal to a threshold). For example, deblock sub-CU boundary when all the transform coefficients for the CU is zero and QP is greater than a threshold.

In one example, according to the techniques herein, sub-block boundary may be deblocked based on whether all transform coefficients are zero for a block on one (or both) side of a boundary and quantization step size is large (e.g. QP greater than or equal to a threshold). For example, deblock sub-block boundary when all the transform coefficients for the block is zero and QP is greater than a threshold.

In one example, according to the techniques herein, a block boundary may be deblocked when Local Illumination Compensation (LIC) is used for blocks on one (or both) side of a boundary and all the transform coefficients for that block is zero.

In one example, according to the techniques herein, all four boundaries of a block (i.e. left, right, top, bottom) a block boundary may be deblocked when Local Illumination Compensation (LIC) is used for a block and all the transform coefficients for that block is zero.

In one example, according to the techniques herein, a block boundary may be deblocked when Local Illumination Compensation (LIC) is used for blocks on one (or both) side of a boundary and all the transform coefficients for that block is zero and quantization step size is large (e.g. QP greater than or equal to a threshold).

In one example, according to the techniques herein, all four boundaries of a block (i.e. left, right, top, bottom) a block boundary may be deblocked when Local Illumination Compensation (LIC) is used for a block and all the transform coefficients for that block is zero and quantization step size is large (e.g. QP greater than or equal to a threshold).

In one example, according to the techniques herein, a block boundary may be deblocked when cross component prediction is used for blocks on one (or both) side of a boundary and all the transform coefficients for that block is zero.

In one example, according to the techniques herein, a block boundary may be deblocked when cross component prediction is used for blocks on one (or both) side of a boundary and all the transform coefficients for that block is zero and quantization step size is large (e.g. QP greater than or equal to a threshold).

In one example, according to the techniques herein, filter unit 216 may be configured to perform deblocking according to multiple filtering passes. In one example, a filtering pass may correspond to processing/constructing of all/subset of samples to be deblocked. The number of processing/construction(s) for each sample in a given pass may correspond to the pass index/order. The subset of samples to be deblocked may correspond to the pass index/order. In one example, every pass may correspond to processing/constructing of all of samples to be deblocked exactly once. In one example of such a case, deblocked samples from the previous iteration (as well as non-deblocked samples) may be used to construct deblocked samples for current iteration. In one example of such a case, deblocked samples from the previous and current iteration (as well as non-deblocked samples) may be used to construct deblocked samples. In this case, an ordering may be specified for constructing deblocked samples. In one example, the number of iterations may be determined based on one or more of: the slice type; the block size; the skip flags of the current CU and its neighboring CUs; the prediction mode(Intra\inter) of the current CU and its neighboring CUs; the sample position to be de-blocked; whether d<β; and/or the strong or weak filter determination condition provided in JEM described above; distance of sample being deblocked (in number of samples) from boundary; block size(s) on each side of boundary; boundary strength; prediction mode used by blocks on each side of boundary; prediction mode of sample being deblocked; QP of sample being deblocked; block size corresponding to the sample being deblocked; block size corresponding to the samples being used for deblocking; motion vectors for blocks on each side of boundary being deblocked; motion vectors for sample being deblocked; and/or motion vectors for sample being used for deblocking. In one example, the iteration number may determine one or more filter parameters.

In an example, N-pass deblocking with a pre-determined deblocking support may be represented as:

For iterIdx=0 to (N-1)

For pos=posM to posN // samples being deblocked temp[pos]=f_pos(samples values at pass iterIdx in deblocking support)

For pos=posM to posN

Update sampleValue[pos] with temp[pos]

Where f_pos(is a linear transformation of the form:

$$\text{f\_pos(samples values at pass } iterIdx \text{ in deblocking support)} = \sum_{m \in \text{deblocking support}} \text{coeff\_pos}[m] sampleValue[m, iterIdx]$$

with the coeff_pos[ ] being an array of values dependent on position pos of sample being deblocked. It should be noted, that each sampleValue[ ]being used may be generated using deblocking in the previous iteration. Also, the deblocking support does not change from one iteration to next.

Performing an iteration-by-iteration analysis provides:
For iterIdx 0, the samples used are the non-deblocked samples so for each pos:
temp[pos]=f_pos(samples values at pass 0 in deblocking support).
For iterIdx 1,
temp[pos]=f_pos(samples values at pass 1 in deblocking support).

Since f_pos( ) are linear transformations and the deblocking support does not change, the above can be re-written as:
For iterIdx 1,
temp[pos]=g_pos(samples values at pass 0 in deblocking support).
Where g_pos( ) is a linear transformation similar to f_pos ( ) that depends on position pos, but with different coefficient values.

This simplification can be performed recursively for each iteration resulting in a filtering operations that are depends only on the original sample values at iteration 0 leading to an equivalent single-pass. Due to finite precision used in some cases, the final coefficient values may be approximated leading to an approximate single-pass representation of the multi-pass filtering operation.

In one example, according to the techniques herein, filter unit 216 may be configured to extend filter lines and the corresponding filter coefficients. In one example, the sample lines to be filtered may be extended to eight at one side. In one example, for line 0 and line 1, the filter coefficients may be {1,1, 11, 1, 2, 2, 2, 1, 1, 1, 1, 1}/16; for line 2 and line 3, the filter coefficients may be {1, 1, 1, 1, 1, 1, 1, 1}/8; and the filter coefficients for other lines may be {1, 2, 2, 2, 1}/8, where line 0 denotes the nearest sample line to the boundary.

It should be noted that in JEM, the reconstructed samples are always used to filter samples in the deblocking process. In one example, according to the techniques herein, filter unit 216 may be configured to use modified sample values resulting from deblocking to filter other samples values. In one example, modified sample values may be used as inputs when filtering other samples value. In one example, a filtering order may be specified. In one example, a filter order may perform deblocking from the farthest line from boundary to the nearest line.

As described above, deblocked samples are typically clipped to lie within a range of values. The range of values may be based on the original sample value and other parameters received in a bitstream. In an example, the range of values is [original sample value−t_c, original sample value+t_c]. In one example, according to the techniques herein, filter unit 216 may be configured to adjust a clipping function based on one or more of: the sample values in the last one or more rounds in the multiple pass deblocking; a QP value; a slice type; a current prediction mode(Intra/ inter); a current skip flag value; the intra prediction modes of samples to be deblocked; the motion vector of samples to be deblocked; the sample position (e.g., different samples can use different clipping functions); the CU position (e.g., different CU can use different clipping functions); and/or any of the other conditions describe above.

In one example, according to the techniques herein, filter unit 216 may be configured to perform the filtering techniques described herein based on a block size. For example, one or more of the filtering techniques described herein may be applied on a boundary, where the block sizes around the boundary are larger than a threshold. For example, a determination of whether to perform a filtering techniques may be as follows: (1) check each set of 4×4 samples on each side of boundary (i.e., since minimum CU size is 4×4 luma samples): (2) if any one set of 4×4 samples belongs to a CU with size larger than a thresholds (e.g., 64), the filtering technique will be performed on the current boundary. In one example, according to the techniques herein, filter unit 216 may be configured to perform the filtering techniques described herein based on one or more of: slice type; whether a block shape is rectangular; where a block shape is square; the skip flags of the current CU and its neighboring CUs; the prediction mode(Intra\inter) of the current CU and its neighboring CUs: the sample position to be de-blocked.

In one example, according to the techniques herein, filter unit 216 may be configured to perform the wider-stronger luma filtering as follows:
First, determine whether P-side makes use of large blocks as follows, as:
bSidePisLargeBlk=((edge type is vertical and $p_0$ belongs to block (e.g. CO) with width>=32)||(edge type is horizontal and $p_0$ belongs to block (e.g. CU) with height>=32))? TRUE:FALSE
Next, determine whether Q-Ride makes use of large blocks as follows, as:
bSideQisLargeBlk=((edge type is vertical and $q_0$ belongs to block (e.g. CU) with width>=32)||(edge type is horizontal and $q_0$ belongs to block (e.g. CU) with height>=32))? TRUE:FALSE
Next, derive the following variables.
d0P=bSidePisLargeBlk? XCallQpLargeBlock(R[0]): XCalDQp (R[0])
d1P=bSidePisLargeBlk? XCalDQpLargeBlock(R[3]): XCalDQp (R[3])
d0Q=bSideQisLargeBlk? XCalDQqLargeBlock(R[0]): XCalDQq (R[0])
d1Q=bSideQLargeBlk? XCalDQqLargeBlock(R[3]): XCalDQq (R[3])
d0L=d0P+d0Q
d3L=d1P+d1Q
dL=d0L+d3L
Next, Condition1 and Condition2 are evaluated as follows:
Condition1=(dL<β)? TRUE:FALSE
Condition2=(xUseStrongFilteringLargeBlock(R[0], d0L, bSidePisLargeBlk, bSideQisLargeBlk) && xUseStrongFilteringLargeBlock(R[3], d3L, bSidePisLargeBlk, bSideQisLargeBlk))? TRUE:FALSE
When Condition1, Condition2 and bSidePisLargeBlk is TRUE then a wider-stronger filter is applied to the P-side of the boundary (e.g. WS00P).
When Condition1, Condition2 and bSideQisLargeBlk is TRUE then a wider-stronger filter is applied to the Q-side of the boundary. (e.g. WS00Q)

In one example, Condition2 may be modified as follows:
Condition2=(When block on either side of boundary makes use of Local Illumination Compensation and the CBF of that block is 0)? TRUE: ((xUseStrongFilteringLargeBlock(R[0], d0L, bSidePisLargeBlk, bSideQisLargeBlk) && xUseStrongFilteringLargeBlock(R[3], d3L, bSidePisLargeBlk, bSideQisLargeBlk))? TRUE: FALSE)

In one example, according to the techniques herein, filter unit 216 may be configured to perform the chroma filtering as follows:

When, (edge type is vertical and $p_0$ belongs to CU with width>=32)||(edge type is horizontal and p) belongs to CU with height>=32) && (edge type is vertical and $q_0$ belongs to CU with width>=32)11 (edge type is horizontal and $q_0$ belongs to CU with height>=32), then a narrow strong filter (e.g. NS00P and NS00Q) may be used, Otherwise, narrow weak filter may be used (e.g. NW00P and NW00Q).

In one example, according to the techniques herein, filter unit 216 may be configured to perform the chroma filtering as follows: When, ($p_0$ belongs to CU with width>=32 and $p_0$ belongs to CU with height>=32)||($q_0$ belongs to CU with width>=32 and $q_0$ belongs to CU with height>=32), then a narrow strong filter (e.g. NS00P and NS00Q) may be used, Otherwise, narrow weak filter may be used (e.g. NW00P and NW00Q).

Figure 10:
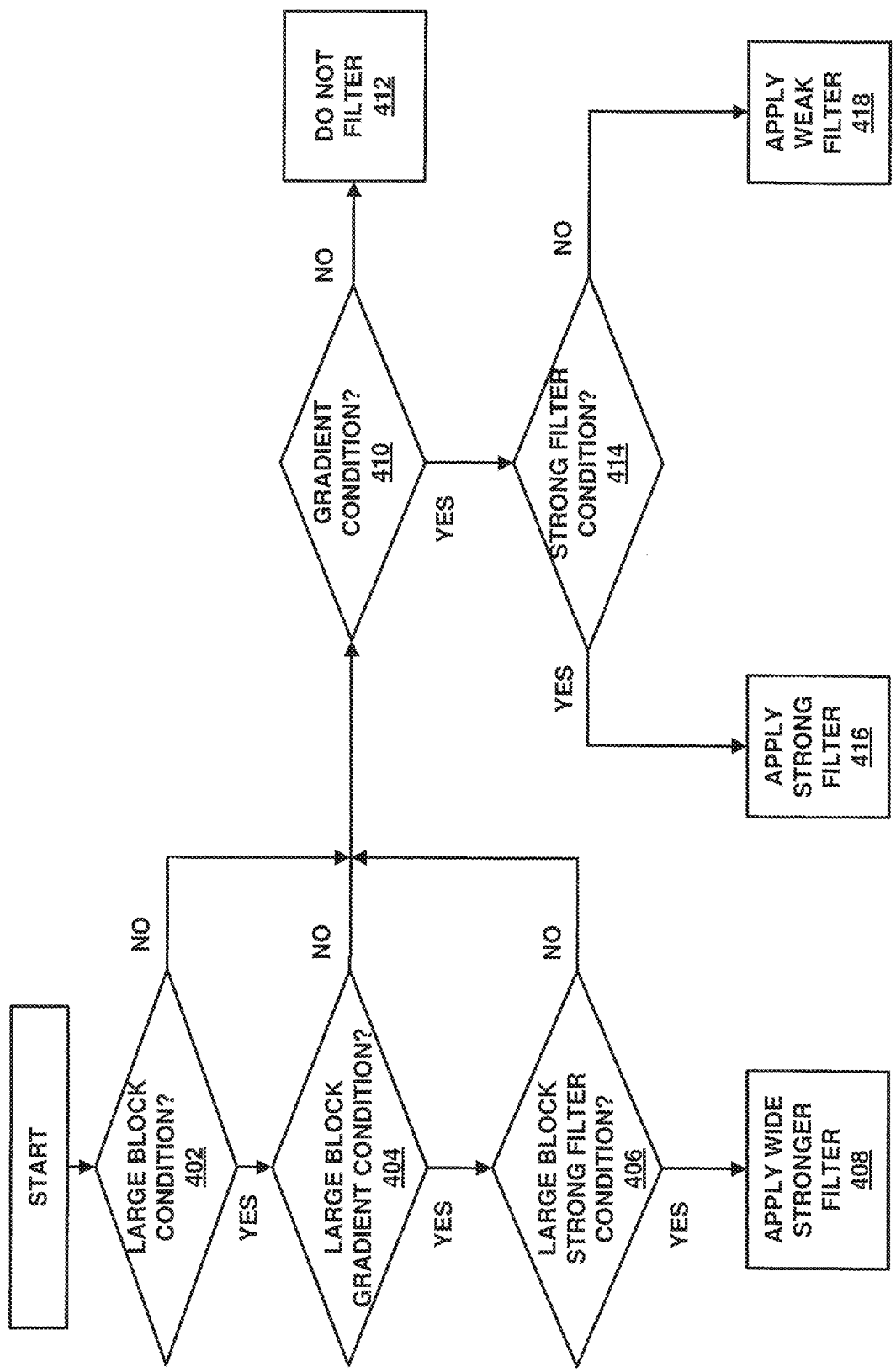
FIG. 10 is a flowchart illustrating an example of performing deblocking according to one or more techniques of this disclosure.

In one example, according to the techniques herein, filter unit 216 may be configured to perform deblock filtering according to the example flowchart illustrated in FIG. 10. In one example, filter unit 216 may be configured to perform deblock filtering according to the flowchart illustrated in FIG. 10 for luma samples. FIG. 10 illustrates an example where for a current block (e.g., one of a P block or a Q block) one of the following types of deblocking may be applied: a wide stronger filter, a strong filter, a weak filter, or no filtering. In one example, applying a wide stronger filter may include applying the WS00P and WS00Q filters described above. In one example, applying a strong filter may include applying the HEVC_P and HEVC_Q filters described above. In one example, applying a weak filter may include applying the weak filter in HEVC, described above as Weak Filter. As illustrated in FIG. 10, a wider stronger filter is applied at 408, no filter is applied at 412, a strong filter is applied 416, and a weak filter is applied at 418 based on whether: a large block condition is true at 402, a large block gradient condition is true at 404, a large block strong filter condition is true at 406, a gradient condition is true at 410, and a strong filter condition is true at 414.

In one example, a large block condition may include whether the following is true:
If((EDGE_VER && (cur_block_width>=32||adjacent_block_width>=32))||(EDGE_HOR &&(cur_block_height>=32||adjacent_block_height>=32)))
Where
EDGE_VER is a vertical boundary type,
EDGE_HOR is a horizontal boundary type, cur_block_width is a current block width, e.g., in luma samples,
cur_block_height is a current block height, e.g., in luma samples,
adjacent_block_width is an adjacent block width, e.g., in luma samples, and
adjacent_block_height is an adjacent block height, e.g., in luma samples.

In one example, a large block gradient condition may include whether Condition 1, described above, is true. In one example, a large block strong filter condition may include whether one of the example Condition2, described above, is true.

Figure 11:
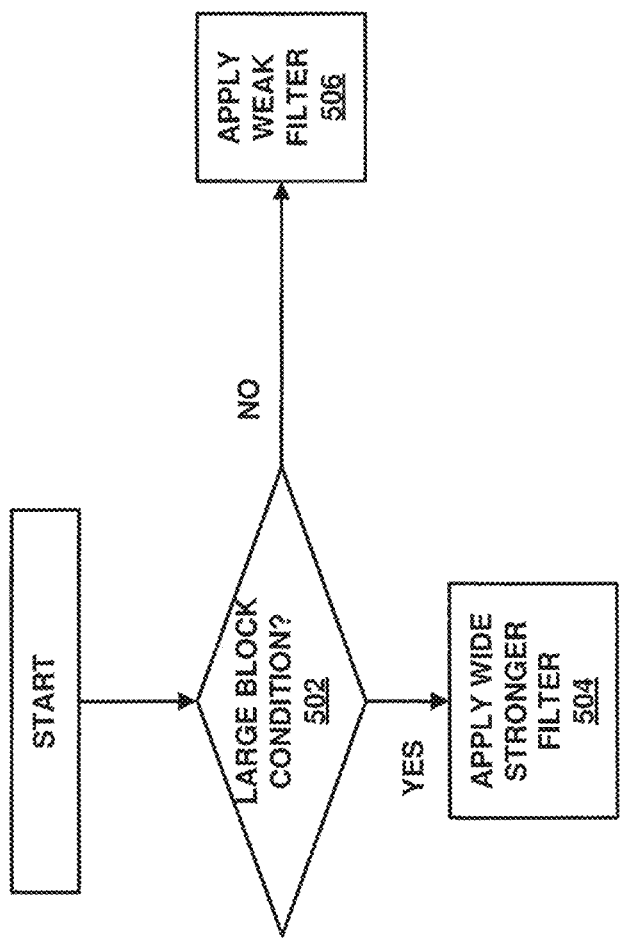
FIG. 11 is a flowchart illustrating an example of performing deblocking according to one or more techniques of this disclosure.

In one example, a gradient condition may include whether $d<\beta$, where d is determined as follows:

$d0P=X\mathrm{Cal}DQp(R[0])$ $d1P=X\mathrm{Cal}DQp(R[3])$ $d0Q=X\mathrm{Cal}DQq(R[0])$ $d1Q=X\mathrm{Cal}DQq(R[3])$ $d0=d0P+d0Q;$ $d3\ d1P+d1Q;$ $d=d0+d3;$ In one example, a strong filter condition may include whether the following is true:
(xUseStrongFilteringLargeBlock(R[0], d0, false, false) && xUseStrongFilteringLargeBlock(R[3], d3, false, false))? TRUE:FALSE In one example, according to the techniques herein, filter unit 216 may be configured to perform deblock filtering according to the example flowchart illustrated in FIG. 11. In one example, filter unit 216 may be configured to perform deblock filtering according to the flowchart illustrated in FIG. 11 for chroma samples. FIG. 11 illustrates an example where for a current block (e.g., P block or a Q block) one of the following types of deblocking may be applied: a wide stronger filter, or a weak filter. In one example, applying a wide stronger filter may include applying the NS00P and NS00Q filters described above. In one example, applying a weak filter may include applying the as NW00P and NW00Q filters described above. As illustrated in FIG. 11, a wider stronger filter is applied at 504, and a weak filter is applied at 506 based on whether: a large block condition is true at 502.

In one example, a large block condition may include whether the following is true:
If((EDGE_VER && (cur_block_width>=32||adjacent block width>=32))||(EDGE_HOR &&(cur_block_height>=3211 adjacent_block_height>=32)))
Where
EDGE_VER is a vertical boundary type,
EDGE_HOR is a horizontal boundary type,
cur_block_width is a current block width, e.g., in chroma samples.
cur_block_height is a current block height, e.g., in chroma samples,
adjacent_block_width is an adjacent block width, e.g., in chroma samples, and
adjacent_block_height is an adjacent block height, e.g., in chroma samples.

In one example, filter unit 216 may be configured to perform deblock filtering for chroma samples of a P block or a Q block) based on the following condition set:
If(EDGE_VER && (cur_Q_block_width>=TH_w))|| (EDGE_HOR && (cur_Q_block_height>=TH_h)) is TRUE, apply NS00Q on Q samples. Otherwise, apply a weak filter on Q samples (e.g., NW00Q Q-side filter).
If((EDGE_VER && (cur_P_block_width>=TH_w))|| (EDGE_HOR && (cur_P_block_height>=TH_h)) is TRUE, apply NS00P on P samples. Otherwise, apply a weak filter on P samples (e.g., NW00P P-side filter).

Where
EDGE_VER is a vertical boundary type.
EDGE_HOR is a horizontal boundary type,
cur_Q_block_width is a current Q block width, e.g., in chroma samples,
cur_Q_block_height is a current Q block height, e.g., in chroma samples.
cur_P_block_width is a current P block width, e.g., in chroma samples.
cur_P_block_height is a current P block height, e.g., in chroma samples,
TH_w is a width threshold (e.g., 32 samples), and
TH_h is a height threshold (e.g., 32 samples).

It should be noted that a threshold value (e.g., TH_w and/or TH_h), in some examples may include a predefined value (e.g., 16 or 32), in some examples may be signaled in a parameter set, in some examples may be signaling in a slice header, and in some examples may be the CTU size in a current portion of video.

Referring to FIG. 11, in one example, the large block condition may be replaced with a luma filter condition. That is, for example, if a strong filter is applied to a luma block, the wide stronger filter may be applied to the collocated chroma block at 504, otherwise a weak filter may be applied to the collocated chroma block at 506.

Figure 12:
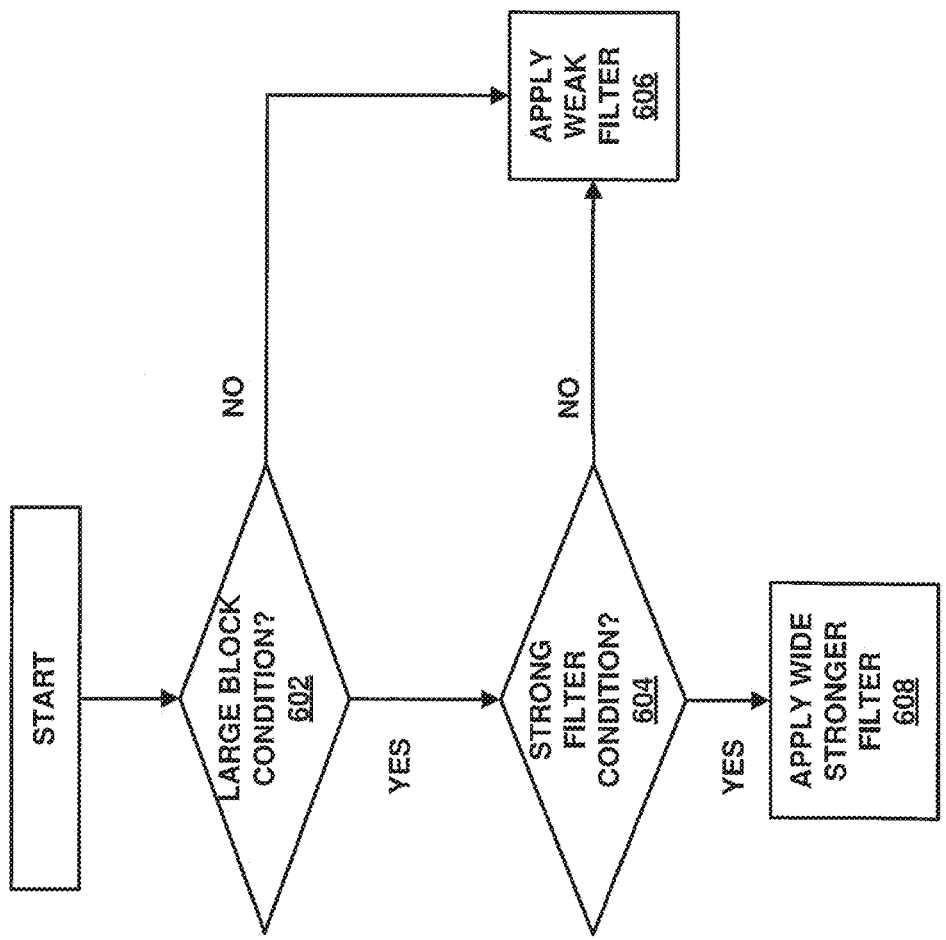
FIG. 12 is a flowchart illustrating an example of performing deblocking according to one or more techniques of this disclosure.

In one example, according to the techniques herein, filter unit 216 may be configured to perform deblock filtering according to the example flowchart illustrated in FIG. 12. In one example, filter unit 216 may be configured to perform deblock filtering according to the flowchart illustrated in FIG. 12 for chroma samples. FIG. 12 illustrates an example where for a current block (e.g., P block or a Q block) one of the following types of deblocking may be applied: a wide stronger filter or a weak filter. In one example, applying a wide stronger filter may include applying the NS00P and NS00Q filters described above. In one example, applying a weak filter may include applying the as NW00P and NW00Q filters described above. As illustrated in FIG. 12, a wider stronger filter is applied at 608 and a weak filter is applied at 606 based on whether: a large block condition is true at 602 and a large block strong filter condition is true at 604.

In one example, a large block condition may include whether the following is true:

If((EDGE_VER && (cur_block_width>=TH_w && adjacent_block_width>=TH_w))||(EDGE_HOR && (cur_block_height>=TH_h II adjacent_block_height>=TH_h)))

Where
EDGE_VER is a vertical boundary type.
EDGE_HOR is a horizontal boundary type,
cur_block_width is a current block width, e.g., in chroma samples,
cur_block_height is a current block height, e.g., in chroma samples,
adjacent_block_width is an adjacent block width, e.g., in chroma samples, and
adjacent_block_height is an adjacent block height, e.g., in chroma samples
TH_w is a width threshold (e.g., 32 samples), and
TH_h is a height threshold (e.g., 32 samples).

It should be noted that a threshold value (e.g., TH_w and/or TH_h), in some examples may include a predefined value (e.g., 16 or 32), in some examples may be signaled in a parameter set, in some examples may be signaling in a slice header, and in some examples may be the CTU size in a current portion of video. In one example, a threshold value is larger than 4.

In one example, a wider strong filter condition may include whether both a first condition and a second condition are true. That is, a strong filter condition may be true when both the first condition and the second condition are true. In one example, a first condition may be true when $d<\beta$, where d is determined as follows:

$dp0=\text{xCalcDP}(R_C[0]);$ $dq0=\text{xCalcDQ}(R_C[0]));$ $dp1=\text{xCalcDP}(R_C[1]);$ $dq1=\text{xCalcDQ}(R_C[1]);$ $d0=dp0+dq0;$ $d1=dp1+dq1;$ $d=d0+d1.$ Where,
$R_C[N]$ corresponds to chroma lines perpendicular to the edge being deblocked and at distance N from the top of current chroma segment being deblocked; and
In one example, a second condition may be true when $((\text{abs}(p3-p0)+\text{abs}(q3-q0)<(\beta>>3)) \,\&\&\, (d<(\beta>>2))$
$\&\& \,(\text{abs}(q0-p0)<((tC*5+1)>>1)))$ is true for $R_C[0]$ and $R_C[1]$.
In one example, a second condition may be true when $((\text{abs}(p3-p0)+\text{abs}(q3-q0)<(\beta>>3)) \,\&\&\, (d<(\beta>>2))$
$\&\& \,(\text{abs}(q0-p0)<((tC*5+1)>>1)))$ is true for $R_C[0]$.

It should be noted that in one example, an edge is deblocked as segments, where the segment length may be a function of the smallest dimension allowed for a CU/TU/PU/subPU. Further, when 2×N and N×2 CU's are the shortest and thinnest blocks allowed in chroma channel then the chroma segment length may be 2.

It should be noted that according to the chroma filtering above, two lines perpendicular to the edge being deblocked are processed as the basic segment. In one example, four lines may be processed as the basic segment. In one example, when four lines are processed as the basic segment, a first condition may be true when $d<\beta$, where d is determined as follows:

$dp0=\text{xCalcDP}(R_C[0]);$ $dq0=\text{xCalcDQ}(R_C[0]));$ $dp3=\text{xCalcDP}(R_C[3]);$ $dq3=\text{xCalcDQ}(R_C[3]);$ $d0=dp0+dq0;$ $d3=dp3+dq3;$ $d=d0+d1.$ Further, in one example, when four lines are processed as the basic segment, a second condition may be true when $((\text{abs}(p3-p0)+\text{abs}(q3-q0)<(\beta>>3)) \,\&\&\, (d<(\beta>>2))$
$\&\& \,(\text{abs}(q0-p0)<((tC*5+1)>>1)))$ is true for $R_C[0]$ and $Re[3]$.

As described above, in ITU-T H.265, the deblocking filter may be applied differently to CTU boundaries that coincide with slice and tile boundaries compared with CTU boundaries that do not coincide with slice and tile boundaries.

Specifically, in ITU-T H.265, slice_loop_filter_across_slices_enabled_flag enables/disables the deblocking filter across CTU boundaries that coincide with top and left slice boundaries. In one example, according to the techniques herein, when support samples of a deblocking filter exceeds a boundary (e.g., picture/slice/tile) a deblocking filter using the support samples may not be allowed. In one example, according to the techniques herein, when support samples of a deblocking filter exceeds a boundary (e.g., picture/slice/tile) and using sample values across a boundary (e.g., slice) is disabled, a padding operation may be used to generate support sample values. For example, one of: a numeric scalar, circular, replicate, or symmetric padding may be used to generate a support sample, where a numeric scalar padding operation pads according to a constant value, a circular padding operation pads with circular repetition of sample values, a replicate padding operation pads by repeating border sample values, and a symmetric padding operation pads with a mirror reflection of sample values.

As described above, in ITU-T H.265, filtered values are clipped based on a value tc. In particular, for the Strong Filter in ITU-T H.265, described above, $p_i'$ values are clipped to $(p_i-2*t_C, p_i+2*t_C)$ and $q_i'$ values are clipped to $(q_i-2*t_C, q_i+2*t_C)$. As described above, in ITU-T H.265, the variable $t_C'$ (and thus, the value of tc) is determined based on the index Q which is determined based on $qP_L$, which is equal to: $(QP_Q+QP_P+1)/2$. In the some cases of video coding, (e.g., proposed techniques for coding high dynamic range (HDR) video), the values of the QP may be changed at CU-level or CTU-level. In these cases, the range of the clipping operation provided in ITU-T H.265 based on index Q may be inadequate. In one example, according to the techniques herein, different values of $t_C'$ may be determined for the P side samples and the Q side samples. That is, a P side $t_C'$ value, $t_{CP}'$, and a corresponding P side $t_C$ value, $t_{CP}$, may be used to clip $p_i'$ values and a Q side $t_C'$ value, $t_{CQ}'$, and a corresponding Q side $t_C$ value, $t_{CQ}$, may be used to clip $q_i'$ values. In one example, respective a P side index Q, $Q_p$, and Q side index Q, $Q_q$, may be determined by substituting $qP_L$ with respective values of $QP_P$ and $QP_Q$ in the Q index equation above. Thus, according to the techniques herein, $p_i'$ values may be clipped to $(p_i-2*t_{CP}, p_i+2*t_{CP})$ and $q_i'$ values may be clipped to $(q_i-2*t_{CQ}, q_i+2*t_{CQ})$. It should be noted that $p_i'$ values and $q_i'$ values may include filtered values generated according to any filter described herein. Thus, the techniques for clipping $p_i'$ values and $q_i'$ values based on respective $t_{CP}$ and $t_{CQ}$ may be applicable to any filter described herein.

It should be noted that in some cases, a video block (e.g., a CU) may include internal TU boundaries and blocking artifacts may appear within the video block. In some cases, when a video block has a dimension larger than 64, deblocking of internal TU boundaries may be disabled. In one example, according to the techniques herein, deblocking may be performed along video block boundaries and also along any internal TIU boundaries even in cases where a video block has a dimension larger than 64.

Referring to FIGS. 5A-5B, some cases, a P block or a Q block may include multiple objects. For example, referring to FIG. 5A, in one example, columns $p_i$ to $p_i$ may correspond to a first object, columns $p_2$ to $p_0$ may correspond to a second object, and columns $q_0$ to $q_7$ may correspond to a third object. In such a case, when samples in columns $p_2$ to $p_0$ are filtered using samples in one or more column $p_3$ and $q_0$ to $q_3$, as support samples, the resulting filter sample values in columns $p_2$ to $p_0$ may appear blurred. Further, in some cases deblocking may lead to smearing of dominant sample value(s) and/or introduce other visual artifacts.

As described above, a corresponding deblocked sample value, y[n]having support samples, may be specified based on the following equation:

$$y[n] = \sum_{m=a}^{b} coeff[m]x[n+m]$$

Where,
A filter length is determined as abs(a−b+1);
coeff[m] provides a filter tap value (also referred to as a filter coefficient);
x[n+m] provides input sample values corresponding to support samples.

In one example, according to the techniques herein, in order to avoid a blurring or an artifact caused by distinct objects being included in filtered samples and support samples, one or more clipping operations may be applied to the term x[n+m]. In one example, the term x[n+m] may be replaced with Clip3(x[n]−2*$t_C$, x[n]+2*$t_C$, x[n+m]).

In one example, the term x[n+m] may be modified such that a support sample x[n+m] is excluded from the summation if abs(x[n+m]−x[n]) is greater than a threshold. It should be noted that in the case where coeff[m]corresponds to an average distribution (i.e., coeff[m]=1/filter length, where filter length equals (abs(a−b+1))), the coeff[m] is calculated as I/(filter length−excluded samples). It should be noted that in the case where coeff[m] corresponds to a Gaussian distribution (i.e., $$\sum_{m=a}^{b} coeff[m] = 1$$

where filter length equals abs(a−b+1)). In one example, the term x[n+m] may be modified such that for every support sample x[n+m] where abs(x[n+m]−x[n]) that is greater than a threshold is satisfied, the value of support sample x[n+m] is substituted with the value of x[n]. It should be noted that the threshold value may be based on a combination of one or more of: a predefined value (e.g., 2 or 4), a value signaled in a parameter set, a value signaled in a slice header, a value based on a QP value (e.g., a QP value of a current sample and/or a support sample), and/or a value based on prediction information (e.g., an intra prediction mode and/or motion information of a current sample and/or a support sample).

In one example, different filters may be applied at different sample positions with respect to a boundary. For example, samples close to the boundary may be filtered using strong filters and samples far from the boundary may be filter using weak filters. For example, samples in column p0 to p1 may be filtered according to a strong filter and samples in columns p2 to p4 may be filtered according to a weak filter. In one example, for chroma deblocking (or luma deblocking), a threshold (e.g., 2, 3, 4) may be used to such that if the positional distance between the current sample and the sample nearest to the boundary is smaller than the threshold, a strong filter will be applied. In one example, the threshold may be based on one or more of: block size on each side of boundary (one or both); boundary strength; prediction mode used by blocks on each side of boundary; prediction mode of sample being deblocked; QP of sample being deblocked; block size corresponding to the sample being deblocked; block size corresponding to the samples being used for deblocking; motion vectors for blocks on each side of boundary being deblocked; motion vectors for sample being deblocked; and/or motion vectors for sample being used for deblocking.

It should be noted that in some cases of video coding, the luminance transform coefficients (e.g., after quantization) corresponding to a CU may be 0, and the CU may be divided into sub-PUs for motion compensation (e.g., ATMVP). In such a case, according to the techniques herein luminance deblocking may be performed along subPU boundaries and further, along the CU boundaries in some examples.

It should be noted that in some cases of video coding, the chrominance transform coefficients (e.g., after quantization) corresponding to a CU may be 0, and the CU may be divided into sub-PUs for motion compensation (e.g., ATMVP). In such a case, according to the techniques herein chrominance deblocking may be performed along sub-PU boundaries and further, along the CU boundaries in some examples.

As described above, in ITU-T H.265, for luma each of Bs, $t_C$, $\beta$, and d are used to determine which filter type to apply (e.g., Strong Filter or Weak Filter). In particular, if d is less than $\beta$, a variable dStrong is determined as follows:

$$d\_strong=abs(p_3-p_0)+abs(q_0-q_3)$$

Whether a Strong Filter or Weak Filter is applied is determined based on the value of d_strong as follows:
  If((d_strong<($\beta$>>3)) && (d<($\beta$>2)) && (abs($p_0-q_0$)<than (5*tC+1)>>1),
    The Strong filter is applied;
  Otherwise,
    The Weak filter is applied.

In one example, according to the techniques herein dStrong may be determined as follows:

$$d\_strong=(bSidePisLarge?\ max(abs(p_0-p_7),\ max(abs(p_3-p_0),\ abs(p_7-p_3))):abs(p_3-p_0))+(bSideQisLarge?Max(abs(q_0-q_7),\ max(abs(q_3-q_0),\ abs(q_7-q_3))):abs(q_3-q_0));$$

With respect to the deblocking filter implementations in JEM, when one of the following conditions is valid, luma deblocking cannot be performed in parallel as indicated below. That is, for example, deblocking may not be performed on both the left and right vertical boundaries of a block or the top and bottom horizontal boundaries of a block in parallel. That is, deblocking cannot be performed on two block boundaries in parallel, as the filtering process for one boundary may involve the samples deblocked by the filtering process for another boundary. Thus, samples at the center of a block may be covered by both of the deblocking filters at each corresponding edge.
  If (Cur_EDGE_VER && cur_block_width==4), no parallel deblocking of current block vertical boundaries;
  If (Cur_EDGE_VER && adjacent_block_width==4), no parallel deblocking of adjacent block vertical boundaries;
  If (Cur_EDGE_HOR && cur_block_height==4), no parallel deblocking of current block horizontal boundaries;
  If (Cur_EDGE_HOR && adjacent_block_width=4), no parallel deblocking of adjacent block horizontal boundaries;
  Where,
  Cur_EDGE_VER is a current vertical boundary,
  Cur_EDGE_HOR is a current horizontal boundary,
  cur_block_width is a current block width, e.g., in luma samples,
  cur_block_height is a current block height, e.g., in luma samples,
  adjacent_block_width is an adjacent block width, e.g., in luma samples, and
  adjacent_block_height is an adjacent block height, e.g., in luma samples.

In one example, according to the techniques herein, for each of the conditions above, deblocking may be performed on luma samples at a boundary as follows:
  If (Cur_EDGE_VER && cur_block_width=4 && adjacent_block_width>4), for Cur_EDGE_VER only perform deblocking on adjacent block samples;
  If (Cur_EDGE_VER && cur_block_width=4 && adjacent_block_width==4), for Cur_EDGE_VER do not perform deblocking;
  If (Cur_EDGE_VER && cur_block_width>4 && adjacent_block_width==4), for Cur_EDGE_VER only perform deblocking on current block samples;
  If (Cur_EDGE_VER && cur_block_width>4 && adjacent_block_width>4), for Cur_EDGE_VER perform deblocking on current block samples and adjacent block samples;
  If (Cur_EDGE_HOR && cur_block_height=4 && adjacent_block_height>4), for Cur_EDGE_HOR only perform deblocking on adjacent block samples;
  If (Cur_EDGE_HOR && cur_block_height=4 && adjacent_block_height=4), for Cur_EDGE_HOR do not perform deblocking;
  If (Cur_EDGE_HOR && cur_block_height>4 && adjacent_block_height=4), for Cur_EDGE_HOR only perform deblocking on current block samples;
  If (Cur_EDGE_HOR && cur_block_height>4 && adjacent_block_height>4), for Cur_EDGE_HOR perform deblocking on current block samples and adjacent block samples.

In a manner similar to that described above, for chroma deblocking, cases where parallel deblocking are limited occur when respective block cur_block_height, adjacent_block_height, cur_block_width, adjacent_block_width are equal to the threshold of 2. Thus, according to the techniques herein, for chroma samples, deblocking may be performed as described above where the threshold value 4 is replaced with the threshold value of 2 in the conditional statements.

In one example, according to the technique herein, instead of not performing deblocking on an edge for a block having dimension less than or equal to a threshold value, a narrower filter may be applied to samples at the edge. For example, in the case where (Cur_EDGE_VER && cur_block_width==4 && adjacent_block_width>4), deblocking may be performed as follows:
  For Cur_EDGE_VER perform deblocking on adjacent block samples according filter width and perform deblocking on the one adjacent column of samples at Cur_EDGE_VER for the current block.

In a similar manner, a narrower filter may be applied to samples at the edge for each of the cases described above. Thus, in general, according to the techniques herein, a video encoder (and/or video decoder) may be configured to determine when parallel deblocking is limited, for example, due to overlapping deblocking filters (e.g., a filter width being greater than half the block's width (or height)), and modify which samples which would otherwise be deblocked. It should be noted that in some cases, parallel deblocking may be limited based on the samples which are used for deblocking support. According to the techniques herein, a video encoder (and/or video decoder) may be configured to determine when parallel deblocking is limited do to samples in a block may being used for deblocking support for multiple deblocking filters.

As described above, for a F4P P-side filter, one of the computations includes:

$$p_0'=(p_7+p_6+p_5+p_4+p_3+p_2+p_1+2*p_0+q_0+q_1+q_2+q_3+q_4+q_5+q_6+8)>>4$$

It should be noted that if a q-side is size 8 and the opposite edge from the current edge makes use of strong HEVC filter then the samples $q_5$ and $q_6$ may be modified by the strong HEVC deblocking operation for the opposite side. Parallel processing cannot occur of deblocking edges that are parallel to each other. In one example, to prevent this, the p-side should use long filters (i.e., stronger filters) only if the q-side length (perpendicular to the edge) is greater than or equal to 16. This condition (e.g., LargeBlk condition) be checked in one of the following ways:

LargeBlk condition: (Both sides of the edge have length perpendicular to the edge>=16)? TRUE:FALSE;

LargeBlk condition: (Both sides of the edge have length perpendicular to the edge>=32)? TRUE:FALSE;

OR

LargeBlk condition: (Large block side of the edge has length perpendicular to the edge>=AND other block side of the edge has length perpendicular to the edge>=16)? TRUE:FALSE. Note, when both block size length is same then we would require that both be >=32. Wider-stronger filters are only used for side with length>=32.

In one example, according to the techniques herein, a set of deblocking filters may make use of a bilinear operation.

In one example, block boundary samples $p_i$ and $q_i$ for i=0 to S−1 are replaced by linear interpolation as follows $p_i'=(f_i*Middle_{s,t}+(64-f_i)*P_a+32)>>6)$, clipped to $p_i \pm tc$ $q_i'=(g_i*Middle_{s,t}+(64-g_i)*Q_a+32)>>6)$, clipped to $q_i \pm tc$ In one example, $f_i$, $Middle_{s,t}$, $P_g$, $g_i$, and $Q_t$ may be determined as provided in Table 1.

TABLE 1

| s, t (p-side, q-side) | Filter kernels |
|---|---|
| 7, 7 | $f_i = 59 - i * 9$, can also be described as $f = \{59, 50, 41, 32, 23, 14, 5\}$<br>$g_i = 59 - i * 9$, can also be described as $g = \{59, 50, 41, 32, 23, 14, 5\}$<br>$Middle_{7,7} = (2 * (p_o + q_o) + p_1 + q_1 + p_2 + q_2 + p_3 + q_3 + p_4 + p_4 + p_5 + q_5 + p_6 + p_6 + 8) >> 4$<br>$P_7 = (p_6 + p_7 + 1) >> 1, Q_7 = (q_6 + q_7 + 1) >> 1$ |
| 5, 5 | $f_i = 58 - i * 13$, can also be described as $f = \{58, 45, 32, 19, 6\}$<br>$g_i = 58 - i * 13$, can also be described as $g = \{58, 45, 32, 19, 6\}$<br>$Middle5,5 = (2 * (p_o + q_o + p_1 + q_1 + p_2 + q_2) + p_3 + q_3 + p_4 + q_4 + 8) >> 4$<br>$P_8 = (p4 + p5 + 1) >> 1, Q_5 = (q_4 + q_5 + 1) >> 1$ |
| 3, 3 | $f_i = 53 - i * 21$, can also be described as $f = \{53, 32, 11\}$<br>$g_i = 53 - i * 21$, can also be described as $g = \{53, 32, 11\}$<br>$Middle_{3,3} = (3 * (p_o + q_o + p_1 + q_1) + 2 * (p_2 + q_2) + 8) >> 4$<br>$P_3 = (p_2 + p_3 + 1) >> 1, Q_3 = (q_2 + q_3 + 1) >> 1$ |
| 7, 5 | $f_i = 59 - i * 9$, can also be described as $f = \{59, 50, 41, 32, 23, 14, 5\}$<br>$g_i = 58 - i * 13$, can also be described as $g = \{58, 45, 32, 19, 6\}$<br>$Middle_{7,5} = (2 * (p_o + q_o + q_1 + q_2) + p_1 + p_2 + p_3 + q_3 + p_4 + q_4 + p_5 + p_6 + 8) >> 4$<br>$P_7 = (p_6 + p_7 + 1) >> 1, Q_5 = (q_4 + q_5 + 1) >> 1$ |
| 7, 3 | $f_i = 59 - i * 9$, can also be described as $f = \{59, 50, 41, 32, 23, 14, 5\}$<br>$g_i = 53 - i * 21$, can also be described as $g = \{53, 32, 11\}$<br>$Middle_{7,3} = (2 * (p_o + q_o) + q_0 + 2 * (q_1 + q_2) + p_1 + q_1 + p_2 + p_3 + p_4 + p_5 + p_6 + 8) >> 4$<br>$P_7 = (p_6 + p_7 + 1) >> 1, Q_3 = (q_2 + q_3 + 1) >> 1$ |
| 5, 3 | $f_i = 58 - i * 13$, can also be described as $f = \{58, 45, 32, 19, 6\}$<br>$g_i = 53 - i * 21$, can also be described as $g = \{53, 32, 11\}$<br>$Middle_{5,3} = (2 * (p_o + q_o + p_1 + q_1 + p_2 + q_2) + q_0 + q_1 + p_3 + p_4 + 8) >> 4$<br>$P_5 = (p_4 + p_5 + 1) >> 1, Q_3 = (q_2 + q_3 + 1) >> 1$ |
| 5, 7 | $g_i = 59 - i * 9$, can also be described as $g = \{59, 50, 41, 32, 23, 14, 5\}$<br>$f_i = 58 - i * 13$, can also be described as $f = \{58, 45, 32, 19, 6\}$<br>$Middle_{5,7} = (2 * (q_o + p_o + p_1 + p_2) + q_1 + q_2 + q_3 + p_3 + q_4 + p_4 + q_5 + q_6 + 8) >> 4$<br>$Q_7 = (q_6 + q_7 + 1) >> 1, P_5 = (p_4 + p_5 + 1) >> 1$ |
| 3, 7 | $g_i = 59 - i * 9$, can also be described as $g = \{59, 50, 41, 32, 23, 14, 5\}$<br>$f_i = 53 - i * 21$, can also be described as $f = \{53, 32, 11\}$<br>$Middle_{3,7} = (2 * (p_o + q_o) + p_0 + 2 *(p_1 + p_2) + q_1 + p_1 + q_2 + q_3 + q_4 + q_5 + q_6 + 8) >> 4$<br>$Q_7 = (q_6 + q_7 + 1) >> 1, P_3 = (p_2 + p_3 + 1) >> 1$ |

With respect to Table 1, it should be noted that for 7,5; 7,3; 5,3; 5,7; and 3,7 the weights of $p_i$ and $q_i$ for Middle are not the same and derived from 7.7 by adding additional terms.

In one example, according to the techniques herein, a set of deblocking filters may make use of a bilinear operation if either side is greater than or equal to 32.

In one example, according to the techniques when either side is greater than or equal to 32 bilinear deblocking may be performed as provided in Table 2.

TABLE 2

| P-side | Q-side | s, t |
|---|---|---|
| >=32 | >=32 | 7, 7 |
| >32 | <32 | 7, 3 |
| <32 | >=32 | 3, 7 |

In one example, according to the techniques when either side is greater than or equal to 32 bilinear deblocking may be performed as provided in Table 3.

TABLE 3

| P-side | Q-side | s, t |
|---|---|---|
| >=32 | >=32 | 7, 7 |
| >=32 | <32 | 7, 5 |
| <32 | >=32 | 5, 7 |

In one example, according to the techniques when either side is greater than or equal to 32 bilinear deblocking may be performed as provided in Table 4.

TABLE 4

| P-side | Q-side | s, t |
|---|---|---|
| >=32 | >=32 | 5, 5 |
| >=32 | <32 | 5, 3 |
| <32 | >=32 | 3, 5 |

In one example, according to the techniques when either side is greater than or equal to 32 bilinear deblocking may be performed as provided in Table 5.

TABLE 5

| P-side | Q-side | s, t |
|---|---|---|
| >=32 | >=32 | 7, 7 |
| >=32 | <32 | 7, 3 |
| <32 | >=32 | 3, 7 |
| <32 | <32 | 3, 3 |

In one example, according to the techniques when either side is greater than or equal to 32 bilinear deblocking may be performed as provided in Table 6.

TABLE 6

| P-side | Q-side | s, t |
|---|---|---|
| >=32 | >=32 | 7, 7 |
| >=32 | <32 | 7, 5 |
| <32 | >=32 | 5, 7 |
| <32 | <32 | 5, 5 |

In one example, according to the techniques when either side is greater than or equal to 32 bilinear deblocking may be performed as provided in Table 7.

TABLE 7

| P-side | Q-side | s, t |
|---|---|---|
| >=32 | >=32 | 5, 5 |
| >=32 | <32 | 5, 3 |
| <32 | >=32 | 3, 5 |
| <32 | <32 | 3, 3 |

In one example, according to the techniques herein, a set of deblocking filters may make use of a bilinear operation if either side is greater than or equal to 16. In such a case, in Tables 2-7, 32 may be replaced with 16. In one example for Tables 5, 6, and 7, the last column (s,t) of rows with P-side length not equal to Q-side length may make use of (3,3),(5,5),(3,3) respective filtering. In one example, whether a set of deblocking filters makes use of a bilinear operation may be additionally conditioned on whether a strong filter condition is true. For example, any of the strong filter conditions described above. In one example, whether a set of deblocking filters makes use of a bilinear operation may be additionally conditioned as follows:

The variables dpq0, dpq3, dp, dq, and d are derived as follows:

$$dp0 = \text{abs}(p_{2,0} - 2*p_{1,0} + p_{0,0})$$

$$dp3 = \text{abs}(p_{2,3} - 2*p_{1,3} + p_{0,3})$$

$$dq0 = \text{abs}(q_{2,0} - 2*q_{1,0} + q_{0,0})$$

$$dq3 = \text{abs}(q_{2,3} - 2*q_{1,3} + q_{0,3})$$

and then,
if (p side is greater than or equal to 16)

$$dp0 = (dp0 + \text{abs}(p_{5,0} - 2*p_{4,0} + p_{3,0}) + 1) >> 1$$

$$dp3 = (dp3 + \text{abs}(p_{5,3} - 2*p_{4,3} + p_{3,3}) + 1) >> 1$$

if (q side is greater than or equal to 16)

$$dq0 = (dq0 + \text{Abs}(q_{5,0} - 2*q_{4,0} + q_{3,0}) + 1) >> 1$$

$$dq3 = (dq3 + \text{Abs}(q_{5,3} - 2*q_{4,3} + q_{3,3}) + 1) >> 1$$

$$dpq0 = dp0 + dq0$$

$$dpq3 = dp3 + dq3$$

$$dp = dp0 + dp3$$

$$dq = dq0 + dq3$$

$$d = dpq0 + dpq3$$

When d is less than 6, the following ordered steps apply:
The variable dpq is set equal to 2*dpq0.

$$sp_3 = \text{abs}(p_3 - p_0)$$

if (q side is greater than or equal to 16)

$$sp_3 = (sp_3 + \text{abs}(p_T - p_3) + 1) >> 1$$

$$sq_3 = \text{abs}(q_3 - q_0)$$

if (q side is greater than or equal to 16)

$$sq_3 = (sq_3 + \text{abs}(q_T - q_8) + 1) >> 1$$

StrongFilterCondition=(dpq is less than ($\beta$>>2), $sp_3+sq_3$ is less than ($\beta$>>3), and abs($p_0-q_0$) is leas than ($5*t_C+1$)>>1)? TRUE:FALSE It should be noted that in some examples: control parameter values for luma and chroma (e.g., $\beta$, tC, etc.) may not be the same and signaled using different set of syntax elements; control parameter values for chroma may be derived from control parameter values for luma; deblocking may be performed only on subPU edges that align with 8×8 (luma) and 4×4 (chroma) boundary; deblocking of edges of a current block may be based on the usage of linear model (LM) chroma; deblocking of edges of a current block may be based on the usage of separate partitioning trees; deblocking of edges of a current block may be based on the usage of pulse code modulation (PCM); and/or deblocking of edges of a current block may be based on the usage of transform quantization bypass mode. It should be noted that PCM is a lossless coding mode for a block of samples. In an example of PCM coding, samples are directly represented by a predefined number of bits. The bit depth used for PCM may be signaled in parameter set(s).

With respect to deblocking of edges of a current block based on the usage of LM chroma and/or deblocking of edges of a current block may be based on the usage of separate partitioning trees, in one example, deblock may be performed on edges of current block when LM chroma is used for a chroma block and/or separate trees is used for luma and chroma and/or transform coefficients received is zero. With respect to in one example, for separate trees deblocking may be performed only on a chroma edge (e.g. TU edges, PU edges, subPU edges, CU edges) co-incident with a 4×4 chroma grid.

In one example, when the large block condition is not TRUE and the strong filter condition is TRUE then NS00P and NS00Q are used to deblock the edge.

In one example, when the large block condition is not TRUE and the strong filter condition is TRUE then the (s,t)=3,3 filters are used to deblock the edge.

It should be noted that in some cases, a deblocking boundary may include a horizontal CTU boundary. For example, referring to FIG. 5B, in some cases, samples py,x may be included in the CTU which is above the CTU including samples qy,x. For purposes of coding the top line in a current CTU, a typical video coder implementation stores N rows of samples in the bottom lines of the CTU above the current CTU. For example, in the case where the deblocking boundary in FIG. 5B is a CTU boundary, a video coder stores values px,0 for performing intra prediction coding of line qx,0. A CTU line buffer refers to the lines of sample values above the current CTU which are stored for coding the current CTU. As the number of lines included in the CTU line buffer increases, memory costs of an video coder implementation increases. It should be noted that in some cases, data corresponding to sample values is also stored (e.g., prediction mode (and associated information e.g., intra prediction mode, bi-pred/uni-pred, motion vectors, reference index, etc.), block size, coefficient coding flags, etc.) Thus, in order to avoid increasing implementation costs, it is desirable to avoid increasing the number of lines included in the CTU line buffer solely for purposes of performing deblocking. For example, if all coding features of a proposed video coding standard require a CTU line buffer to store four lines of sample values, a deblocking filter that requires the CTU line buffer to be increased to store seven lines of sample values would increase implementation costs.

As described above, JEM describes the coding features that are under coordinated test model study by the JVET as potentially enhancing video coding technology beyond the capabilities of ITU-T H.265. Further, in response to a "Joint Call for Proposals on Video Compression with Capabilities beyond HEVC," jointly issued by VCEG and MPEG, multiple descriptions of video coding were proposed by various groups at the 10th Meeting of ISO/IEC JTC1/SC29/WG11 16-20 Apr. 2018, San Diego, CA. As a result of the multiple descriptions of video coding, a draft text of a video coding specification is described in "Versatile Video Coding (Draft 1)," 10th Meeting of ISO/IEC JTC1/SC29/WG11 16-20 Apr. 2018. San Diego, CA, document JVET-J1001-v2, which is incorporated by reference herein, and referred to as JVET-J1001. "Versatile Video Coding (Draft 2)," 11 th Meeting of ISO/IEC JTC1/SC29/WG11 10-18 Jul. 2018, Ljubljana. SI, document JVET-K1001-v4, which is incorporated by reference herein, and referred to as JVET-K1001, is an update to JVET-J1001. Proposed techniques in each of JVET-J1001 and JVET-K1001 are being implemented and evaluated using a Test Model (VTM) and Benchmark Set (BMS). The existing deblocking filter in BMS modifies up to three samples perpendicular to edges.

CE2-related: Longer Tap Deblocking Filter," 11th Meeting of ISO/IEC JTC1/SC29/WG1 1 10-18 Jul. 2018, Ljubljana, SI, document JVET-K0369-r3 which is referred to herein as JVET-K0369, describes a deblocking filter which modifies up to seven samples perpendicular to edges being deblocked. Further, in order to restrict the CTU line buffer size, the filter described in JVET-K0369 restricts the filtering operations for horizontal edges overlapping with CTU boundaries. In particular, JVET-K0369 describes a deblocking filter which modifies sample values according to Table 8A and provides where for the horizontal edges which overlap with the CTU boundaries, the deblocking filter is modified as illustrated in Table 8B.

TABLE 8A

| Output pixel | Filter coefficients $\{p_7, p_6, p_5, p_4, p_3, p_2, p_1, p_0, q_0, q_1, q_2, q_3, q_4, q_5, q_6, q_7\}$ | Input pixels |
| --- | --- | --- |
| $p_6'$ | {6, 3, 1, 1, 1, 1, 1, 1, 0, 0, 0, 0, 0, 0, 0} | $p_7$ to $q_0$ |
| $p_5'$ | {5, 1, 3, 1, 1, 1, 1, 1, 1, 0, 0, 0, 0, 0, 0} | $p_7$ to $q_1$ |
| $p_4'$ | {4, 1, 1, 3, 1, 1, 1, 1, 1, 1, 0, 0, 0, 0, 0} | $p_7$ to $q_2$ |
| $p_3'$ | {3, 1, 1, 1, 3, 1, 1, 1, 1, 1, 1, 0, 0, 0, 0} | $p_7$ to $q_3$ |
| $p_2'$ | {2, 1, 1, 1, 1, 3, 1, 1, 1, 1, 1, 1, 0, 0, 0} | $p_7$ to $q_4$ |
| $p_1'$ | {1, 1, 1, 1, 1, 1, 3, 1, 1, 1, 1, 1, 1, 0, 0} | $p_7$ to $q_5$ |
| $p_0'$ | {1, 1, 1, 1, 1, 1, 1, 2, 1, 1, 1, 1, 1, 1, 0} | $p_7$ to $q_6$ |
| $q_0'$ | {0, 1, 1, 1, 1, 1, 1, 1, 2, 1, 1, 1, 1, 1, 1} | $p_6$ to $q_7$ |
| $q_1'$ | {0, 0, 1, 1, 1, 1, 1, 1, 1, 3, 1, 1, 1, 1, 1} | $p_5$ to $q_7$ |
| $q_2'$ | {0, 0, 0, 1, 1, 1, 1, 1, 1, 1, 3, 1, 1, 1, 2} | $p_4$ to $q_7$ |
| $q_3'$ | {0, 0, 0, 0, 1, 1, 1, 1, 1, 1, 1, 3, 1, 1, 3} | $p_3$ to $q_7$ |
| $q_4'$ | {0, 0, 0, 0, 0, 1, 1, 1, 1, 1, 1, 1, 3, 1, 4} | $p_2$ to $q_7$ |
| $q_5'$ | {0, 0, 0, 0, 0, 0, 1, 1, 1, 1, 1, 1, 3, 1, 5} | $p_1$ to $q_7$ |
| $q_6'$ | {0, 0, 0, 0, 0, 0, 0, 1, 1, 1, 1, 1, 1, 3, 6} | $p_0$ to $q_7$ |

TABLE 8B

| Output pixel | Filter coefficients $\{p_7, p_6, p_5, p_4, p_3, p_2, p_1, p_0, q_0, q_1, q_2, q_3, q_4, q_5, q_6, q_7\}$ | Input pixels |
| --- | --- | --- |
| $p_2'$ | {0, 0, 0, 0, 6, 3, 1, 1, 1, 1, 1, 1, 0, 0, 0} | $p_3$ to $q_4$ |
| $p_1'$ | {0, 0, 0, 0, 5, 1, 3, 1, 1, 1, 1, 1, 1, 0, 0} | $p_3$ to $q_5$ |
| $p_0'$ | {0, 0, 0, 0, 5, 1, 1, 2, 1, 1, 1, 1, 1, 1, 0} | $p_3$ to $q_6$ |
| $q_0'$ | {0, 0, 0, 0, 4, 1, 1, 1, 2, 1, 1, 1, 1, 1, 1} | $p_3$ to $q_7$ |
| $q_1'$ | {0, 0, 0, 0, 3, 1, 1, 1, 1, 3, 1, 1, 1, 1, 1} | $p_3$ to $q_7$ |
| $q_2'$ | {0, 0, 0, 0, 2, 1, 1, 1, 1, 1, 3, 1, 1, 1, 2} | $p_3$ to $q_7$ |
| $q_3'$ | {0, 0, 0, 0, 1, 1, 1, 1, 1, 1, 1, 3, 1, 1, 3} | $p_3$ to $q_7$ |

TABLE 8B-continued

| Output pixel | Filter coefficients {$p_7, p_6, p_5, p_4, p_3, p_2, p_1, p_0, q_0, q_1, q_2, q_3, q_4, q_5, q_6, q_7$} | Input pixels |
|---|---|---|
| $q_4'$ | {0, 0, 0, 0, 0, 1, 1, 1, 1, 1, 1, 3, 1, 1, 4} | $p_2$ to $q_7$ |
| $q_5'$ | {0, 0, 0, 0, 0, 0, 1, 1, 1, 1, 1, 1, 3, 1, 5} | $p_1$ to $q_7$ |
| $q_6'$ | {0, 0, 0, 0, 0, 0, 0, 1, 1, 1, 1, 1, 1, 3, 6} | $p_0$ to $q_7$ |

It should be noted that modifying the deblocking filter are provided in JVET-K0369 for horizontal edges overlapping with CTU boundaries does not reduce the line buffer requirements for chroma sample values. Further, as illustrated in Table 8B, in addition to "zeroing out" filter coefficients for p7 to p4, filter coefficient values are changed for p3 to q7. Thus, JVET-K0369 requires storing additional filter sets to be used for filtering CTU boundaries, which requires additional memory for storing the coefficients.

In one example, according to the techniques herein, the usage of a long tap filter, which may include a filter that modifies and/or has a filter support that includes a least three or more lines from px,0 to px,i may be limited. In one example, for luma and/or chroma deblocking if the following condition is met (EDGE_TYPE is EDGE_HOR && Current Boundary is align with a CTU boundary), a long tap filter is not applied for side P, where EDGE_TYPE is EDGE_HOR indicates the current boundary is a horizontal boundary. In one example, for luma and/or chroma deblocking if the following condition is met (EDGE_TYPE is EDGE_HOR && curPos.y % CTUSize in luma samples==0), a long tap filter is not applied for P, where, curPos.y is the vertical luma position of the current block to be deblocked. In one example, for luma and/or chroma deblocking if the following condition is met (EDGE_TYPE is EDGE_HOR && curPosC.y % CTUSize in chroma samples==0), a long tap filter is not applied for P, where, curPosC.y is the vertical chroma position of the current block to be deblocked. In one example, for luma and/or chroma deblocking if the following condition is met (EDGE_TYPE is EDGE_HOR && Current Boundary is align with a CTU boundary), a long tap filter is not applied for side Q and side P. In one example, for luma and/or chroma deblocking if the following condition is met (EDGE_TYPE is EDGE_HOR && curPos.y % CTUSize in luma samples==0), a long tap filter is not applied for side Q and side P. In one example, for luma and/or chroma deblocking if the following condition is met (EDGE_TYPE is EDGE_HOR && curPosC.y % CTUSize in chroma samples==0), a long tap filter is not applied for side Q and side P. In one example, when a long tap filter is not applied, another filter which modifies fewer samples and/or includes a filter support utilizing fewer lines from px,0 to px,i (e.g., one, two, or three lines). For example, a weak or strong filters described herein may be applied in cases where a long tap filter is not allowed to be applied. It should be noted that, as provided in ITU-T H.265, the % operand is the modulus operand which provides the remainder of x divided by y.

In one example, when a long tap filter is not applied, sample values beyond a target line buffer threshold (e.g., three or four) may be made not-available and predetermined values may be used for the corresponding sample positions. Table 9 illustrates an example where a long tap filter includes the long tap filter described above with respect to Table 8A and a target line buffer threshold is four. Thus, sample values for p4 to p7 are not-available. As illustrated in Table 9, values for p4 to p7 are not modified for deblocking. Further, as illustrated in Table 9, p4 to p7 the filter coefficients are indicated an NA, which indicates that a sample value for each of p4 to p7 is not available in the line buffer. In one example, for each p4 to p7, the sample value may be set to the sample value of p3 and the filter coefficients in Table 8A may be used for deriving modified sample value for p3' to q2'.

TABLE 9

| Output pixel | Filter coefficients {$p_7, p_6, p_5, p_4, p_3, p_2, p_1, p_0, q_0, q_1, q_2, q_3, q_4, q_5, q_6, q_7$} | Input pixels |
|---|---|---|
| $p_3'$ | {NA, NA, NA, NA, 3, 1, 1, 1, 1, 1, 1, 1, 0, 0, 0, 0} | $p_7$ to $q_3$ |
| $p_2'$ | {NA, NA, NA, NA, 1, 3, 1, 1, 1, 1, 1, 1, 1, 0, 0, 0} | $p_7$ to $q_4$ |
| $p_1'$ | {NA, NA, NA, NA, 1, 1, 3, 1, 1, 1, 1, 1, 1, 1, 0, 0} | $p_7$ to $q_5$ |
| $p_0'$ | {NA, NA, NA, NA, 1, 1, 1, 2, 1, 1, 1, 1, 1, 1, 1, 0} | $p_7$ to $q_6$ |
| $q_0'$ | {NA, NA, NA, NA, 1, 1, 1, 1, 2, 1, 1, 1, 1, 1, 1, 1} | $p_6$ to $q_7$ |
| $q_1'$ | {NA, NA, NA, NA, 1, 1, 1, 1, 3, 1, 1, 1, 1, 1, 1} | $p_5$ to $q_7$ |
| $q_2'$ | {NA, NA, NA, NA, 1, 1, 1, 1, 1, 1, 3, 1, 1, 1, 2} | $p_4$ to $q_7$ |
| $q_3'$ | {NA, NA, NA, NA, 1, 1, 1, 1, 1, 1, 1, 3, 1, 1, 3} | $p_3$ to $q_7$ |
| $q_4'$ | {NA, NA, NA, NA, 1, 1, 1, 1, 1, 1, 1, 1, 3, 1, 1, 4} | $p_2$ to $q_7$ |
| $q_5'$ | {NA, NA, NA, NA, 0, 0, 1, 1, 1, 1, 1, 1, 1, 3, 1, 5} | $p_1$ to $q_7$ |
| $q_6'$ | {NA, NA, NA, NA, 0, 0, 0, 1, 1, 1, 1, 1, 1, 1, 3, 6} | $p_0$ to $q_7$ |

Further, in one example, values derived from sample values that are available may be used for the corresponding sample positions. In one example, for each p4 to p7, the sample value may be set to the average sample value of p3 and p2 and the filter coefficients in Table 8A may be used for deriving modified sample value for p3' to q2'.

In one example, when a long tap filter is not applied, the filtering process may be modified based on the position of a sample being deblocked (e.g., based on whether the sample value is above the CTU horizontal boundary OR within a certain distance of the CTU horizontal boundary) and a corresponding filter which do not access/deblock samples beyond the target line buffer threshold may be selected. For example, with respect to the example illustrated in Table 9, for p3' and p2' different rules may be applied from deriving sample values for p4 to p7.

In one example, when a long tap filter is not applied, the control process may be modified based on the position of a sample being deblocked and a corresponding filter which do not access/deblock samples beyond the target line buffer threshold may be selected. For example, (s=3, t=7) filter of Table 1 for luma, (s=3, t=5) filter of Table 1 for luma, F1P for luma, and/or chroma weak filter for chroma may be selected.

In one example, when a long tap filter is not applied, the deblocking grid may be changed, so that samples beyond the target line buffer threshold are not accessed/deblocked. For example, the deblocking grid may be moved so that the horizontal edge is at a distance of 4 below the horizontal CTU edge.

As described above, in ITU-T H.265, based on the QP values used for coding the CBs including video blocks P and Q (which may be referred to as QPP and QPQ), variables tC' and β' are determined. The derivation of the index Q for the luma channel is described above. For the chroma channel, ITU-T H.265, provides if the chroma is equal to 4:2:0, a variable QpC is determined as specified in the table illustrated in FIG. 13 based on the index qPi as follows:

$$qPi = ((Qp_Q + Qp_P + 1) >> 1) + cQp\text{PicOffset}$$

where,
cQpPicOffset is a variable specifying the picture-level chroma quantization parameter offset, and
cQpPicOffset=pps_cb_qp_offset for Cb, and
cQpPicOffset=pps_cr_qp_offset for Cr It should be noted that in ITU-T H.265, if the chroma format is equal to 4:2:2 or 4:4:4, QpC is set equal to Min(qPi, 51).

For Chroma, $t_c'$ is determined using the table illustrated in FIG. 6 and the index Q which is determined as follows for $t_c'$:

$$Q = \text{Clip3}(0, 53, Q_{pc} + 2*+(\text{slice\_tc\_offset\_div } 2 << 1))$$

The proposed techniques in each of JVET-J1001 and JVET-K1001 provide where separate partitioning trees may be used for partitioning the luma and chroma channels. In cases where separate partitioning trees are used for partitioning the luma and chroma channels, it may be useful to increase the amount to which a QP value for the chroma channel can be varied with respect to a QP value for the luma channel. That is, for example, respective QP offset values, which may be signaled on a slice level, for the each component of the chroma channel may be increased. It should be noted that ITU-H.265 provides the following chroma channel QP offset syntax elements:

pps_cb_qp_offset and pps_cr_qp_offset specify the offsets to the luma quantization parameter Qp'Y used for deriving Qp'Cb and Qp'Cr, respectively. The values of pps_cb_qp_offset and pps_cr_qp_offset shall be in the range of −12 to +12, inclusive. When ChmmaArrayType is equal to 0, pps_cb_qp_offset and pps_cr_qp_offet are not used in the decoding process and decoders shall ignore their value.

slice_cb_qp_offset specifies a difference to be added to the value of pps_cb_qp_offset when determining the value of the Qp'Cb quantization parameter. The value of slice_cb_qp_offset shall be in the range of −12 to +12, inclusive. When slice_cb_qp_offset is not present, it is inferred to be equal to 0. The value of pps_cb_qp_offset+slice_cb_qp_offset shall be in the range of −12 to +12, inclusive.

slice_cr_qp_offset specifies a difference to be added to the value of pps_cr_qp_offset when determining the value of the Qp'Cr quantization parameter. The value of slice_cr_qp_offset shall be in the range of −12 to +12, inclusive. When slice_cr_qp_offset is not present, it is inferred to be equal to 0. The value of pps_cr_qp_offset+slice_cr_qp_offset shall be in the range of −12 to +12, inclusive.

Changes to the derivation of chroma QP values may effect chroma channel deblocking in cases where deblocking parameters are based on a QP value. According to the techniques herein the derivation of deblocking parameters based QP value(s) may be modified, e.g., in cases where separate partitioning trees may be used for partitioning the luma and chroma channels.

In one example according to the techniques herein, cQpPicOffset may be derived as follows:

cQpPicOffset=pps_cb_qp_offset+slice_cb_qp_offset for Cb, and cQpPicOffset=pps_cr_qp_offset+slice_cr_qp_offset for Cr In one example, a CU level chroma QP offset value may be signaled (for e.g., during a palette mode coding). The chroma QP derivation used for deblocking may make use of the CU level chroma QP offset. For example, if the variables CuQpOffsetCb and CuQpOffsetCr represent Cb and Cr offset, then the chroma QP offset may be derived as:

cQpPicOffset=pps_cb_qp_offset+slice_cb_qp_offset+ $CuQp\text{Offset}_{Cb}$ for Cb cQpPicOffset=pps_cr_qp_offset+slice_cr_qp_offset+ $CuQp\text{Offset}_{Cr}$ for Cr In some cases an additional luma and chroma QP offset value may be used for blocks undergoing a type of processing (e.g., adaptive color transform). These QP offsets may be used for deriving the QP for luma and chroma. As a result, the deblocking processes may depend on the additional luma and chroma QP offsets.

In some examples, when separate partitioning trees are used for partitioning the luma and chroma channels, the chroma QP value may be computed based on partition tree type. For example, in one example, the chroma QP value may be determined as follows:

$$qPi = ((Qp_{blk\_Q} + Qp_{blk\_P} + 1) >> 1) + cQp\text{PicOffset}$$

where, $Qp_{blk\_P}$, $Qp_{blk\_Q}$ are luma quantization parameters corresponding to chroma block on P-side and chroma block on Q-side respectively.

Figure 14A:
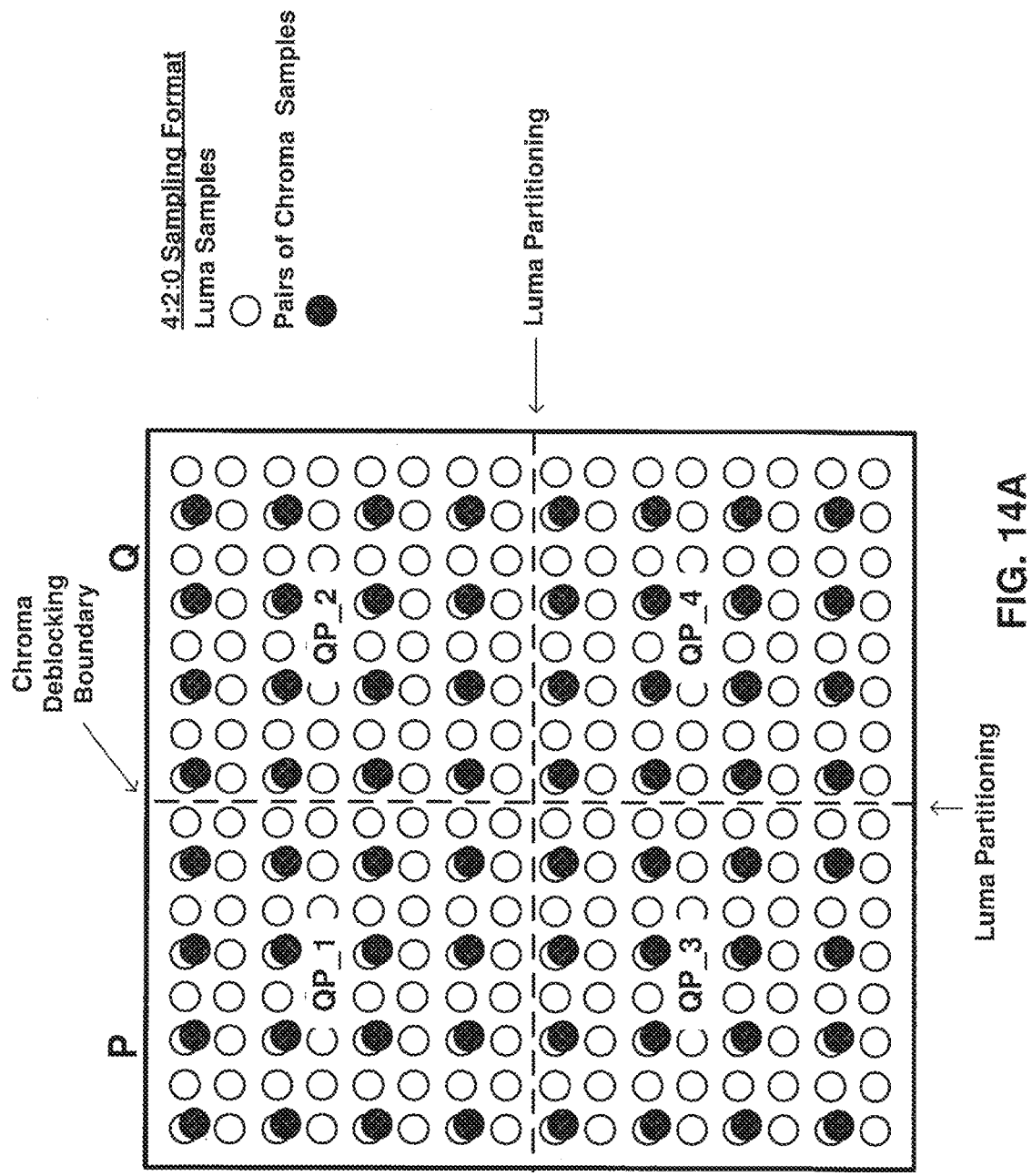
FIG. 14A is a conceptual diagrams illustrating blocks of video data including a deblocking boundary in accordance with one or more techniques of this disclosure.
Figure 14B:
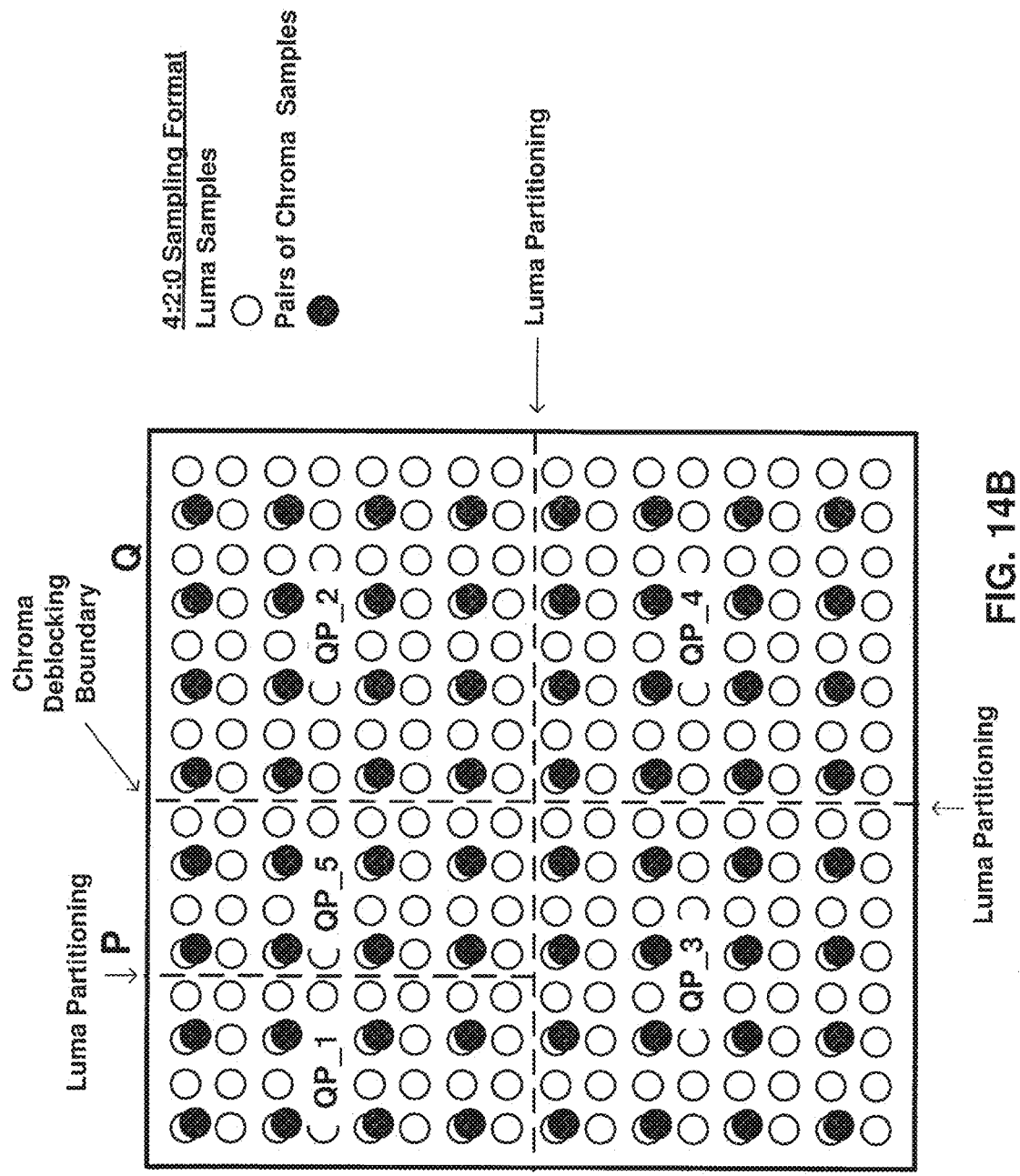
FIG. 14B is a conceptual diagrams illustrating blocks of video data including a deblocking boundary in accordance with one or more techniques of this disclosure.

In one example, $Qp_{blk\_P}$ and/or $Qp_{blk\_Q}$ may be derived from a combination of one or more of: QP values of multiple corresponding luma blocks; the number of samples of the luma block corresponding to the chroma block; the luma QP value corresponding to a predetermined chroma position. In some examples. $Qp_{blk\_P}$ and/or $Qp_{blk\_Q}$ may be derived using a function such as, for example, an integer averaging with rounding function, a maximum value function. It should be noted, that it possible to have a partial luma block corresponding to a chroma block. FIGS. 14A-14B illustrate examples of possible luma partitionings corresponding to chroma blocks P and Q, where each of the luma blocks have a QP values QP_X. In the example, illustrated in FIG. 14A the chroma block P is collocated with the luma blocks having QP values QP_1 and QP_3 and the chroma block Q is collocated with the luma blocks having QP values QP_2 and QP_4. In the example, illustrated in FIG. 14B the chroma block P is collocated with the luma blocks having QP values QP_1, QP_3, and QP_5 and the chroma block Q is collocated with the luma blocks having QP values QP_2 and QP_4. In one example, for the example illustrated in FIG. 14A. $Qp_{blk\_P}$ and $Qp_{blk\_Q}$ may be derived as follows:

$$Qp_{blk\_P} = (QP\_1 + QP\_3 + 1) >> 1$$

$$Qp_{blk\_Q} = (QP\_2 + QP\_4 + 1) >> 1$$

In one example, for the example illustrated in FIG. 14B. $Qp_{blk\_P}$ and $Qp_{blk\_Q}$ may be derived as follows:

$$Qp_{blk\_P} = (QP\_1 + QP\_5 + 2*QP\_3 + 2) >> 1$$

$$Qp_{blk\_Q} = (QP\_2 + QP\_4 + 1) >> 1$$

In one example. $Qp_{blk\_P}$ and/or $Qp_{blk\_Q}$ may be derived by identifying a set of chroma positions and for each chroma position identifying a corresponding luma positions. For each, corresponding luma position, a corresponding QP value may be determined. The corresponding QP values may be used to derive $Qp_{blk\_P}$ and/or $Qp_{blk\_Q}$.

As described above, in one example, a wider strong filter condition may include whether both a first condition and a second condition are true, where a first condition may be true when d<β, where d is determined as follows:

$dp0 = xCalcDP(R_C[0])$;

$dq0 = xCalcDQ(Re[0])$;

$dp1 = xCalcDP(R_C[1])$;

$dq1 = xCalcDQ(R_C[1])$;

$d0 = dp0 + dq0$;

$d1 = dp1 + dq1$;

$d = d0 + d1$.

Where, $R_C[N]$ corresponds to chroma lines perpendicular to the edge being deblocked and at distance N from the top of current chroma segment being deblocked; and In one example, a filter condition may include a condition is that is true when d<β, where d is determined as follows:

$dp0 = xCalcDP(R_C[0])$;

$dq0 = xCalcDQ(R_C[0])$;

$d0 = dp0 + dq0$;

$d = d0 + d1$.

In some examples, the condition may be checked for x sample segments of the chroma deblocking boundary (e.g., x=2). This reduces the number of lines which a gradient needs to be computed in the worst-case. It should be noted that in the worst case the first condition would compute gradients (xCalcDQP for every line) whereas the above condition would compute gradients once every 2 lines.

As described above, ITU-T H.265, variables β and $t_C$ are used for filtering decisions and clipping operations. For example, s and/or $t_C$ are used to determine whether a strong filter is used and/or to clip filtered sample values. It should be noted that in JVET-K1001 the peak signal to noise ratio (PSNR) is higher than a given level of quantization compared to ITU-T H.265. Thus, in some cases, it may be useful to modify β and/or $t_C$ in order to modify deblocking strength. That is, if the level of distortion is at a given level of quantization is lower, the amount of perceived blockiness is lower and thus, less deblocking is needed. In one example, β may be modified by as follows: β=β<<n. In one example, β may be modified by as follows: β=β>>n. In one example, $t_C$ may be modified by as follows: $t_C=t_C<<n$. In one example, $t_C$ may be modified by as follows: $t_C=t_C>>n$. In one example, n may be determined based on a combination of one or more of: Slice type, QP value, block size, bit depth, intra prediction mode, motion vectors (e.g., magnitude), channel type, and/or component type. For example, in one example, $t_C=t_C>>2$ may be used for intra slices and $t_C=t_C>>4$ may be used for inter slices. In one example, $t_C=t_C>>2$ may be used for the luma component and $t_C=t_C>>4$ may be used for chroma components.

"CE2-2.1.1: Long deblocking filters and fixes," 11th Meeting of ISO/IEC JTC1/SC29/WG11 10-18 Jul. 2018, Ljubljana, SI, document JVET-K0307-v1 which is referred to herein as JVET-K0307, describes longs filters and decisions for the luma component. Based on the filtering techniques described above, the filtering techniques in JVET-K0307 may be modified to enable use of long asymmetric filters. For long asymmetric filters, the number of samples deblocked on the larger block side is greater than that on the smaller block side. The deblocking decision processes to select from this extended filter set are described in detail below. The extended filter set may be used for strong deblocking throughout the deblocking.

In one example, according to the techniques herein, luma stronger filters are used when either side has a large block and a modified strong filter condition is met. In one example, a luma large block corresponds to a width>=32 for a vertical edge, and a height>=32 for a horizontal edge.

In one example, a luma stronger filter may be defined as follows:

Block boundary samples p, and q, for i=0 to S−1 are then replaced by linear interpolation as follows:

•'=*+*+32)>>6), clipped to ±tc
•'=*+*+32)>>6), clipped to ±tc where f_i, Middle_s,t, P_s and Q_s are given below in Table 10:

TABLE 10

| 7, 7 (p side: 7, q side: 7) | = 59 − i * 9, can also be described as f = <br> = 59 − i * 9, can also be described as g = <br> = (2 * + + + + + + + +8) >> 4 <br> = (+ + 1) >> 1, = (+ + 1) >> 1 |
|---|---|
| 7, 3 (p side: 7 q side: 3) | = 59 − i * 9, can also be described as f = <br> = 53 − i * 21, can also be described as g = <br> °= (2 * + + 2 * (+) + + +8) >> 4 <br> = (+ + 1) >> 1, = (+ + 1) >> 1 |
| 3, 7 (p side: 3 q side: 7) | = 59 − i * 9, can also be described as g = <br> = 53 − i * 21, can also be described as f = <br> °= (2 * + + 2 * (+) + + +8) >> 4 <br> = (+ + 1) >> 1, = (+ + 1) >> 1 |

In one example, the control process is further based on gradients computed for two lines of four sample segments; comparison of absolute pixel value difference with tc; and comparison of other absolute pixel value differences with P. More gradients are computed for large block side. The control process may be as follows:

1. The variables dpq0, dpq3, dp, dq, and d am derived as follows:

dp0, dp3, dq0, dq3 are first derived as in ITU-T H.265
   dpq0, dpq3, dp, dq, d am then derived as in ITU-T H.265
   As in ITU-T H.265, When d is less than B, the following ordered steps apply:
   a. dpq is derived as in ITU-T H.265.
   b. $sp_3=Abs(p_3-p_0)$, derived as in ITU-T H.265
      if (p side is greater than or equal to 32)
      $sp_3=(sp_3+Abs(p_7-p_3)+1)>>1$
   c. $sq_3=Abs(q_0-q_3)$, derived as in ITU-T H.265
      if (q side is greater than or equal to 32)
      $sq_3=(sq_3+Abs(q_7-q_3)+1)>>1$
   d. As in ITU-T H.265 derive, Strong Filter Condition=dpq is less than (β>>2), $sp_3+sq_3$ is loss than ((p or q side is greater than or equal to 32)? (3*β>>5):(β>>3)), and $Abs(p_0-q_0)$ is less than $(5*t_C+1)>>1)$? TRUE:FALSE
   e. if (p side or q side is greater than or equal to 32)
      Set dSp1, dSp2 to $Abs(p_3-p_0)$
      Set dSq1, dSq2 to $Abs(q_3-q_0)$
      if (q side is greater than or equal to 32)
      $dSq1=abs(q_4-2*q_2+q_0)$
      $dSq2=abs(q_6-2*q_3+q_0)$
      if (p side is greater than or equal to 32)
      $dSp1=abs(p_4-2*p_2+p_0)$
      $dSp2=abs(p_6-2*p_3+p0)$ Compute d_strong1 and d_strong2 as:
d_strong1=dSp1+dSq1
d_strong2=dSp2+dSq2
Compute StrongFilterCondition=(StrongFilterCondition && ((d_strong1<((3*beta)>>5)) && (d_strong2<((3*beta)>>5))))? TRUE:FALSE
f. When StrongFilterCondition is TRUE, use luma stronger filter (may be selected based on block-sizes at edge boundary).

In one example, a control process may be as follows:
The variables dpq0, dpq3, dp, dq, and d are derived as follows:
dp0, dp3, dq0, dq3 are first derived as in ITU-T H.265
dpq0, dpq3, dp, dq, d are then derived as in ITU-T H.265
As in ITU-T H.265, When d is less than β, the following ordered steps apply:
dpq is derived as in ITU-T H.265.
$sp_3$=Abs($p_3$−$p_0$), derived as in ITU-T H.265
if (p side is greater than or equal to 32 && q side is greater than or equal to 16)

$sp_3=(sp_3+\text{Abs}(p_7-p_3)+1)>>1$ $sq_3$=Abs($q_0$−$q_3$), derived as in ITU-T H.265
if (q side is greater than or equal to 32 && p side is greater than or equal to 16)
$sq_3$=($sq_3$+Abs($q_7$−$q_3$)+1)>>1
As in ITU-T H.265 derive, StrongFilterCondition=(dpq is less than (β>>2), $sp_3$+$sq_3$ is less than (((p side is greater than or equal to 32 && q side is greater than or equal to 16)) OR (q side is greater than or equal to 32 && p side is greater than or equal to 16))? (3*β>>5):(β3)), and Abs($p_0$−$q_0$) is less than (5*$t_C$+1)>>1)? TRUE:FALSE It should be noted that the conditions (p side is greater than or equal to 32 && q side is greater than or equal to 16) and (q side is greater than or equal to 32 && p side is greater than or equal to 16) determine if a luma stronger filter may be applied. It should be noted that in other examples, additional conditions may be applied (e.g., one or more preceding conditions) may be used to determine if a luma stronger filter may be applied. In one example, additional conditions may be as follows:
if (p side is greater than or equal to 32 && q side is greater than or equal to 16)||(q side is greater than or equal to 32 && p side is greater than or equal to 16); however for (7,7, 7,3, 3,7) the decision process is (p side is greater than or equal to 32||q side is greater than or equal to 32). The idea is the lower threshold selection of 3*β>>5 instead of β>>3 applies for any of these luma stronger filter preceding decision process.

In one example, according to the techniques describe herein luma may be deblocked according to a 4×4 luma sample grid (or in some examples according to a 8×8 luma sample grid). In this example, luma stronger filters, described above as WS00P P-side filter and WS00Q Q-side filter may be used for large blocks where large block corresponds to width>=32 for a vertical edge, and height>=32 for a horizontal edge and the adjacent block is greater than or equal to 16. The control process may be further based on gradients computed for two lines of 4 sample segments; comparison of absolute pixel value difference with tc; and comparison of other absolute pixel value differences with P, as described in further detail below. Further, when p0 belongs to CTU above current CTU, the following limited support luma filter provided in Table 8B above may be used.

In some cases, a subset of samples are not accessible. In such cases, a control process using this subset of samples may be affected. This may lead to asymmetry in the computation of a gradient. In some examples, in this cases, another control process may be used.
In one example, the control process may be as follows:
The variables dpq0, dpq3, dp, dq, and d are derived as follows:
dp0, dp3, dq0, dq3 are first derived as in ITU-T H.265
LongTapDeblocking=((p side>=32 && q side>=16)||(p side>=16 && q side>=32)))? TRUE:FALSE
ControlSamplesAccessible=p0 belongs to CTU above current CTU?FALSE:TRUE
if (LongTapDeblocking)
if (p aide is greater than or equal to 32 && ControlSamplesAccessible)

$dp0=(dp0+\text{Abe}(p_{5,0}-2*p_{4,0}+p_{3,0})+1)>>1$ $dp3=(dp3+\text{Abs}(p_{5,3}-2*p_{4,3}+p_{3,3})+1)>>1$ if (q side is greater than or equal to 32)

$dp0=(dp0+\text{Abe}(p_{5,0}-2*p_{4,0}+p_{3,0})+1)>>1$ $dp3=(dp3+\text{Abs}(p_{5,3}-2*p_{4,3}+p_{3,3})+1)>>1$ dpq0, dpq3, dp, dq, d are then derived as in ITU-T H.265
As in ITU-T H.265, When d is less than 8, the following ordered steps apply:
dpq is derived as in ITU-T H.265.
$sp_3$=Abe($p_3$−$p_0$), derived as in ITU-T H.265
if (p side is greater than or equal to 32 && LongTapDeblocking && ControlSamplesAccessible)

$sp_3=(sp_3+\text{Abs}(p_7-p_3)+1)>>1$ $sq_3$=Abs($q_0$−$q_3$), derived as in ITU-T H.265 if (q side is greater than or equal to 32 && LongTapDeblocking)

$sq_3=(sq_0+\text{Abs}(q_7-q_3)+1)>>1$

As in ITU-T H.265 derive, StrongFilterCondition=(dpq is lees than (β>>2), $sp_3$+$sq_3$ is less than (LongTapDeblocking)?(3*β>>5):(β>>3), and Abs($p_0$−$q_0$) is less than (5*$t_C$+1)>>1)? TRUE:FALSE
When StrongFilterCondition is TRUE and LongTapDeblocking is TRUE, use luma stronger filter on the side with length perpendicular to boundary edge greater than or equal to 32, Otherwise, When StrongFilterCondition is TRUE and LongTapDeblocking is FALSE, use another strong filter (e.g. HEVC strong filter HEVC_P, HEVC_Q).

In one example, thresholds used in comparisons may also be based on position. For example, whether the edge being deblocked is aligned with the CTU boundary.
In one example, one of the following may be needed for a 4×4 luma deblocking grid:
When block width height is equal to 4 for vertical edge/horizontal edge respectively and if the HEVC filter on/off condition (i.e. d<Beta, where d=$d_0$+$d_3$ and $d_0$=$d_{p0}$+$d_{q0}$ and $d_3$=$d_{p3}$+$d_{q3}$) is evaluated to true for the respective edge, then this method would enforce HEVC normal, weak filter with maximum one sample modification. Therefore the following HEVC condition is checked |δ|<10($t_C$) where δ=(9*($q_0$−$p_0$)−(3*($q_1$−$p_1$)+δ>>4, and if the condition is evaluated to true, then samples $p_0$ and $q_0$ are modified, otherwise no filtering is applied.
When block width/height is equal to 4 for vertical edge/horizontal edge respectively, then a maximum of three samples are used in filter decision and only one sample is modified by the filter i.e. $p_2^i$ is used to replace $p_3^i$ in strong/weak filter condition checks and both strong and weak filter are only allowed to modify $p_0$ and $q_0$ In one example, according to the techniques describe herein chroma may be deblocked according to a 2×2 chroma sample grid (or in some examples according to a 4×4 luma sample grid). In this example, HEVC_P P-side and HEVC_Q Q-side filters described above, may be used. Further, when $p_0$ belongs to CTU above current CTU, the chroma weak filter described above as NW00P above may be used. In one example, the strong filter may be used when the HEVC luma strong filter condition computed for chroma is TRUE and any of the following conditions is true:

The edge type is vertical an $p_0$ belongs to CU with width>=16 (chroma samples) and $q_0$ belongs to CU with width>=16 (chroma samples)

The edge type is horizontal and $p_0$ belongs to CU with height>=16 (chroma samples) and $q_0$ belongs to CU with height>=16 (chroma samples)

Referring again to FIG. 8, entropy encoding unit 218 receives quantized transform coefficients and predictive syntax data (i.e., intra prediction data and motion prediction data). It should be noted that in some examples, coefficient quantization unit 206 may perform a scan of a matrix including quantized transform coefficients before the coefficients are output to entropy encoding unit 218. In other examples, entropy encoding unit 218 may perform a scan. Entropy encoding unit 218 may be configured to perform entropy encoding according to one or more of the techniques described herein. In this manner, video encoder 200 represents an example of a device configured to receive an array of sample values including adjacent reconstructed video blocks for a component of video data, and modifying sample values in the adjacent reconstructed video blocks according to multiple passes of a deblocking filter.

Referring again to FIG. 7, data encapsulator 107 may receive encoded video data and generate a compliant bitstream, e.g., a sequence of NAL units according to a defined data structure. A device receiving a compliant bitstream can reproduce video data therefrom. Further, a device receiving a compliant bitstream may perform a sub-bitstream extraction process, where sub-bitstream extraction refers to a process where a device receiving a compliant bitstream forms a new compliant bitstream by discarding and/or modifying data in the received bitstream. It should be noted that the term conforming bitstream may be used in place of the term compliant bitstream.

Referring again to FIG. 7, interface 108 may include any device configured to receive data generated by data encapsulator 107 and transmit and/or store the data to a communications medium. Interface 108 may include a network interface card, such as an Ethernet card, and may include an optical transceiver, a radio frequency transceiver, or any other type of device that can send and/or receive information. Further, interface 108 may include a computer system interface that may enable a file to be stored on a storage device. For example, interface 108 may include a chipset supporting Peripheral Component Interconnect (PCI) and Peripheral Component Interconnect Express (PCIe) bus protocols, proprietary bus protocols. Universal Serial Bus (USB) protocols, $I^2C$, or any other logical and physical structure that may be used to interconnect peer devices.

Referring again to FIG. 7, destination device 120 includes interface 122, data decapsulator 123, video decoder 124, and display 126. Interface 122 may include any device configured to receive data from a communications medium. Interface 122 may include a network interface card, such as an Ethernet card, and may include an optical transceiver, a radio frequency transceiver, or any other type of device that can receive and/or send information. Further, interface 122 may include a computer system interface enabling a compliant video bitstream to be retrieved from a storage device. For example, interface 122 may include a chipset supporting PCI and PCIe bus protocols, proprietary bus protocols, USB protocols. FC, or any other logical and physical structure that may be used to interconnect peer devices. Data decapsulator 123 may be configured to receive and parse any of the example parameter sets described herein.

Video decoder 124 may include any device configured to receive a bitstream and/or acceptable variations thereof and reproduce video data therefrom. Display 126 may include any device configured to display video data. Display 126 may comprise one of a variety of display devices such as a liquid crystal display (LCD), a plasma display, an organic light emitting diode (OLED) display, or another type of display. Display 126 may include a High Definition display or an Ultra High Definition display. It should be noted that although in the example illustrated in FIG. 7, video decoder 124 is described as outputting data to display 126, video decoder 124 may be configured to output video data to various types of devices and/or sub-components thereof. For example, video decoder 124 may be configured to output video data to any communication medium, as described herein.

Figure 9:
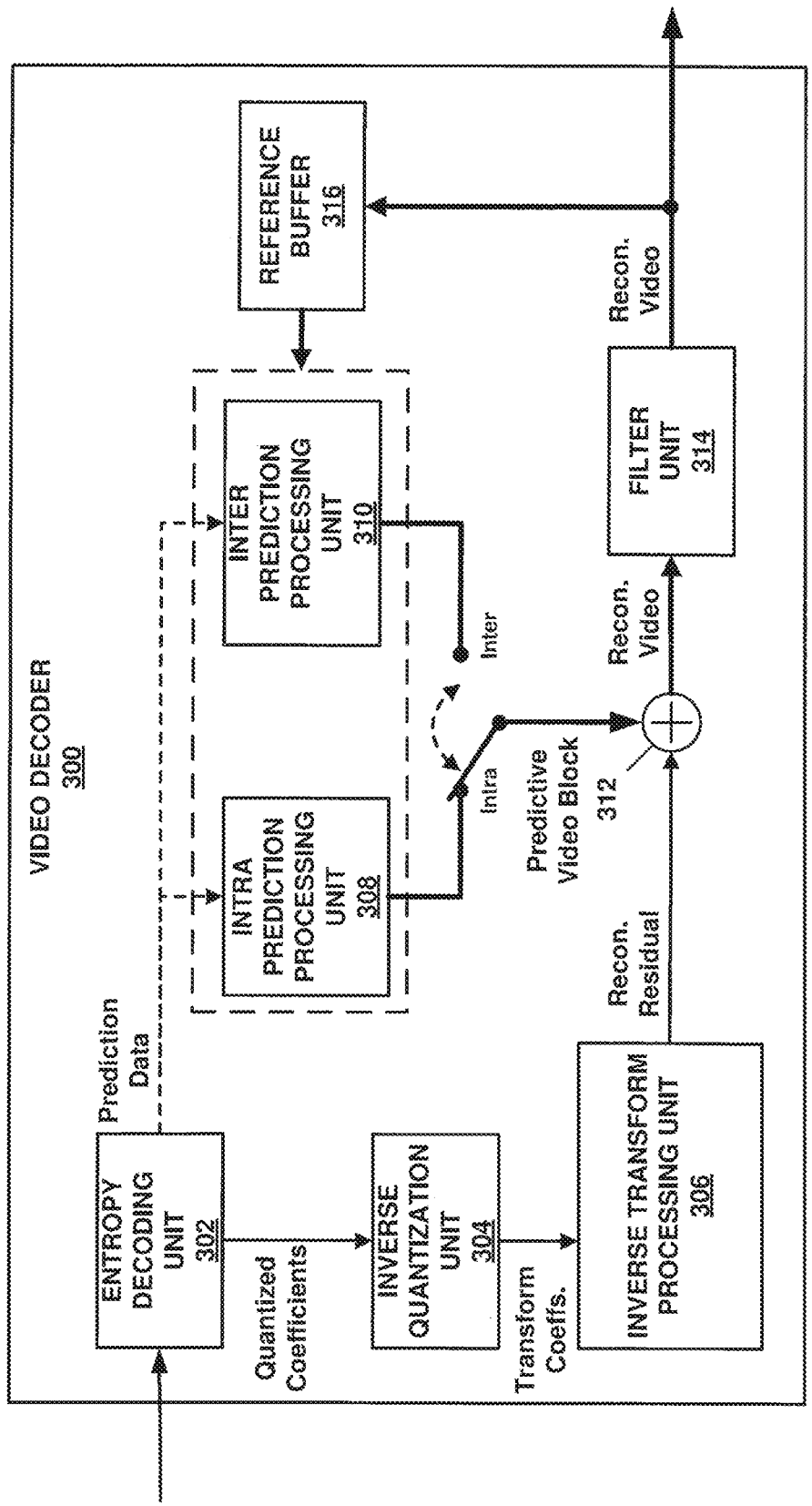
FIG. 9 is a block diagram illustrating an example of a video decoder that may be configured to decode video data according to one or more techniques of this disclosure.

FIG. 9 is a block diagram illustrating an example of a video decoder that may be configured to decode video data according to one or more techniques of this disclosure. In one example, video decoder 300 may be configured to decode transform data and reconstruct residual data from transform coefficients based on decoded transform data. Video decoder 300 may be configured to perform intra prediction decoding and inter prediction decoding and, as such, may be referred to as a hybrid decoder. In the example illustrated in FIG. 9, video decoder 300 includes an entropy decoding unit 302, inverse quantization unit 304, inverse transform coefficient processing unit 306, intra prediction processing unit 308, inter prediction processing unit 310, summer 312, filter unit 314, and reference buffer 316. Video decoder 300 may be configured to decode video data in a manner consistent with a video coding system. It should be noted that although example video decoder 300 is illustrated as having distinct functional blocks, such an illustration is for descriptive purposes and does not limit video decoder 300 and/or sub-components thereof to a particular hardware or software architecture. Functions of video decoder 300 may be realized using any combination of hardware, firmware, and/or software implementations.

As illustrated in FIG. 9, entropy decoding unit 302 receives an entropy encoded bitstream. Entropy decoding unit 302 may be configured to decode syntax elements and quantized coefficients from the bitstream according to a process reciprocal to an entropy encoding process. Entropy decoding unit 302 may be configured to perform entropy decoding according any of the entropy coding techniques described above. Entropy decoding unit 802 may determine values for syntax elements in an encoded bitstream in a manner consistent with a video coding standard. As illustrated in FIG. 9, entropy decoding unit 302 may determine quantized coefficient values and predication data from a bitstream. In the example illustrated in FIG. 9, inverse quantization unit 304 receives quantized coefficient values and outputs transform coefficients. Inverse transform processing unit 306 receives transform coefficients and outputs reconstructed residual data.

Referring again to FIG. 9, reconstructed residual data may be provided to summer 312. Summer 312 may add reconstructed residual data to a predictive video block and generate reconstructed video data. A predictive video block may be determined according to a predictive video technique (i.e., intra prediction and inter frame prediction). Intra prediction processing unit 308 may be configured to receive intra prediction syntax elements and retrieve a predictive video block from reference buffer 316. Reference buffer 316 may include a memory device configured to store one or more frames of video data. Intra prediction syntax elements may identify an intra prediction mode, such as the intra prediction modes described above. Inter prediction processing unit 308 may receive inter prediction syntax elements and generate motion vectors to identify a prediction block in one or more reference frames stored in reference buffer 316. Inter prediction processing unit 310 may produce motion compensated blocks, possibly performing interpolation based on interpolation filters. Identifiers for interpolation filters to be used for motion estimation with sub-pixel precision may be included in the syntax elements. Inter prediction processing unit 310 may use interpolation filters to calculate interpolated values for sub-integer pixels of a reference block.

Filter unit 314 may be configured to perform filtering on reconstructed video data. For example, filter unit 314 may be configured to perform deblocking and/or Sample Adaptive Offset (SAO) filtering, e.g., based on parameters specified in a bitstream. Further, it should be noted that in some examples, filter unit 314 may be configured to perform proprietary discretionary filtering (e.g., visual enhancements, such as, mosquito noise reduction). Filter unit 314 may operate in a similar manner to filter unit 216. As illustrated in FIG. 9, a reconstructed video block may be output by video decoder 300. In this manner, video decoder 300 may be configured to receive an array of sample values including adjacent reconstructed video blocks for a component of video data and modify sample values in the adjacent reconstructed video blocks according to multiple passes of a deblocking filter.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Moreover, each functional block or various features of the base station device and the terminal device used in each of the aforementioned embodiments may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

Various examples have been described. These and other examples are within the scope of the following claims.

The invention claimed is:

1. A device comprising:
a processor; and
a memory storing instructions that, when executed by the processor, cause the device to perform a method of filtering reconstructed video data, the method comprising:
receiving values of samples included in a first block and a second block, in the reconstructed video data, adjacent to a vertical block boundary;
determining whether the first block is a large block based on whether a width of the first block is greater than or equal to 32 samples;
determining whether the second block is a large block based on whether a width of the second block is greater than or equal to 32 samples;
calculating a first gradient value for the first block;
calculating a second gradient value for the second block;
deriving a variable beta based on a quantization parameter;
setting a threshold to one of:
(3*beta>>5), in a case that the first block or the second block is the large block, or
(beta>>3), in a case that neither of the first block nor the second block is a large block;
filtering the samples included in the first block and the second block by using a long filter, based on whether a sum of the first gradient value and the second gradient value is less than the threshold.

* * * * *